(12) United States Patent
Narabu

(10) Patent No.: US 10,267,949 B2
(45) Date of Patent: Apr. 23, 2019

(54) INFORMATION PROCESSING APPARATUS AND INFORMATION PROCESSING METHOD

(71) Applicant: SONY CORPORATION, Tokyo (JP)

(72) Inventor: Tadakuni Narabu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 15/512,053

(22) PCT Filed: Jun. 30, 2015

(86) PCT No.: PCT/JP2015/068753
§ 371 (c)(1),
(2) Date: Mar. 16, 2017

(87) PCT Pub. No.: WO2016/059835
PCT Pub. Date: Apr. 21, 2016

(65) Prior Publication Data
US 2017/0276833 A1  Sep. 28, 2017

(30) Foreign Application Priority Data

Oct. 17, 2014  (JP) .................. 2014-212226

(51) Int. Cl.
*G01W 1/08*  (2006.01)
*B64B 1/26*  (2006.01)
(Continued)

(52) U.S. Cl.
CPC ................ *G01W 1/08* (2013.01); *B64B 1/26* (2013.01); *B64B 1/58* (2013.01); *B64D 47/08* (2013.01);
(Continued)

(58) Field of Classification Search
CPC ... G01W 1/08; B64B 1/26; B64B 1/58; B64D 47/08; G03B 15/006; G03B 37/00;
(Continued)

(56) References Cited

U.S. PATENT DOCUMENTS 4,685,640 A    8/1987  Warrington et al.
2003/0025034 A1    2/2003  Akahori
(Continued)

FOREIGN PATENT DOCUMENTS

AU    5710586 A    11/1986
AU    588312 B2    9/1989
(Continued)

OTHER PUBLICATIONS

Peng et al., Integration of an unmanned vehicle and its application to real-time gas detection and monitoring, 2015, IEEE, p. 320-321 (Year: 2015).*
(Continued)

*Primary Examiner* — McDieunel Marc
(74) *Attorney, Agent, or Firm* — Chip Law Group

(57) ABSTRACT

To record an interesting image. An information processing apparatus includes an imaging unit and a control unit. The imaging unit is provided at a flight vehicle which moves in air by utilizing gas lighter than air and is configured to image a subject to generate image data. The control unit is configured to perform control movement of the flight vehicle on the basis of at least one of information relating to the flight vehicle and information of surroundings of the flight vehicle, and to perform control to record the image data generated by the imaging unit.

14 Claims, 31 Drawing Sheets

(51) Int. Cl.
*B64B 1/58* (2006.01)
*B64D 47/08* (2006.01)
*G03B 15/00* (2006.01)
*G05D 1/10* (2006.01)
*G05D 1/00* (2006.01)
*H04N 5/225* (2006.01)
*G03B 37/00* (2006.01)
*A63H 27/10* (2006.01)

(52) U.S. Cl.
CPC ......... *G03B 15/006* (2013.01); *G05D 1/0094* (2013.01); *G05D 1/102* (2013.01); *G05D 1/105* (2013.01); *H04N 5/2257* (2013.01); *A63H 2027/1066* (2013.01); *G03B 37/00* (2013.01); *H04N 2005/2255* (2013.01)

(58) Field of Classification Search
CPC ...... G05D 1/0094; G05D 1/102; G05D 1/105; H04N 5/2257; H04N 205/2255; A63H 2027/1066
See application file for complete search history.

(56) References Cited

U.S. PATENT DOCUMENTS

| | | | |
|---|---|---|---|
| 2004/0167682 A1* | 8/2004 | Beck | B60K 17/046 701/3 |
| 2004/0232285 A1 | 11/2004 | Akahori | |
| 2010/0007751 A1 | 1/2010 | Icho et al. | |
| 2011/0292348 A1 | 12/2011 | Tobita et al. | |
| 2013/0002855 A1* | 1/2013 | Ratti | H04N 13/388 348/117 |
| 2015/0076279 A1* | 3/2015 | Nelson | B64B 1/10 244/30 |
| 2017/0200961 A1* | 7/2017 | Zheng | B64C 29/0016 |
| 2017/0235018 A1* | 8/2017 | Foster | B64C 39/024 702/5 |
| 2018/0074499 A1* | 3/2018 | Cantrell | G05D 1/0088 |

FOREIGN PATENT DOCUMENTS

| | | |
|---|---|---|
| CN | 1464856 A | 12/2003 |
| CN | 101390383 A | 3/2009 |
| CN | 102259700 A2 | 11/2011 |
| EP | 0201309 A2 | 11/1986 |
| JP | 352335 Z1 | 10/1948 |
| JP | 62-18397 A | 1/1987 |
| JP | 2000-16394 A | 1/2000 |
| JP | 2007-235399 A | 9/2007 |
| JP | 2011-245925 A | 12/2011 |
| JP | 5155145 B2 | 2/2013 |
| WO | 03/004352 A1 | 1/2003 |
| WO | 2007/097431 A1 | 8/2007 |

OTHER PUBLICATIONS

International Search Report and Written Opinion of PCT Application No. PCT/JP2015/068753, dated Aug. 25, 2015, 09 pages and 13 pages of English Translation of and 09 pages of ISRWO.
International Preliminary Report on Patentability of PCT Application No. PCT/JP2015/068753, dated Apr. 27, 2017, 14 pages of English Translation and 06 pages of IPRP.

* cited by examiner

OPERATION EXAMPLE IN THE CASE WHERE REMAINING CAPACITY OF POWER SUPPLYING UNIT IS LESS THAN OR EQUAL TO THRESHOLD

OPERATION EXAMPLE IN THE CASE WHERE VOLUME OF GAS OF BUOYANCE UNIT IS LESS THAN OR EQUAL TO THRESHOLD

EXAMPLE OF FLIGHT VEHICLE INCLUDING TRAVELING DIRECTION FINS LIKE VERTICAL TAILS

FLIGHT VEHICLE INCLUDING TRAVELING DIRECTION FINS LIKE PRIMARY WING AND VERTICAL TAIL

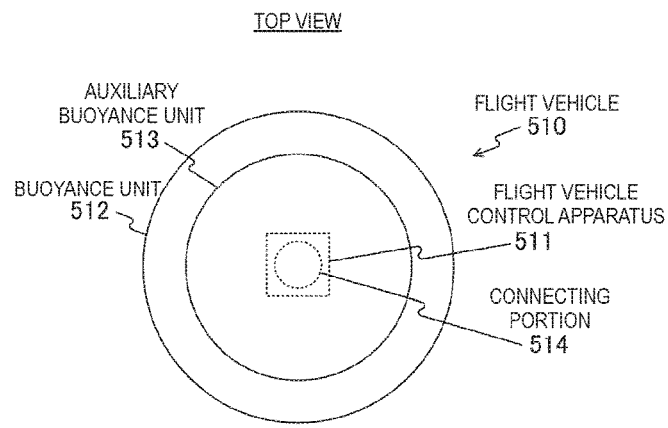
FIG. 28a
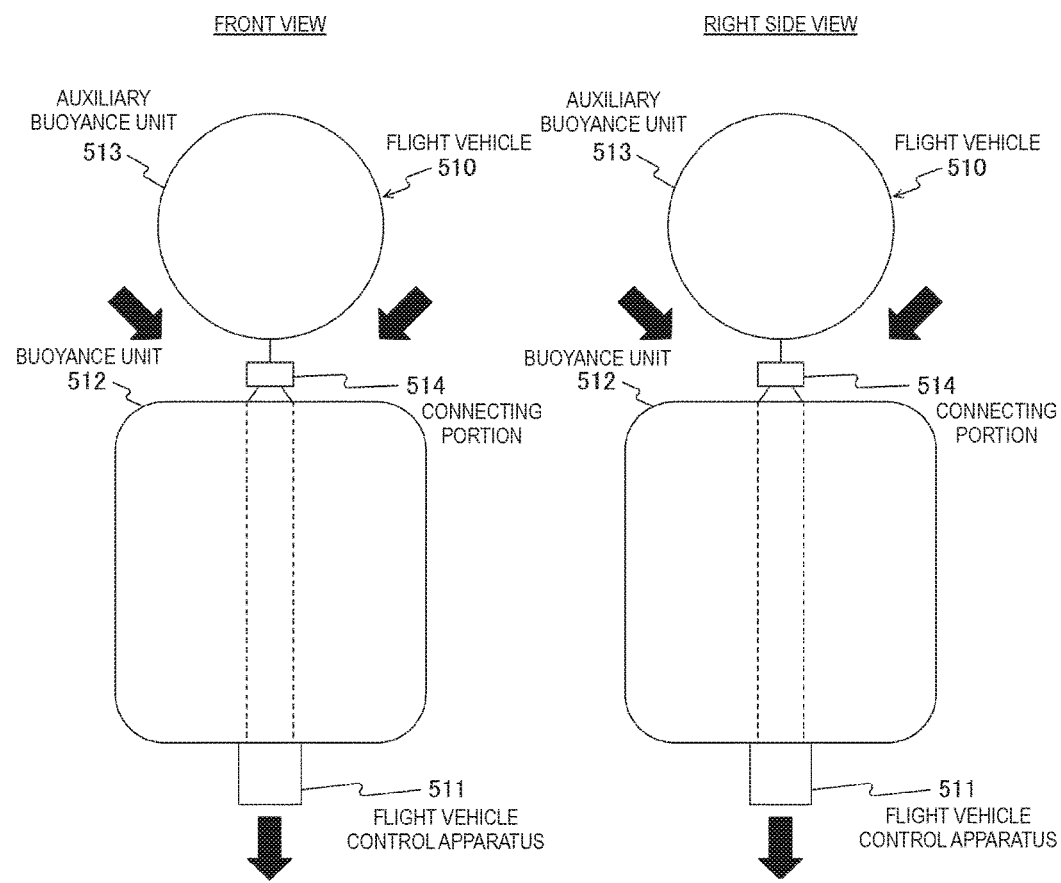
FIG. 28b
FIG. 28c

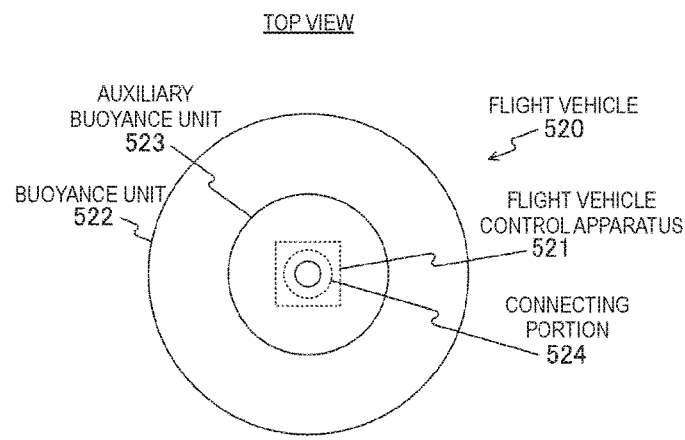
FIG. 29a
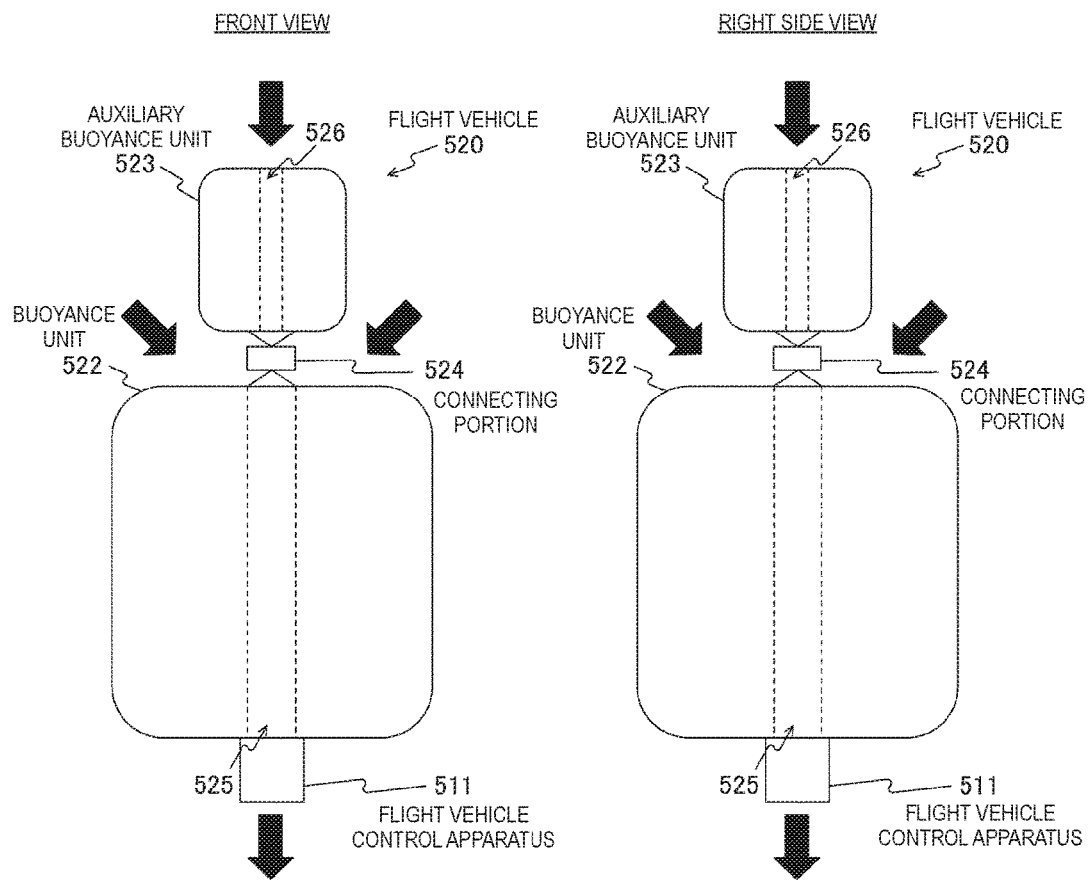
FIG. 29b
FIG. 29c

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/068753 filed on Jun. 30, 2015, which claims priority benefit of Japanese Patent Application No. JP 2014-212226 filed in the Japan Patent Office on Oct. 10, 2014. Each of the above-referenced applications is hereby incorporated herein by reference in its entirety.

TECHNICAL FIELD

The present technology relates to an information processing apparatus, more particularly, to an information processing apparatus which handles each information by utilizing a flight vehicle, an information processing method, and a program causing a computer to execute the method.

BACKGROUND ART

Conventionally, there have been information processing apparatuses such as digital still cameras and digital video cameras (for example, camera-integrated recorders) which image a subject to generate image data.

For example, an image processing apparatus which records image data on the basis of a timing at which a predetermined object is detected from the image data generated by an imaging unit has been proposed (for example, see Patent Literature 1).

CITATION LIST

Patent Literature

Patent Literature 1: JP 2009-212980A

DISCLOSURE OF INVENTION

Technical Problem

With the above-described related art, it is possible to record image data on the basis of a timing at which a predetermined object is detected.

However, in the case where imaging operation is performed on the ground, there is a possibility that its imaging range may be limited. Therefore, there can be also a case where imaging operation is performed in the air. In this case, it is supposed that an interesting image which is different from that of an image generated through imaging operation on the ground can be generated and recorded.

The present technology has been created in view of such circumstances, and is directed to recording an interesting image.

Solution to Problem

The present technology has been achieved to solve the above problem, and an aspect of the present technology is to provide an information processing apparatus including: an imaging unit provided at a flight vehicle which moves in air by utilizing gas lighter than air and configured to image a subject to generate image data; and a control unit configured to perform control movement of the flight vehicle on the basis of at least one of information relating to the flight vehicle and information of surroundings of the flight vehicle, and to perform control to record the image data generated by the imaging unit, an information processing method performed by the information processing apparatus, and a program for causing a computer to execute the method. By this means, action of controlling movement of the flight vehicle on the basis of at least one of information relating to the flight vehicle and information of surroundings of the flight vehicle and recording the image data generated by the imaging unit is provided.

According to the first aspect, the information processing apparatus may further include an acquiring unit configured to acquire at least one of the information relating to the flight vehicle and the information of the surroundings. The control unit may record the image data generated by the imaging unit in the case where the acquired information satisfies a predetermined condition. By this means, action of recording the image data generated by the imaging unit in the case where the acquired information satisfies the predetermined condition is provided.

According to the first aspect, the acquiring unit may acquire at least one of image information, sound information, temperature information, and distance information relating to space where the flight vehicle exists as the information of the surroundings and may acquire height information, location information, velocity information, acceleration information, and power remaining capacity relating to the flight vehicle as the information relating to the flight vehicle, and the control unit may record the image data generated by the imaging unit on the basis of a change amount of the acquired information. By this means, action of recording the image data generated by the imaging unit on the basis of a change amount of the acquired information is provided.

According to the first aspect, the information processing apparatus may further include: a buoyance unit configured to fill the flight vehicle with the gas and float the flight vehicle in the air, and including a through-hole which pierces, in a vertical direction, a center portion in a horizontal direction; and a propeller provided near an opening portion at a lower side of the through-hole and configured to move the flight vehicle in the vertical direction. A diameter of the propeller may be the same as a size of the opening portion, or less than or equal to the size. By this means, action of making the diameter of the propeller which is provided near the opening portion at the lower side of the through-hole of the buoyancy unit and which moves the flight vehicle in the vertical direction, the same as or less than or equal to the size of the opening portion is provided.

According to the first aspect, the control unit may detect a dangerous location in the air on the basis of the information of the surroundings and may control movement of the flight vehicle so as to avoid the detected dangerous location. By this means, action of detecting a dangerous location in the air on the basis of the information of the surroundings and controlling movement of the flight vehicle so as to avoid the detected dangerous location is provided.

According to the first aspect, the information processing apparatus may further include a buoyance unit including a display unit for displaying an image on an outer surface and configured to float the flight vehicle in the air by being filled with the gas inside. The control unit may make the display unit display an image. By this means, action of making the display unit provided on the outer surface of the buoyancy unit display the image is provided.

According to the first aspect, the information processing apparatus may further include a rechargeable battery configured to supply power. The control unit may perform control to move the flight vehicle to a location of a charging apparatus for charging the rechargeable battery in the case where remaining capacity of the rechargeable battery is less than a threshold. By this means, action of performing control to move the flight vehicle to the location of the charging apparatus in the case where remaining capacity of the rechargeable battery is less than the threshold is provided.

According to the first aspect, the information processing apparatus may further include a first buoyance unit configured to float the flight vehicle in the air by being filled with the air; and a second buoyance unit connected to the first buoyance unit so as to be able to be separated and configured to float the flight vehicle in the air by being filled with the gas. The control unit may perform control to separate the second buoyance unit from the first buoyance unit on the basis of at least one of the information relating to the flight vehicle and the information of the surroundings. By this means, action of separating the second buoyance unit from the first buoyance unit on the basis of at least one of the information relating to the flight vehicle and the information of the surroundings is provided.

According to the first aspect, the information processing apparatus may further include a buoyance unit configured to float the flight vehicle in the air by being filled with the gas. The control unit may perform control to move the flight vehicle to a location of a replenishing apparatus for replenishing the gas in the case where gas of the buoyance unit is less than a threshold. By this means, action of moving the flight vehicle to the location of the replenishing apparatus in the case where gas of the buoyance unit is less than the threshold is provided.

According to the first aspect, the information processing apparatus may further include a buoyance unit configured to float the flight vehicle in the air by being filled with the gas. The control unit may absorb gas filling the buoyance unit or may inject gas to the buoyance unit. By this means, action of absorbing gas filling the buoyance unit or injecting gas to the buoyance unit is provided.

According to the first aspect, the control unit may authenticate a user who uses the flight vehicle at a timing before operation for floating the flight vehicle in the air is started or at a timing before the information processing apparatus is powered on. By this means, action of authenticating the user who uses the flight vehicle at a timing before operation of floating the flight vehicle in the air is started or at a timing before the information processing apparatus is powered on is provided.

According to the first aspect, the information processing apparatus may further include a communication unit configured to exchange the information of the surroundings with other apparatuses by utilizing radio communication. By this means, action of exchanging the information of the surroundings with other apparatuses by utilizing radio communication is provided.

Advantageous Effects of Invention

According to the present technology, it is possible to provide advantageous effects of enabling recording of an interesting image. Note that the effects of the present technology are not limited to those described here, and may be any effect described in the present disclosure.

BRIEF DESCRIPTION OF DRAWINGS

FIGS. 28a, 28b, and 28c are diagrams illustrating an external configuration example of a flight vehicle 510 according to the second embodiment of the present technology.

FIGS. 29a, 29b, and 29c are diagrams illustrating an external configuration example of a flight vehicle 520 according to the second embodiment of the present technology.

MODES FOR CARRYING OUT THE INVENTION

Embodiments for implementing the present technology (hereinafter, referred to as embodiments) will be described below. Description will be provided in the following order.
1. First embodiment (example where each processing is performed at flight vehicle which moves in the air by utilizing gas lighter than air)
2. Second embodiment (example where buoyance of flight vehicle is increased by utilizing buoyance unit which can be separated)

1. First Embodiment

Figure 1A:
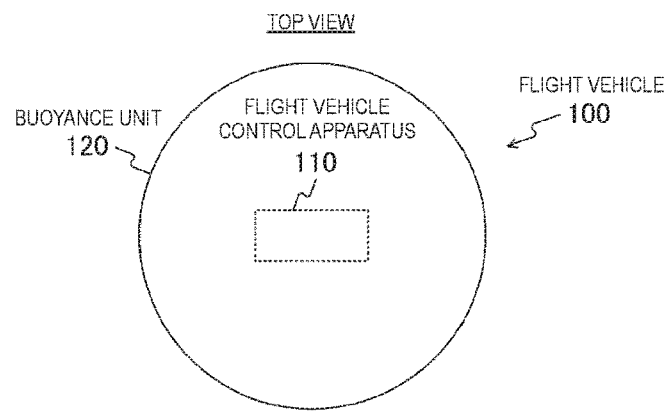
FIGS. 1a, 1b, and 1c are diagrams illustrating an external configuration example of a flight vehicle 100 according to a first embodiment of the present technology.
Figure 1B:
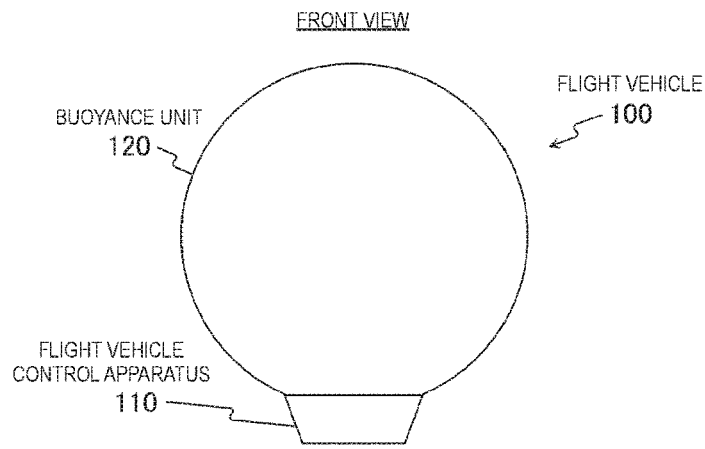
Figure 1C:
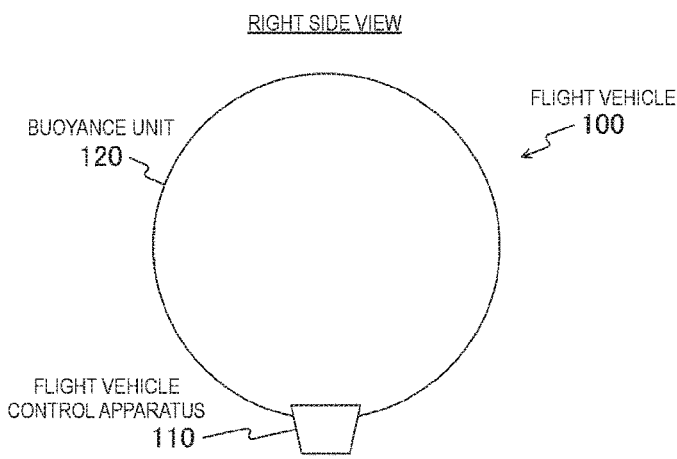

[External Configuration Example of Flight Vehicle]
FIGS. 1a, 1b, and 1c are diagrams illustrating an external configuration example of a flight vehicle 100 according to a first embodiment of the present technology. FIG. 1a illustrates a top view of the flight vehicle 100, FIG. 1b illustrates a front view of the flight vehicle 100, and FIG. 1c illustrates a side view (right side view) of the flight vehicle 100.

The flight vehicle 100 includes a flight vehicle control apparatus 110 and a buoyance unit 120. Note that the flight vehicle control apparatus 110 and the buoyance unit 120 may be detachably fixed or may be fixed so as not to be able to be detached.

The flight vehicle control apparatus 110 is an apparatus which controls movement of the flight vehicle 100 in three-dimensional space (for example, a propulsion apparatus of the flight vehicle 100). Note that the flight vehicle control apparatus 110 will be described in detail with reference to FIGS. 2a, 2b, and 2c and FIG. 3. Further, the flight vehicle control apparatus 110 is an example of an information processing apparatus recited in the claims.

The buoyance unit 120, which is hollow inside, obtains buoyance by being filled with specific gas and floats the flight vehicle 100 in the air. For example, the buoyance unit 120 is implemented with a spherical balloon (flying balloon, balloon).

As materials of the buoyance unit 120, for example, a natural rubber, nylon, polyethylene, polyvinyl chloride (vinyl chloride resin), or the like, can be used. Further, for example, a saponified material of ethylene-vinyl acetate copolymer (for example, Eval (registered trademark)), a polyester film, polyallylate fiber, Zylon (registered trademark), or the like, can be used. For example, any one of these or combination of a plurality of these materials can be selected and used as the materials of the buoyance unit 120 in accordance with application of the flight vehicle 100 while property such as strength, gas barrier property, mass and resistance to climate is taken into account.

Further, for example, in the case where a small or medium-sized balloon is used as the buoyance unit 120, a natural rubber, polyvinyl chloride, Eval, or the like, can be used as the materials. As Eval (registered trademark) described here, for example, a membrane obtained by depositing aluminum on a membrane formed with Eval and linear polyethylene can be used.

Further, while Eval (registered trademark) is inferior to polyvinyl chloride in strength and durability, Eval is superior to polyvinyl chloride in gas barrier property and mass, so that Eval is often used for a small or medium-sized balloon. Therefore, in the case where a small or medium-sized balloon is used as the buoyance unit 120, it is preferable to use Eval (registered trademark).

As gas which fills inside of the buoyance unit 120, air, gas similar to air or gas lighter than air is used. Here, gas lighter than air includes helium, hydrogen, ammonia, neon and methane.

For example, as gas which fills inside of the buoyance unit 120, it is preferable to use helium taking into account fire resistance and an effect of buoyance.

Here, hydrogen which maximizes buoyance is combustible and explosive. However, by taking measures for preventing these, hydrogen which maximizes buoyance can be used as gas which fills inside of the buoyance unit 120.

Further, while ammonia, neon and methane are combustible, by taking measures for preventing these, ammonia, neon and methane can be used as gas which fills inside of the buoyance unit 120.

Further, while air cannot obtain buoyance in the air, air can play a role of absorbing impact or a role of slowing down fall velocity. Therefore, as gas which fills inside of the buoyance unit 120, it is also possible to select air itself or gas of the mass equivalent to the mass of air.

For example, the size of the flight vehicle 100 can be made smaller than 110 cm (height)×90 cm (width)×90 cm (depth).

[Internal Configuration Example of Flight Vehicle Control Apparatus]

Figure 2A:
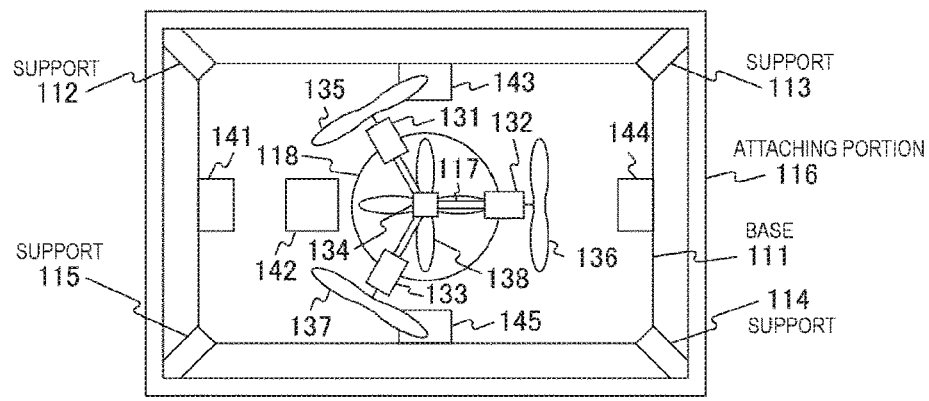
FIGS. 2a, 2b, and 2c are external views illustrating an internal configuration example of a flight vehicle control apparatus 110 according to the first embodiment of the present technology.
Figure 2B:
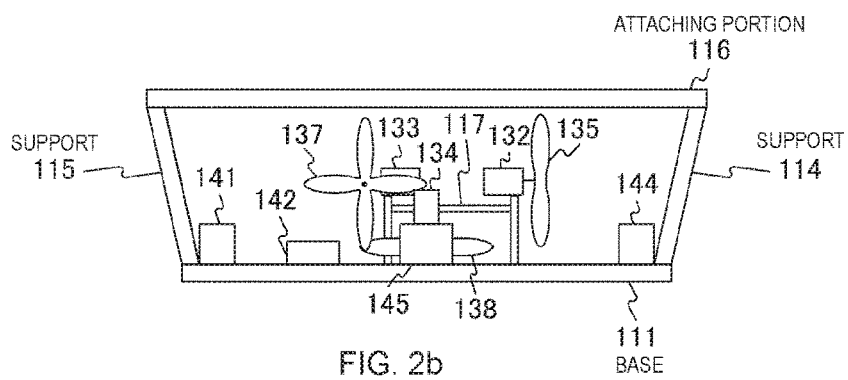
Figure 2C:
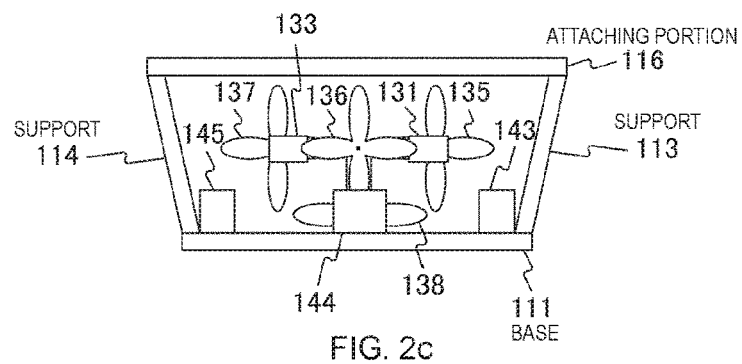

FIGS. 2a, 2b, and 2c are external views illustrating an internal configuration example of the flight vehicle control apparatus 110 according to the first embodiment of the present technology. FIG. 2a illustrates a top view of the flight vehicle control apparatus 110 in the case where the flight vehicle control apparatus 110 is removed from the buoyance unit 120, FIG. 2b illustrates a front view of the flight vehicle control apparatus 110 and FIG. 2c illustrates a side view (right side view) of the flight vehicle control apparatus 110.

The flight vehicle control apparatus 110 includes a base 111, supports 112 to 115, an attaching portion 116, a supporting portion 117, motors 131 to 134, propellers 135 to 138, imaging units 141 and 142, and sensors 143 to 145.

The base 111 has a rectangle shape, and supports 112 to 115 are provided at four tips of the base 111. Further, the attaching portion 116 is provided at upper portions of the supports 112 to 115. Further, around the center of the base 111, a hole 118 through which air generated by rotation of the propeller 138 flows is provided.

The attaching portion 116 is provided to fix the buoyance unit 120 and the flight vehicle control apparatus 110 illustrated in FIGS. 1a, 1b, and 1c.

Further, at the base 111, the supporting portion 117, the imaging units 141 and 142, and the sensors 143 to 145 are provided. Further, at the supporting portion 117, the motors 131 to 134 are provided. The propeller 135 is connected to the motor 131, the propeller 136 is connected to the motor 132, the propeller 137 is connected to the motor 133, and the propeller 138 is connected to the motor 134. Further, at the base 111, a hole 118 through which wind generated by rotation of the propeller 138 flows is provided.

The propellers 135 to 138 are provided to convert rotation of the motors 131 to 134 into propulsion. Further, the propellers 135 to 137 are disposed so as to face in three directions at equal intervals in a horizontal direction of the flight vehicle control apparatus 110. The propeller 138 is disposed so as to face in a vertical direction of the flight vehicle control apparatus 110. In this manner, the propellers 135 to 138 function as a propulsion unit of the flight vehicle 100.

In this manner, the flight vehicle control apparatus 110 opens in the horizontal direction at portions other than the supports 112 to 115. Further, the propulsion by the propellers 135 to 137 enables the flight vehicle 100 to proceed in the horizontal direction. Still further, the propulsion by the propeller 138 enables the flight vehicle 100 to move upward and downward in the vertical direction (gravity direction). Further, by a control unit 152 illustrated in FIG. 3 controlling the motors 131 to 134, it is possible to move the flight vehicle 100 to desired directions in three-dimensional space.

Note that FIGS. 2a, 2b, and 2c illustrate an example of the flight vehicle control apparatus which uses four propellers including rotational axes in the horizontal direction and in the vertical direction as the propulsion for performing movement in three-dimensional space. However, this flight vehicle control apparatus is an example, and other flight vehicle control apparatuses can be used. The modified examples will be illustrated in FIGS. 22a, 22b, and 22c to FIGS. 24a, 24b, and 24c.

The imaging units 141 and 142 which are image sensors that image a subject to generate image data, output the generated image data to the control unit 152. The imaging units 141 and 142 may be fixed to image a subject in a specific direction (for example, downward in the vertical direction) or may be movable to image a subject in each direction.

As the imaging units 141 and 142, for example, a sensor which can detect motion of light can be used. This sensor is, for example, an image sensor (imaging element) such as a complementary metal oxide semiconductor image sensor (CMOS) and a charge coupled device (CCD).

The sensors 143 to 145 are various kinds of sensors other than the image sensor. For example, it is possible to mount various kinds of sensors which can detect information which can be substituted for five senses of a human at the flight vehicle control apparatus 110.

For example, it is possible to use a sensor which can detect physical motion. This sensor is, for example, a biaxial flow sensor which can detect velocity and a direction of a fluid, an acceleration sensor which can detect vibration, a non-contact temperature sensor which can detect a temperature and motion, or a pressure sensor which can detect a pressure. Further, for example, this sensor is an altitude sensor which can detect height, or a distance sensor which can detect a distance to an object. Further, this sensor is, for example, a location sensor (for example, a global positioning system (GPS)) which can detect a current location. Further, this sensor is, for example, an angular velocity sensor which can detect angular velocity, an angular sensor which can detect a rotation angle, a motion sensor which can detect motion of an object or a sound sensor which can detect sound.

Each of these sensors can be mounted on the flight vehicle control apparatus 110. Among these sensors, one to three sensors can be mounted on the flight vehicle control apparatus 110 as the sensors 143 to 145. Note that, while FIGS. 2a, 2b, and 2c illustrate only three sensors 143 to 145 to simplify explanation, one, two or four or more sensors may be mounted on the flight vehicle control apparatus 110. Further, each sensor described here is a typical example of general sensors, and other sensors which can acquire various kinds of information may be used. Further, a large scale integration (LSI) which controls each of these sensors is mounted on the flight vehicle control apparatus 110.

For example, a case is assumed where sensors which can detect an obstacle are provided in four directions (or eight directions) in the horizontal direction of the flight vehicle control apparatus 110. In this case, in the case where an obstacle is detected by each of these sensors, the control unit 152 (illustrated in FIG. 3) can control the motors 131 to 133 so as to avoid a direction in which the obstacle is detected.

Further, for example, a case is assumed where sensors which can detect an obstacle are provided in two directions in the vertical direction of the flight vehicle control apparatus 110. In this case, in the case where an obstacle is detected by each of these sensors, the control unit 152 can control the motor 134 so as to avoid a direction in which the obstacle is detected.

Further, for example, a case is assumed where sensors which can detect a location where flame burns (for example, a temperature sensor which detects a temperature, an image sensor which detects color of flame) are provided in the horizontal direction or in the vertical direction of the flight vehicle control apparatus 110. In this case, in the case where a location where burning of flame, or the like, occurs is detected by each of these sensors, the control unit 152 can judge such a location as a dangerous location. In this manner, the control unit 152 can control the motors 131 to 134 to avoid a location which is judged as the dangerous location. For example, the control unit 152 can control the motors 131 to 134 to move in a direction opposite to a direction of the location which is judged as the dangerous location. Further, also in the case where dangerous locations other than the location where flame burns are detected, the control unit 152 can similarly control the motors 131 to 314 to avoid the locations. In this manner, the control unit 152 can detect a dangerous location in the air on the basis of information of surroundings of the flight vehicle 100 and can control movement of the flight vehicle 100 so as to avoid the detected dangerous location. By this means, it is possible to prevent the flight vehicle 100 from autonomously going to a dangerous location with a high temperature due to flame, or the like. That is, because it is possible to perform setting so that the flight vehicle 100 does not go to a location which is dangerous to approach, it is possible to avoid a risk such as occurrence of a fire.

Note that arrangement of each of the imaging units 141 and 142, and the sensors 143 to 145 illustrated in FIGS. 2a, 2b, and 2c are examples, and other arrangement may be employed. Further, by adding a sensor, it is possible to improve information-gathering capabilities of the flight vehicle control apparatus 110.

Further, for example, it is also possible to employ a configuration where each sensor can be mounted at the upper side or the lower side of the base 111 of the flight vehicle control apparatus 110 or at other locations of the flight vehicle control apparatus 110. In this case, a sensor which is not used is made detachable. Further, the mounted sensor is connected to the control unit 152 (illustrated in FIG. 3) through wired communication or radio communication.

[Functional Configuration Example of Flight Vehicle Control Apparatus]

Figure 3:
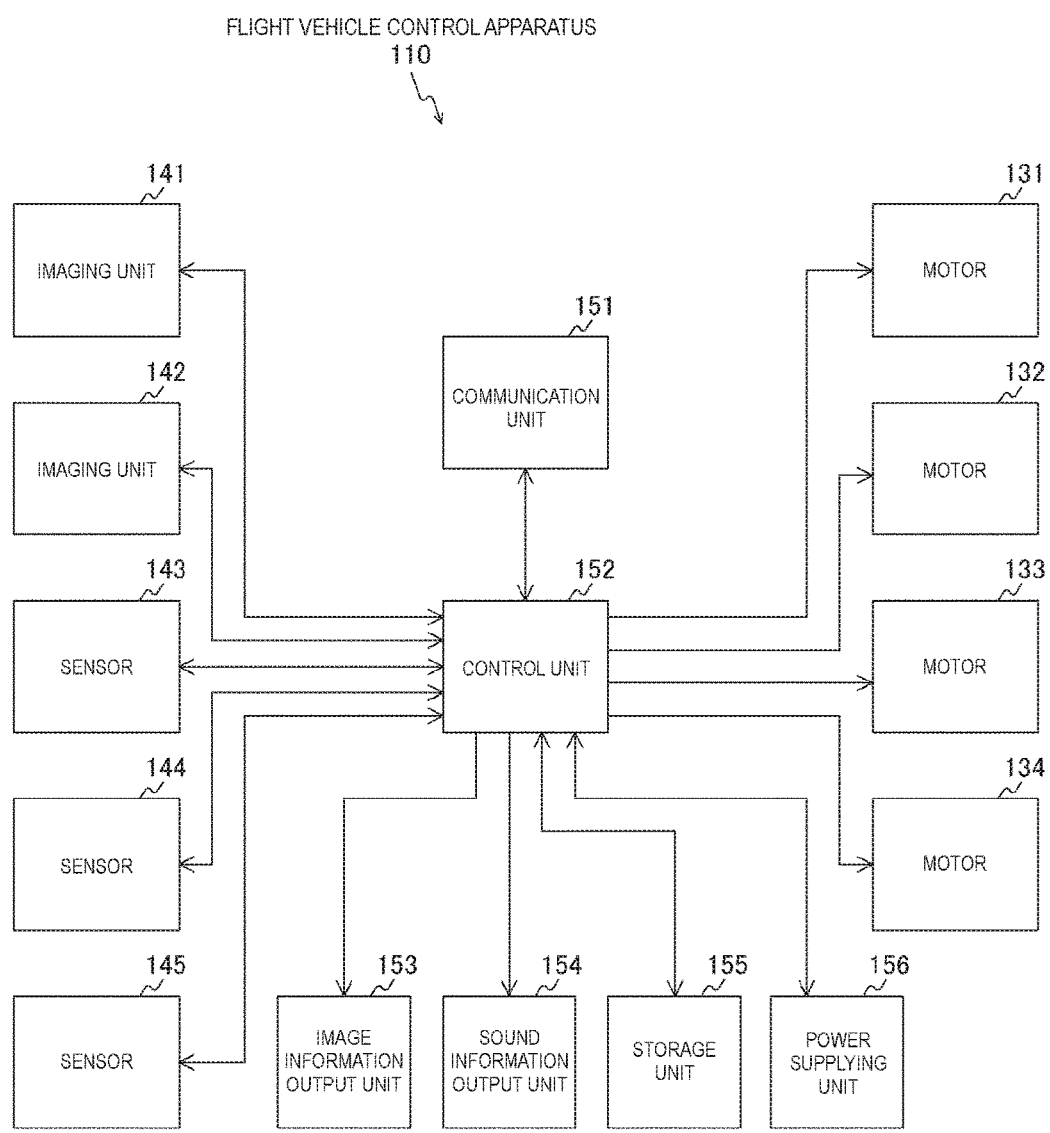
FIG. 3 is a block diagram illustrating a functional configuration example of the flight vehicle control apparatus 110 according to the first embodiment of the present technology.

FIG. 3 is a block diagram illustrating a functional configuration example of the flight vehicle control apparatus 110 according to the first embodiment of the present technology.

The flight vehicle control apparatus 110 includes motors 131 to 134, imaging units 141 and 142, sensors 143 to 145, a communication unit 151, a control unit 152, an image information output unit 153, a sound information output unit 154, a storage unit 155 and a power supplying unit 156. Note that the motors 131 to 134, the imaging units 141 and 142 and the sensors 143 to 145 correspond to those having the same name illustrated in FIGS. 2a, 2b, and 2c. Further, the flight vehicle control apparatus 110 is an example of the information processing apparatus recited in the claims. Further, the imaging units 141 and 142, and the sensors 143 to 145 are an example of an acquiring unit recited in the claims.

The communication unit 151 is a radio communication unit (for example, a cellular modem, a wireless LAN modem) for transmitting/receiving radio waves via an antenna (not illustrated). As this radio communication, for example, radio communication using a near field radio communication scheme can be utilized. As this near field radio communication scheme, for example, wireless local area network (LAN) can be utilized. As this wireless LAN, for example, wireless fidelity (Wi-Fi) can be used. Further, radio communication may be performed by utilizing other communication schemes. For example, radio communication may be performed using millimeter-wave communication (such as 60 GHz), 5 GHz wireless LAN, ultra wide band (UWB), or visible light communication. Further, for example, radio communication may be performed using near field communication (NFC), Bluetooth (registered trademark), or infrared light. Further, as other communication schemes, for example, a wired communication scheme (wired LAN) may be utilized.

Further, the communication unit 151 may perform radio communication using a plurality of communication schemes. For example, radio communication may be performed using a communication scheme utilizing public wireless communication and a near field radio communication scheme. Note that the communication scheme utilizing public wireless communication is, for example, a communication scheme complying with 3rd generation partnership project (3GPP) standards. The 3GPP standards are, for example, wideband code division multiple access (W-CDMA), or, for example, global system for mobile communications (GSM) (registered trademark), or, for example, worldwide interoperability for microwave access (WiMAX), WiMAX2, long term evolution (LTE) or LTE-Advanced (LTE-A).

Figure 7:
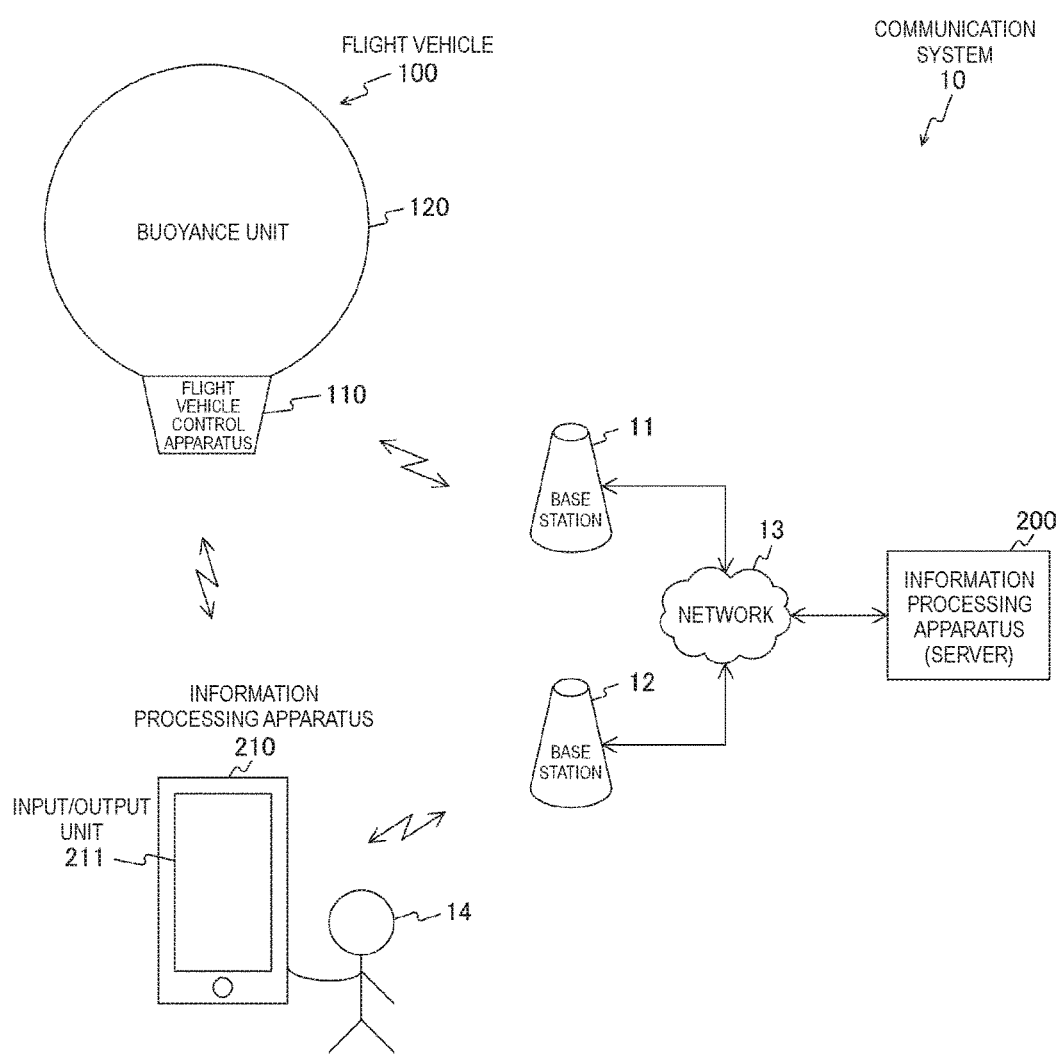
FIG. 7 is a diagram illustrating a system configuration example of a communication system 10 according to the first embodiment of the present technology.

In this manner, because the flight vehicle control apparatus 110 includes the communication unit 151, the flight vehicle control apparatus 110 can perform radio communication with other information processing apparatuses (for example, an information processing apparatus 210 illustrated in FIG. 7).

The control unit 152 controls each unit of the flight vehicle control apparatus 110 on the basis of a program stored in the storage unit 155. The control unit 152 is, for example, implemented with a central processing unit (CPU).

For example, the control unit 152 controls movement of the flight vehicle 100 on the basis of at least one of the information relating to the flight vehicle 100 and the information of the surroundings of the flight vehicle 100. Further, for example, the control unit 152 performs control to record image data generated by the imaging units 141 and 142 along with control of the movement. In this case, the control unit 152 can record the image data generated by the imaging units 141 and 142 in the case where the information acquired by the imaging units 141 and 142 and the sensors 143 to 145 satisfies a predetermined condition.

For example, the control unit 152 can detect a dog included in the image data generated by the imaging unit 141 and can control the flight vehicle 100 to move in a direction in which this dog exists. In this case, the control unit 152 can record the image data generated by the imaging unit 141 in the case where the size or expression of the dog included in the image data generated by the imaging unit 141 satisfies a predetermined condition (for example, in the case where the size is equal to or larger than a threshold, or in the case where the dog shows smile expression). Further, for example, the control unit 152 can record the image data generated by the imaging unit 141 in the case where change of the size or expression of the dog included in the image data generated by the imaging unit 141 is equal to or greater than a threshold.

Further, for example, the control unit 152 may perform authentication processing to allow only a person registered in advance to use the flight vehicle at a timing before operation of the flight vehicle control apparatus 110 (operation for floating the flight vehicle 100 in the air) is started (or at a timing at which the flight vehicle control apparatus 110 is powered on). For example, the control unit 152 can perform biometric authentication (for example, face authentication, iris authentication) on the basis of the image data generated by the imaging units 141 and 142. In this manner, by the flight vehicle control apparatus 110 having a security function, it is possible to further improve safety.

Figure 11A:
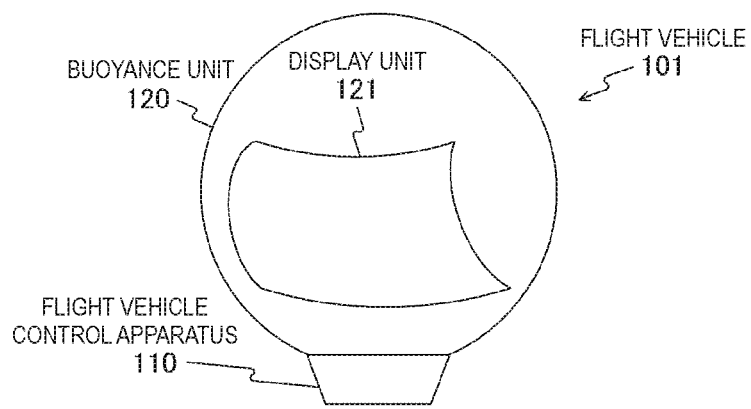
FIGS. 11a and 11b are diagrams illustrating an external configuration example of the flight vehicle 101 according to the first embodiment of the present technology.
Figure 11B:
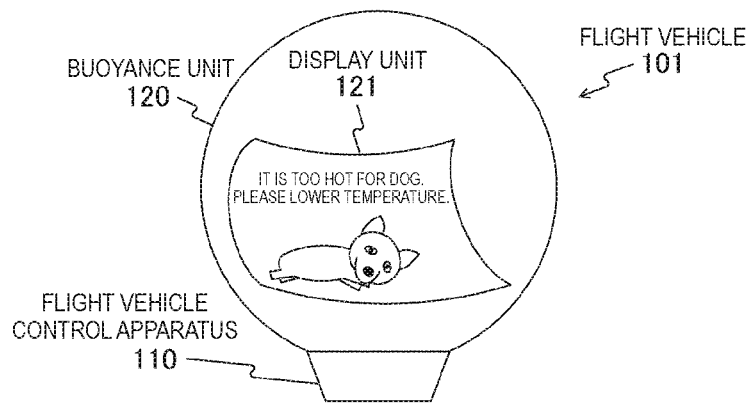

The image information output unit 153 outputs each image information on the basis of control by the control unit 152. As the image information output unit 153, for example, a display panel (display) such as an organic electro luminescence (EL) panel and a liquid crystal display (LCD) panel can be used. Further, as illustrated in FIGS. 11*a* and 11*b*, it is possible to provide a display unit 121 at the buoyance unit 120 and display image information at the display unit 121.

The sound information output unit 154 outputs each sound information on the basis of control by the control unit 152. As the sound information output unit 154, for example, a speaker can be used.

The storage unit 155 is a memory which stores each information. For example, in the storage unit 155, a program and various kinds of data to be used when the control unit 152 executes each processing are stored. Further, in the storage unit 155, each information acquired by the imaging units 141 and 142 and the sensors 143 to 145 is recorded on the basis of control by the control unit 152. For example, image data or sound data is recorded. Further, each information stored in the storage unit 155 is read out on the basis of control by the control unit 152.

The power supplying unit 156 supplies power to each unit of the flight vehicle control apparatus 110 on the basis of control by the control unit 152. As the power supplying unit 156, for example, a rechargeable battery (secondary battery) can be used. Further, for example, it is also possible to provide a solar cell at at least one of the flight vehicle control apparatus 110 and the buoyance unit 120 and accumulate power output from this solar cell in the rechargeable battery. In this manner, by mounting the rechargeable battery and the solar cell at the flight vehicle control apparatus 110, it is possible to realize the flight vehicle control apparatus 110 which can generate and accumulate power within the own apparatus.

[Example of Flow of Air]

Figure 4A:
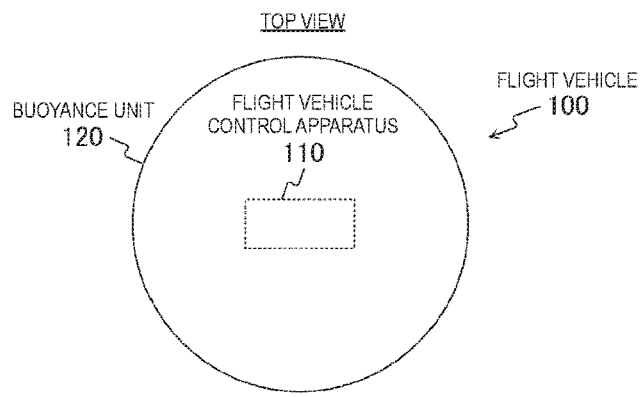
FIGS. 4a, 4b, and 4c are diagrams illustrating an example of flow of air for generating lift required for ascending the flight vehicle according to the first embodiment of the present technology.
Figure 4B:
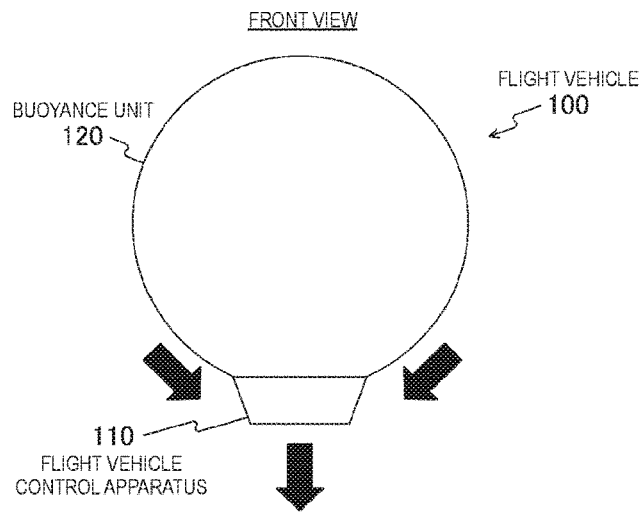
Figure 4C:
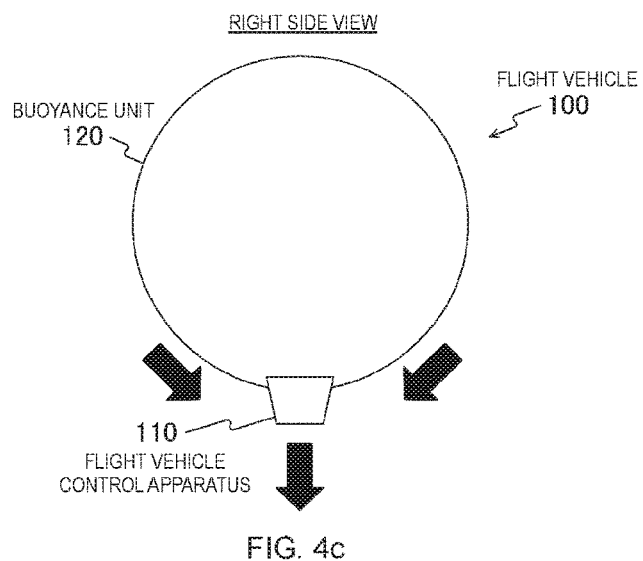

FIGS. 4*a*, 4*b*, and 4*c* are diagrams illustrating an example of flow of air for generating lift required for ascending the flight vehicle 100 according to the first embodiment of the present technology. Note that FIGS. 4*a*, 4*b*, and 4*c* schematically illustrates part of the flow of the air for generating lift required for ascending the flight vehicle 100 with a thick arrow. Note that FIGS. 4*a*, 4*b*, and 4*c* are similar to FIGS. 1*a*, 1*b*, and 1*c* except that the thick arrows are added in b and c in FIGS. 4*b* and 4*c*.

Here, the flight vehicle 100 can autonomously move in the vertical direction using principle of action and reaction on the basis of flow of air generated through rotation, or the like, of the propeller 138 provided at the flight vehicle control apparatus 110. For example, flow of air is generated downward from the flight vehicle control apparatus 110 through rotation of the propeller 138. In this manner, it is possible to obtain lift as reaction generated by the propeller 138 pushing out air downward.

Here, force as action of pushing out air downward from the flight vehicle control apparatus 110 can be expressed with the following equation:

$$F = ma$$

Here, m indicates mass of the air, and a indicates acceleration of the air.

It is possible to obtain lift as force of −F (that is, upward force F) which is reaction of this downward force F.

Here, a case is assumed where the flight vehicle 100 is used outdoors. In this case, as described above, in the case where the flight vehicle 100 is made to autonomously ascend, a degree of the ascension increases, and it is assumed that the flight vehicle 100 may ascend too high. Also in such a case, it is important to make the flight vehicle 100 fly appropriately through appropriate control. Therefore, FIG. 5 illustrates a control example in the vertical direction.

[Operation Example of Flight Vehicle]

Figure 5:
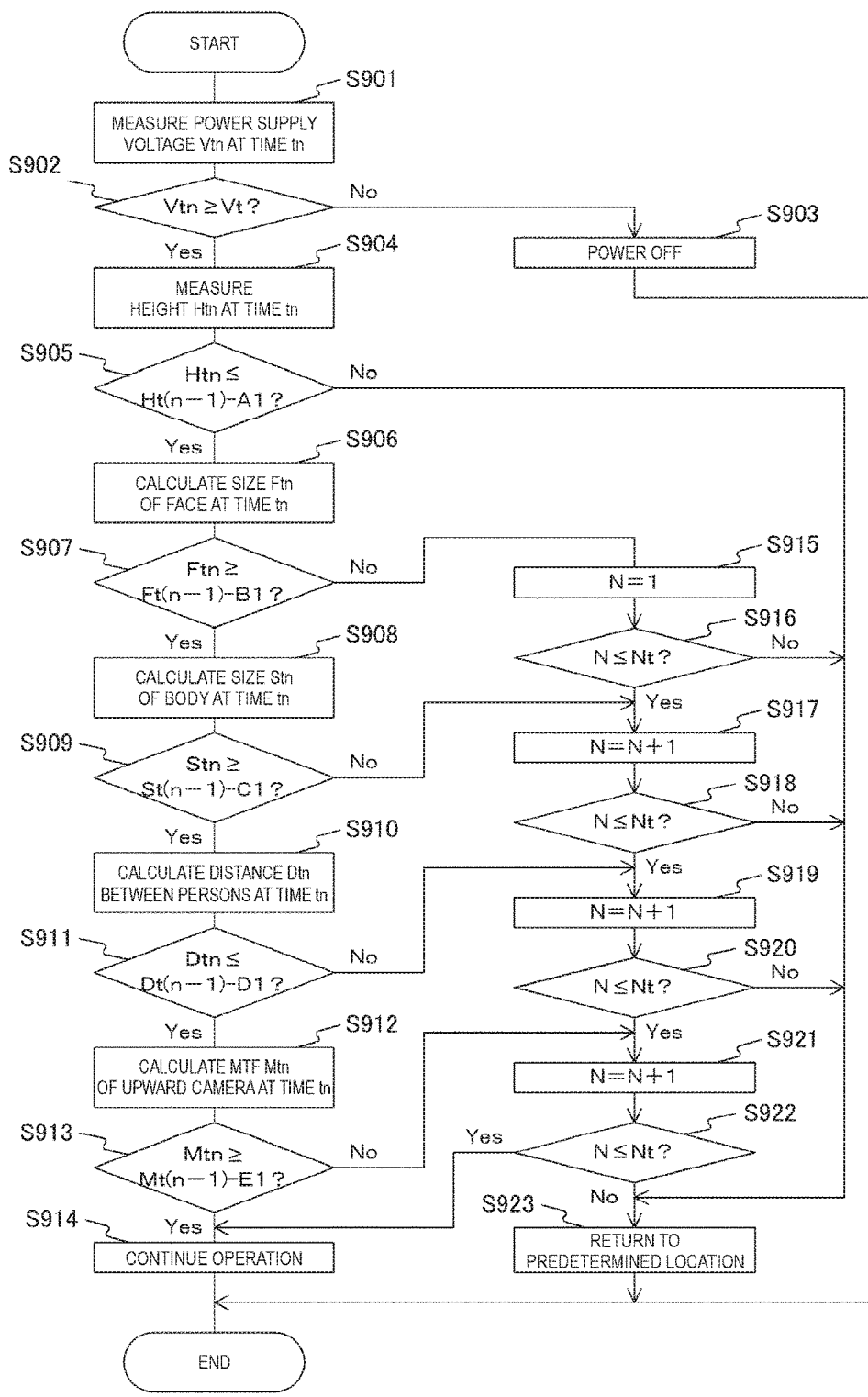
FIG. 5 is a flowchart illustrating an example of a processing procedure of movement control processing by the flight vehicle control apparatus 110 according to the first embodiment of the present technology.

FIG. 5 is a flowchart illustrating an example of a processing procedure of movement control processing by the flight vehicle control apparatus 110 according to the first embodiment of the present technology.

First, the control unit 152 measures a power supply voltage Vtn at a timing of time tn (step S901). Here, an index tn indicates that a value is acquired at a timing of time tn. Further, the same will also apply hereinafter to an index tn of each character. Note that description will be provided assuming that each value acquired hereinafter is acquired at the timing of time tn in a similar manner to simplify the explanation although there is a case where the timing is before or after the timing of time tn.

Subsequently, the control unit 152 judges whether or not the power supply voltage Vtn is equal to or greater than a threshold Vt by comparing the power supply voltage Vtn which is the measurement result with the threshold Vt (step S902). In the case where the power supply voltage Vtn is less than the threshold Vt (step S902), the control unit 152 powers off the flight vehicle control apparatus 110 to finish operation of the movement control processing. However, in the case where the flight vehicle 100 exists in the air, the processing proceeds to step S923, and the control unit 152 performs control to return the flight vehicle 100 to a predetermined location.

In the case where the power supply voltage Vtn is equal to or greater than the threshold Vt (step S902), the control unit 152 measures height Htn at the timing of time tn (step S904). For example, any of the sensors 143 to 145 can be made an altitude sensor, so that the control unit 152 can acquire height information measured by this altitude sensor.

Subsequently, the control unit 152 compares the height Htn which is the measurement result with height Ht(n−1) measured at a timing of time t(n−1) immediately before the time tn (step S905). The control unit 152 then judges whether or not the height Htn is less than or equal to a difference value between the height Ht(n−1) and a fixed value A1 (step S905). That is, the control unit 152 judges whether or not the flight vehicle 100 ascends rapidly.

In the case where the height Htn is greater than the difference value between the height Ht(n−1) and the fixed value A1 (step S905), the control unit 152 performs control to return the flight vehicle 100 to a predetermined location (step S923). The control unit 152, for example, controls the motor 134 to rotate at low speed, stop, inversely rotate, or the like, while taking into account descending speed to thereby perform control so that the flight vehicle 100 descends slowly to return to the ground. Further, for example, also in the case where power of the power supply is insufficient, it is preferable to perform setting so that the flight vehicle 100 can return to the ground slowly by appropriate load being applied to the propeller 138 to rotate the propeller 138.

In the case where the height Htn is less than or equal to the difference value between the height Ht(n−1) and the fixed value A1 (step S905), the control unit 152 calculates a size Ftn of the face at the timing of time tn (step S906). For example, an imaging range of one of the imaging units 141 and 142 is set downward. Then, the face included in the image data generated by the imaging unit whose imaging range is set downward is detected. As this detection method, for example, a detection method through matching between a template in which luminance distribution information of an object (for example, face of a human, a horse, a fish) is recorded and an actual image (see, for example, JP 2004-133637A) can be used. Further, it is also possible to use a face detection method on the basis of a characteristic amount, or the like, of a fleshed-color portion or the face of a human included in an image.

Note that, in the case where a plurality of faces are included in the image data generated by the imaging unit, an average value of the sizes of the plurality of faces may be set as Ftn, or a size of one of the maximum, medium-sized and minimum sizes of the plurality of faces may be set as Ftn.

Subsequently, the control unit 152 compares the size Ftn of the face which is the measurement result with a size Ft(n−1) of the face measured at a timing of time t(n−1) immediately before the time tn (step S907). The control unit 152 then judges whether or not the size Ftn of the face is equal to or greater than a difference value between the size Ft(n−1) of the face and a fixed value B1 (step S907).

In the case where the size Ftn of the face is less than the difference value between the size Ft(n−1) of the face and the fixed value B1 (step S907), the control unit 152 sets 1 as N (step S915) and judges whether or not N is less than or equal to a threshold Nt (step S916). In the case where N exceeds the threshold Nt (step S916), the processing proceeds to step S923. Further, in the case where N is less than or equal to the threshold Nt (step S916), the processing proceeds to step S917.

In the case where the size Ftn of the face is equal to or greater than the difference value between the size Ft(n−1) of the face and the fixed value B1 (step S907), the control unit 152 calculates a size Stn of a body of a person at the timing of time tn (step S908). For example, a person included in the image data generated by the imaging unit provided at a lower side is detected. As this person detection method, for example, a detection method of detecting an object (a human body, an animal, a train, a car, or the like) included in the image using a gradient magnitude and a gradient direction of luminance in the image can be used (see, for example, JP 2010-67102A).

Note that, in the case where a plurality of persons are included in the image data generated by the imaging unit, an average value of the sizes of human bodies of the plurality of persons may be set as Stn, or a size of one of the maximum, medium and minimum sizes of the plurality of persons may be set as Stn.

Subsequently, the control unit 152 compares the size Stn of the human body which is the measurement result with a size St(n−1) of the human body measured at a timing of time t(n−1) immediately before the time tn (step S909). The control unit 152 then judges whether or not the size Stn of the human body is equal to or greater than a difference value between the size Ft (n−1) of the human body and a fixed value C1 (step S909).

In the case where the size Stn of the human body is less than the difference value between the size St(n−1) of the human body and the fixed value C1 (step S909), the control unit 152 sets N+1 as N (step S917) and judges whether or not N is less than or equal to a threshold Nt (step S918). In the case where N exceeds the threshold Nt (step S918), the processing proceeds to step S923. Alternatively, in the case where N is less than or equal to the threshold Nt (step S918), the processing proceeds to step S919.

In the case where the size Stn of the human body is equal to or greater than the difference value between the size St(n−1) of the human body and the fixed value C1 (step S909), the control unit 152 calculates a distance Dtn between persons at the timing of time tn (step S910). For example, as described above, a person included in the image data generated by the imaging unit provided at the lower side is detected, and, in the case where a plurality of persons are included in the image, the control unit 152 calculates a distance between the plurality of persons (distances in the image). Note that, in the case where three or more persons are included in the image data, an average value of the distances between respective persons may be set as Dtn, or one of the maximum, medium and minimum distances among the plurality of distances may be set as Dtn.

Subsequently, the control unit 152 compares a distance Dtn between the persons which is the measurement result with a distance Dt(n−1) measured at a timing of time t(n−1) immediately before the time tn (step S911). The control unit 152 then judges whether or not the distance Dtn between the persons is less than or equal to a difference value between the distance Dt(n−1) between the persons and a fixed value D1 (step S911).

In the case where the distance Dtn between the persons exceeds the difference value between the distance Dt(n−1) between the persons and the fixed value D1 (step S911), the control unit 152 sets N+1 as N (step S919) and judges whether or not N is less than or equal to a threshold Nt (step S920). In the case where N exceeds the threshold Nt (step S920), the processing proceeds to step S923. Further, in the case where N is less than or equal to the threshold Nt (step S920), the processing proceeds to step S921.

In the case where the distance Dtn between the persons is less than or equal to the difference value between the distance Dt(n−1) between the persons and the fixed value D1 (step S911), the control unit 152 acquires a modulation transfer function (MTF) of the imaging unit (step S912). That is, the control unit 152 acquires the MTF of the imaging unit which is provided to face upward at the flight vehicle control apparatus 110 at the timing of time tn (step S912). Here, the MTF is one of indexes indicating performance of the lens and indicates a recall of the contrast for each image height (distance from the center of the screen). Note that the MTF changes in accordance with a focus distance f, an aperture, a location of the focus lens, or the like. Further, if the type of the lens is different, characteristics of the MTF often largely change. Therefore, MTFs according to states of respective optical members (such as the location of the focus lens) are held as specific information (optical member information relating to the optical members) in the flight vehicle control apparatus 110 in association with the respective states. Accordingly, the control unit 152 can acquire the held MTFs.

Subsequently, the control unit 152 compares the MTF Mtn with MTF Mt(n−1) acquired at a timing of time t(n−1) immediately before the time to (step S913). The control unit 152 then judges whether or not MTF Mtn is equal to or greater than a difference value between MTF Mt(n−1) and a fixed value E1 (step S913).

In the case where MTF Mtn is less than the difference value MTF Mt(n−1) and the fixed value E1 (step S913), the control unit 152 sets N+1 as N (step S921) and judges whether or not N is less than or equal to the threshold Nt (step S922). In the case where N exceeds the threshold Nt (step S922), the processing proceeds to step S923. Further, in the case where N is less than or equal to the threshold Nt (step S922), the processing proceeds to step S914.

Further, in the case where MTF Mtn is equal to or greater than the difference value between MTF Mt(n−1) and the fixed value E1 (step S913), the control unit 152 continuously performs current operation (step S914).

In this manner, the flight vehicle 100 can be appropriately returned to the ground on the basis of the information (for example, sound, height, an image) acquired by each sensor or through each function (for example, image recognition) for processing the information.

In this manner, even in the case where the flight vehicle 100 almost flies to the sky, it is possible to perform control to return the flight vehicle 100 to the predetermined location on the basis of the information acquired by each sensor. By this means, it is possible to use the flight vehicle 100 with security also outdoors other than indoors.

Note that it is also possible to perform, for example, speech recognition of a person or speech synthesis other than specific recognition of a person through image recognition and appropriately return the flight vehicle 100 to the ground on the basis of the processing result.

[Operation Example of Flight Vehicle]

Figure 6:
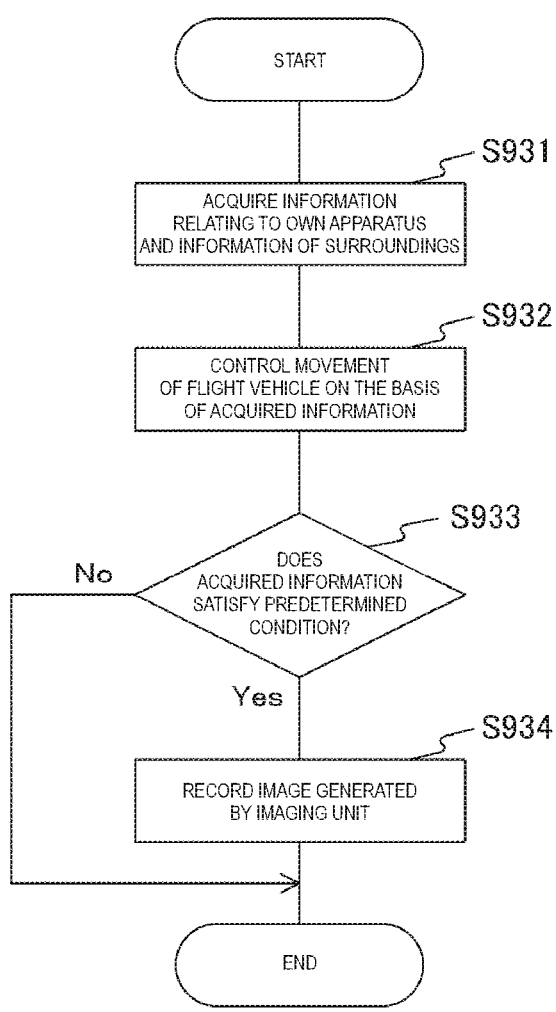
FIG. 6 is a flowchart illustrating an example of a processing procedure of imaging control processing by the flight vehicle control apparatus 110 according to the first embodiment of the present technology.

FIG. 6 is a flowchart illustrating an example of a processing procedure of imaging control processing by the flight vehicle control apparatus 110 according to the first embodiment of the present technology.

First, the control unit 152 acquires information relating to the own apparatus and information of surroundings (step S931). Subsequently, the control unit 152 controls movement of the flight vehicle 100 on the basis of the acquired each information (step S932). Note that step S932 is an example of a first procedure recited in the claims.

Subsequently, the control unit 152 judges whether or not the acquired each information satisfies a predetermined condition (step S933). For example, the control unit 152 can judge whether or not sound acquired by the sound sensor is equal to or greater than a threshold. In this case, for example, it is possible to record an atmosphere at a timing at which a number of people who take part in a party have conversations at the party. Further, for example, it is also possible to judge whether or not specific sound (for example, sound of a dog, cry of a baby, laugh) acquired by the sound sensor is equal to or greater than a threshold. Further, for example, the control unit 152 can judge whether or not a temperature acquired by the temperature sensor is equal to or greater than a threshold. For example, it is possible to record a scene at an appropriate timing in the case where an indoor temperature increases by temperatures of a number of people who take part in a party at the party. Further, for example, it is also possible to judge that a predetermined condition is satisfied in the case where a change amount of each acquired information is equal to or greater than a threshold. For example, in the case where a change amount of specific sound (for example, sound of a dog, cry of a baby, laugh) is equal to or greater than a threshold, it is assumed that there is change in the object. For example, in the case where sound of a dog becomes small, it is estimated that the dog stops barking. Further, for example, in the case where there is no longer cry of a baby, there is a possibility that the baby smiles. Further, for example, in the case where laugh becomes small, there is a possibility that the laughing person shows normal expression. Therefore, it is possible to record a state of the object at an appropriate timing after change of the object.

In the case where the acquired each information satisfies the predetermined condition (step S933), the control unit 152 performs control to record the image data generated by the imaging unit (imaging units 141 and 142) provided at the flight vehicle 100 in the storage unit 155 (step S934). For example, the control unit 152 can at least partially use the information to be used for controlling movement of the flight vehicle 100 as information to be used for controlling recording of the image data generated by the imaging unit. For example, in the case where specific sound (for example, sound of a dog, cry of a baby) is acquired by the sound sensor, the control unit 152 performs control to move the flight vehicle 100 in a direction in which the specific sound is generated. In this case, in the case where the imaging unit is movable, the control unit 152 moves the flight vehicle 100 and performs control so that an optical axis direction of the imaging unit matches the direction in which the specific sound is generated. Further, for example, information (for example, a characteristic amount) for detecting the specific sound and information (for example, a template image, a characteristic amount) for detecting an object (for example, a dog, a baby) which generates the specific sound from the image data are stored in association with each other. The control unit 152 then detects an object (for example, a dog, a baby) which generates the specific sound (for example, sound of a dog, cry of a baby) from the image data generated by the imaging unit and controls the optical axis direction of the imaging unit so that the object becomes the center of the image. Further, for example, the control unit 152 can perform control to record the image data generated by the imaging unit on the basis of a timing at which the specific sound is acquired. For example, the control unit 152 can record the image data generated by the imaging unit at predetermined intervals (for example, at an interval of five seconds, five seconds→four seconds→three seconds→two seconds→ . . . ) from a time point at which the specific sound is acquired or at random intervals. Further, for example, in the case where a specific object (for example, a dog, a baby) is detected from the image data generated by the imaging unit, the control unit 152 performs control to move the flight vehicle 100 in a direction in which the specific object exists. In this case, in the case where the imaging unit is movable, the control unit 152 moves the flight vehicle 100 and performs control so that the optical axis direction of the imaging unit matches the direction in which the specific object exists. Further, for example, the control unit 152 can perform control to record the image data generated by the imaging unit on the basis of a timing at which the specific object is detected. For example, the control unit 152 can record the image data generated by the imaging unit at predetermined intervals from a time point at which the specific object is detected or while narrowing the intervals. Note that step S933 and step S934 are an example of a second procedure recited in the claims.

In this manner, it is possible to automatically photograph an image even if the user performs photographing with a camera in his/her hand. For example, it is possible to easily photograph an image from other viewpoints without using a tripod. By this means, it is possible to record an interesting image.

In this manner, the information acquired by the flight vehicle 100 is used in the case where the flight vehicle 100 autonomously moves. However, it is also possible to connect the flight vehicle 100 to other apparatuses or network by utilizing radio communication and utilize the information acquired by the flight vehicle 100 at other apparatuses or the Internet (for example, cloud service). Note that the cloud service is, for example, service provided by one or more information processing apparatuses (for example, servers) existing on the network. Further, the cloud service is one of a utilization form of a computer which utilizes the Internet. Therefore, FIG. 7 illustrates an example where the flight vehicle 100 is connected to other apparatuses or network by utilizing radio communication.

[Configuration Example of Communication System]

FIG. 7 is a diagram illustrating a system configuration diagram of a communication system 10 according to the first embodiment of the present technology.

The communication system 10 includes base stations 11 and 12, a network 13, a flight vehicle 100 and information processing apparatuses 200 and 210.

The base stations 11 and 12 are base stations (for example, access points, mobile communication base stations) connecting the flight vehicle 100 or the information processing apparatus 210 and the network 13 by utilizing radio communication.

The network 13 is a network (for example, a public network) such as a telephone network and the Internet. Further, the network 13 and the information processing apparatus (server) 200 are connected via a gateway (not illustrated).

The information processing apparatus (server) 200 is one or more information processing apparatuses which provide various kinds of service via the network 13. For example, the information processing apparatus (server) 200 provides cloud service to each equipment connected via the network 13.

The information processing apparatus 210 is a portable information processing apparatus (for example, a smartphone, a mobile phone, a tablet terminal).

For example, the communication unit 151 of the flight vehicle control apparatus 110 can exchange each information by directly connecting to the information processing apparatus 210 by utilizing radio communication (for example, wireless LAN). Further, for example, the communication unit 151 of the flight vehicle control apparatus 110 can exchange each information with other information processing apparatuses (for example, information processing apparatuses 200 and 210) by connecting to the base stations 11 and 12 by utilizing radio communication (for example, wireless LAN, a public network).

In this manner, the flight vehicle 100 can be connected to other apparatuses by utilizing radio communication and provide the information acquired at the flight vehicle 100 to the other apparatuses.

Further, the flight vehicle 100 may autonomously move and move on the basis of instructions from other information processing apparatuses (for example, the information processing apparatuses 200 and 210). For example, the user 14 who has the information processing apparatus 210 can operate the flight vehicle 100 by connecting the information processing apparatus 210 and the flight vehicle 100 by utilizing radio communication and operating the information processing apparatus 210.

In this manner, because the flight vehicle 100 can be connected to the network 13, it is possible to utilize information, knowledge and wisdom by utilizing the Internet or cloud.

Further, for example, it is possible to operate operation of the flight vehicle 100 by utilizing an existing smartphone, or the like. Further, it is possible to easily confirm each information collected by the flight vehicle 100 using the existing smartphone, or the like.

Figure 8:
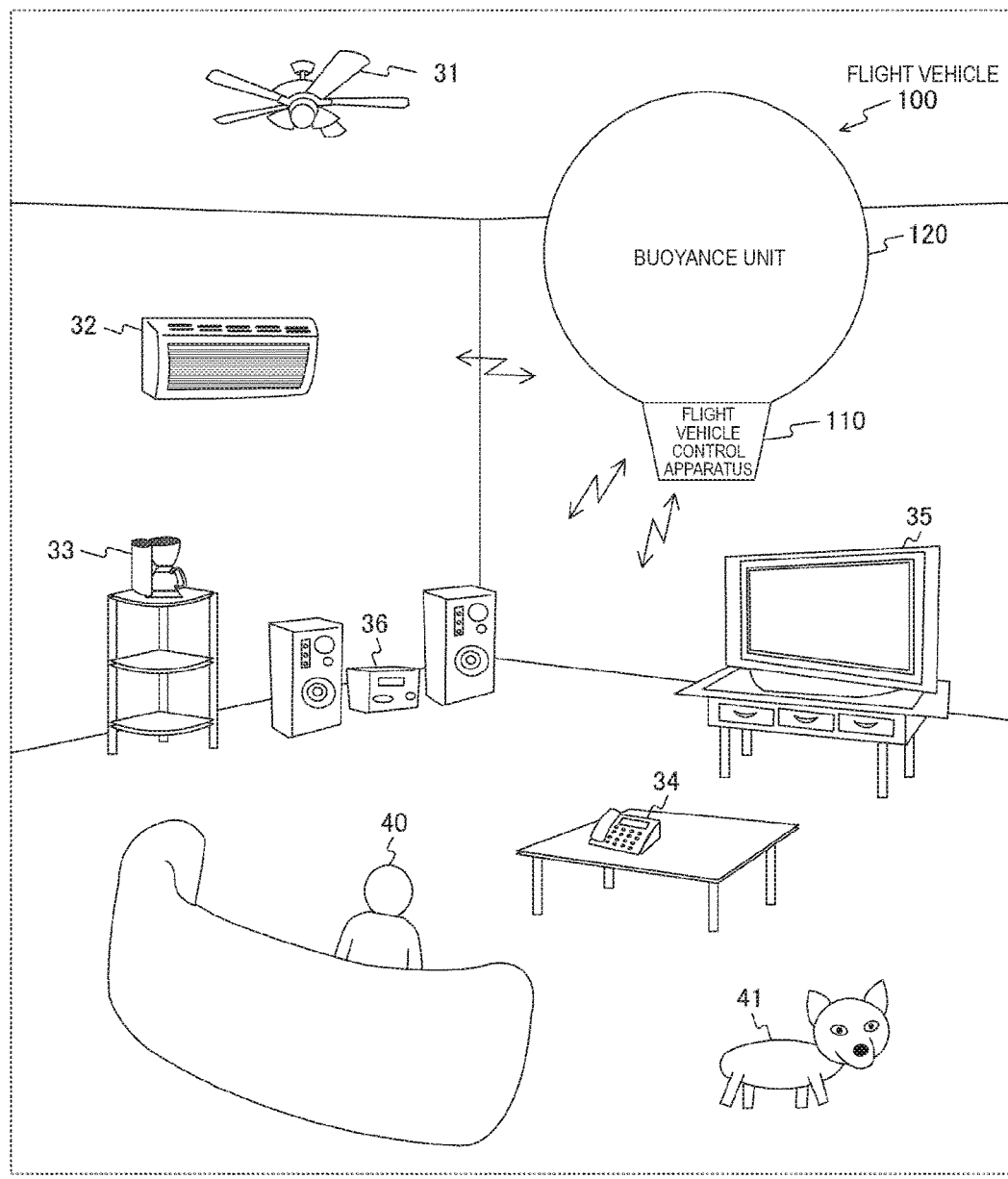
FIG. 8 is a diagram illustrating a usage example in the case where the flight vehicle 100 according to the first embodiment of the present technology is used at home.
Figure 9:
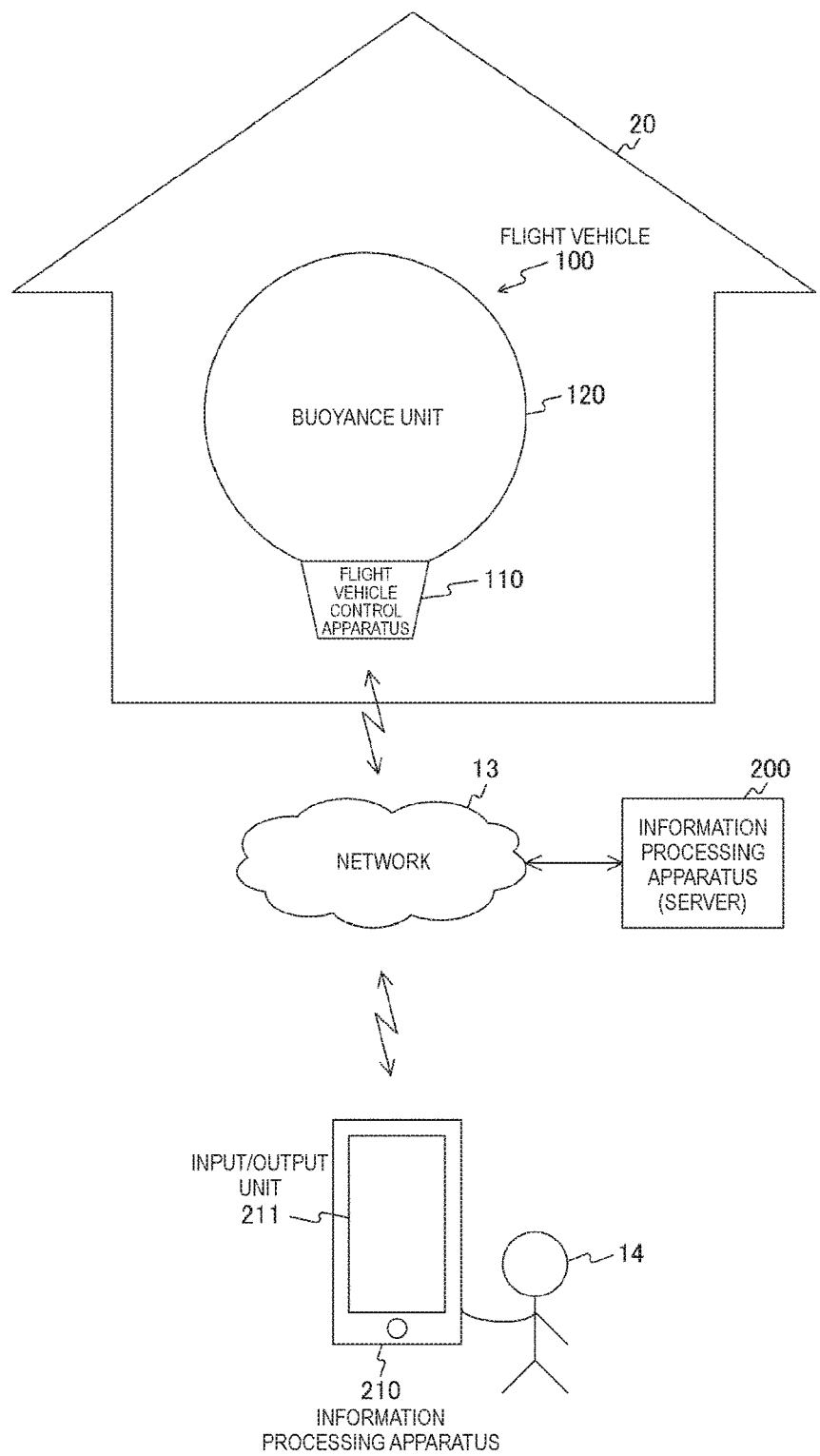
FIG. 9 is a diagram illustrating a usage example in the case where the flight vehicle 100 according to the first embodiment of the present technology is used in ambient society.

FIG. 8 and FIG. 9 illustrate examples where the flight vehicle 100 is connected to other apparatuses, information acquired at the flight vehicle 100 is used at the other apparatuses, and information acquired at the other apparatuses is used at the flight vehicle 100 in this manner.

[Usage Example at Home]

FIG. 8 is a diagram illustrating a usage example in the case where the flight vehicle 100 according to the first embodiment of the present disclosure is used at home. FIG. 8 illustrates an example where lighting equipment with a fan 31, an air conditioner 32, a coffee maker 33, a phone 34, a television 35, and a music player 36 are provided in a room. Further, it is assumed that each equipment has a communication function (a radio communication function, a wired communication function), so that each equipment can exchange information with the flight vehicle 100.

The lighting equipment with a fan 31 is lighting equipment which can adjust wind using a ceiling fan. The lighting equipment with a fan 31 can acquire each information relating to time, illuminance, a temperature, and comfort and discomfort. Further, the lighting equipment with a fan 31 can automatically adjust and output color, brightness, wind force, or the like.

The air conditioner 32 can acquire each information relating to a temperature, a location of a person, and comfort and discomfort. Further, the air conditioner 32 can automatically adjust and output wind force, a wind direction, wobbling, or the like.

The coffee maker 33 can acquire each information relating to time, a temperature and a degree of fatigue. Further, the coffee maker 33 can automatically adjust and output concentration of coffee, a temperature of coffee and an amount of coffee.

The phone 34 can acquire each information relating to time, noise, a calling party and a degree of fatigue. Further, the phone 34 can automatically adjust and output a volume, timbre, a manner mode, or the like.

The television 35 can acquire each information relating to noise, illuminance, comfort and discomfort, and interest. Further, the television 35 can automatically adjust and output a volume, brightness, program selection, or the like.

The music player 36 can acquire each information relating to time, noise, comfort and discomfort, and interest. Further, the music player 36 can automatically adjust and output a volume, music selection, or the like.

Further, the flight vehicle 100 acquires each information relating to a face image of a person, posture of a person, a temperature of a person, a line of sight of a person and sound of a person. Further, the flight vehicle 100 automatically adjusts and outputs comfort and discomfort, a degree of fatigue, interest, or the like.

For example, the control unit 152 of the flight vehicle control apparatus 110 can acquire sound information (music) output from the music player 36 and perform control to set an optimal environment for this sound information (music). For example, the control unit 152 of the flight vehicle control apparatus 110 judges a temperature and humidity optimal for the sound information (music) and transmits control information for setting the optimal temperature and humidity to the air conditioner 32. Further, for example, the control unit 152 of the flight vehicle control apparatus 110 judges brightness optimal for the sound information (music) and transmits control information for setting the optimal brightness to the lighting equipment with a fan 31. Further, for example, the control unit 152 of the flight vehicle control apparatus 110 judges taste of coffee optimal for the sound information (music) and transmits control information relating to setting for the optimal taste to the coffee maker 33. Still further, for example, the control unit 152 of the flight vehicle control apparatus 110 judges an environment optimal for the sound information (music), and, in the case where the optimal environment is a quiet environment, transmits control information for setting an answering machine function of the phone 34 to the phone 34. Further, the control unit 152 of the flight vehicle control apparatus 110 transmits control information for powering off the television 35 to the television 35.

For example, the control unit 152 of the flight vehicle control apparatus 110 can detect a dog 41 included in the image data generated by the imaging units 141 and 142. In this case, for example, the control unit 152 of the flight vehicle control apparatus 110 can perform control so that the sound information (music) output from the music player 36 becomes optimal for the dog 41. Further, for example, the control unit 152 of the flight vehicle control apparatus 110 judges a temperature and humidity optimal for the dog 41 and transmits control information for setting the optimal temperature and humidity to the air conditioner 32. Further, for example, the control unit 152 of the flight vehicle control apparatus 110 judges brightness optimal for the dog 41 and transmits control information for setting the optimal brightness to the lighting equipment with a fan 31.

In this manner, by the flight vehicle 100 autonomously moving in space of a residential environment, the flight vehicle 100 can collect each information for allowing a resident to stay comfortably, and can transmit information to other apparatuses.

Further, by connecting the flight vehicle 100 moving at home to the Internet or cloud, it is possible to easily confirm information at home from outside. This example is illustrated in FIG. 9.

[Usage Example in Ambient Society]

FIG. 9 is a diagram illustrating a usage example in the case where the flight vehicle 100 according to the first embodiment of the present technology is used in ambient society.

Here, the ambient society means that each equipment (for example, each sensor) existing around the user acquires each information relating to the user, recognizes a state, a condition, or the like, of the user, and provides information required by the user. Information exchanged in this ambient society is, for example, various kinds of information including conventional information (Legacy Contents). For example, the information is various kinds of record (such as Life-log, Security data Log, Environmental data Log). Further, the information is, for example, electronic health record (EHR)/personal health record (PHR). Further, the information is, for example, Home Energy Management (for example, a system which manages energy of a house by utilizing a sensor, or the like).

For example, the user 14 can confirm information acquired by the flight vehicle 100 which is utilized within a house 20 (at home), from outside using the information processing apparatus 210. For example, the user 14 can confirm each information by making the input/output unit 211 of the information processing apparatus 210 display the information acquired by the flight vehicle 100. That is, the user 14 can confirm a state within the house from outside.

Further, for example, the user 14 can control the flight vehicle 100 using the information processing apparatus 210. For example, the user 14 can make the flight vehicle 100 acquire desired information by giving an instruction regarding information which should be acquired by the flight vehicle 100 within the house 20 (at home).

For example, a case is assumed where an object (for example, a family member, a pet) can be recognized using the image data generated by the imaging unit. In this case, the user 14 performs instruction operation for acquiring information relating to the object (for example, a family member, a pet) within the house 20 (at home).

By this means, the user 14 can easily confirm the condition of the pet or the family member from outside using the information processing apparatus 210.

Further, for example, a case is assumed where a temperature of a room within the house 20 (at home) can be acquired using a temperature sensor. In this case, the user 14 can power on/off the air conditioner, adjust a temperature, or the like, in accordance with the temperature of the room within the house 20 (at home). By this means, in the case where motion of a child or a pet becomes different from a normal behavior pattern due to a condition of a room temperature, it is possible to perform feedback so as to control the air conditioner, so that it is possible to improve the condition of the room.

In this manner, according to the first embodiment of the present technology, it is possible to easily exchange information on the network using the flight vehicle 100. Further, it is possible to operate the flight vehicle 100 using the information processing apparatus connected to the network. Further, it is possible to easily confirm information of the sensor mounted on the flight vehicle 100 (for example, image information, sound information) using remote equipment (equipment connected to the network).

Note that, while FIG. 9 illustrates an example where the flight vehicle 100 is used in the house 20, the flight vehicle 100 may be used at other locations. For example, it is possible to use the flight vehicle 100 in a car. In this case, the user can easily confirm a condition, or the like, inside and outside of the car using the information processing apparatus even from a location away from the car.

However, there can be a case where the size of the flight vehicle 100 is large or a case where inside of the car is narrow. In such a case, it is possible to use the flight vehicle 100 with a reduced size. Alternatively, it is also possible to use the flight vehicle 100 while hanging only the body of the flight vehicle 100 inside the car.

Further, it is also possible to mount an apparatus for improving an environment (for example, a cleaner, an air cleaner) at the flight vehicle 100 to improve an environment of space where the flight vehicle 100 moves using this apparatus. For example, as illustrated in FIG. 8, because the lighting equipment with a fan 31 and the air conditioner 32 are provided at relatively high locations, it is assumed that it is difficult for the user to clean the lighting equipment with a fan 31 and the air conditioner 32. Therefore, a cleaner for collecting trash and dust in a container may be mounted on the flight vehicle 100 to collect trash and dust adhered to the lighting equipment with a fan 31 and the air conditioner 32 using this cleaner. In this case, for example, it is possible to perform cleaning while estimating locations of the lighting equipment with a fan 31 and the air conditioner 32 using radio waves output from the lighting equipment with a fan 31 and the air conditioner 32. Further, it is also possible to perform cleaning while looking for the lighting equipment with a fan 31 and the air conditioner 32 using the image data generated by the imaging units 141 and 142. Further, for example, the flight vehicle 100 may set equipment to be cleaned in advance and may clean only the set equipment. Further, the flight vehicle 100 may measure the surrounding environment (for example, a temperature, air, a degree of dust) during movement and may improve the environment of the space on the basis of this measurement result.

In this manner, because it is possible to exchange information on the network, it is possible to configure a group of apparatuses among which a plurality of similar apparatuses can coordinate with each other. This example is illustrated in FIG. 10.

[Usage Example of a Plurality of Flight Vehicles]

Figure 10:
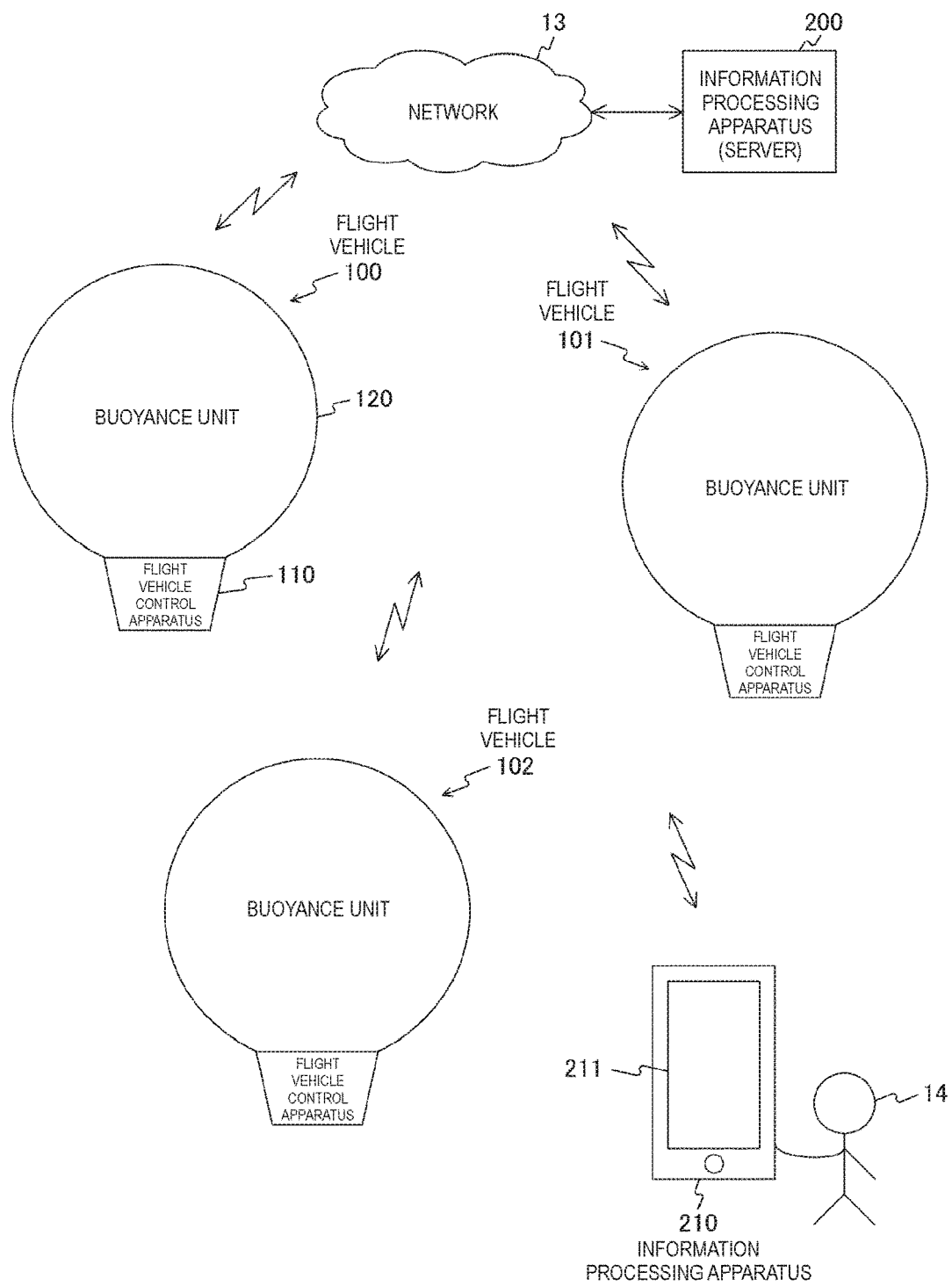
FIG. 10 is a diagram illustrating a usage example in the case where flight vehicles 100 to 102 according to the first embodiment of the present technology are used.

FIG. 10 is a diagram illustrating a usage example in the case where the flight vehicles 100 to 102 according to the first embodiment of the present technology are used.

As described above, each of the flight vehicles 100 to 102 can exchange information directly or indirectly via the network 13. Therefore, for example, each of the flight vehicles 100 to 102 can share all or part of the same information and coordinate with each other. For example, each of the flight vehicles 100 to 102 may share information relating to the user 14 (for example, face information of the user 14) to recognize the user 14, and sequentially acquire each information relating to the user 14 (for example, location information, physical condition information, activity information) to share the information. Further, each information may be regularly or irregularly transmitted to the information processing apparatus (server) 200 and stored.

[Example where Display Unit is Provided at Buoyance Unit]

FIGS. 11a and 11b are diagrams illustrating an external configuration example of the flight vehicle 101 according to the first embodiment of the present technology. FIG. 11a illustrates a front view of the flight vehicle 101. FIG. 11b illustrates a display example in b.

The flight vehicle 101 is a modified example of the flight vehicle 100 illustrated in FIGS. 1a, 1b, and 1c, or the like, and differs from the flight vehicle 100 in that a display unit 121 is provided on the surface of the buoyance unit 120 of the flight vehicle 100. Therefore, in FIGS. 11a and 11b, the same reference numerals as those of the flight vehicle 100 are assigned to components common with those of the flight vehicle 100, and explanation thereof will be partially omitted.

The display unit 121 is a display unit which can be mounted on all or part of the surface of the buoyance unit 120. As the display unit 121, for example, a flexible display (curved display) can be used. This flexible display is an image display apparatus which can be folded and curled like cloth and paper, and, for example, is implemented by an organic EL panel, or the like.

For example, as illustrated in FIG. 9, a case where the user 14 is located outside is assumed. In this case, in the case where there is something to inform a person located inside the house 20, the user 14 can make the display unit 121 of the flight vehicle 101 display content to be informed (for example, document, a symbol, picture, an image, a photograph) by operating the information processing apparatus 210. By this means, the person located inside the house 20 can easily recognize the content to be informed in the case where the person sees the flight vehicle 101 moving inside the house 20.

For example, as illustrated in FIG. 8, a case where the user 40 is located inside the house is assumed. In this case, in the case where it is judged on the basis of information from the air conditioner 32 that the environment affects physical condition of the dog 41 (for example, too hot), the control unit 152 of the flight vehicle control apparatus 110 can make the display unit 121 display that information. For example, as illustrated in FIG. 11b, it is possible to make the display unit 121 display a message of "it is too hot for a dog. Please lower the temperature" and an image of the dog which looks lifeless.

In this manner, by the display unit 121 (for example, a flexible display) being mounted on all or part of the surface of the buoyance unit 120, it is possible to display a desired image on the surface (curved surface) of the buoyance unit 120.

Further, for example, a case is assumed where the control unit 152 can recognize expression, words, gesture, or the like, of the user on the basis of information from each sensor. In this case, the control unit 152 can make the display unit 121 display response to the expression, words, gesture, or the like, of the user on the basis of the recognition result. For example, in the case where smile of the user is detected on the basis of the image data generated by the imaging units 141 and 142, the control unit 152 can make the display unit 121 display some kind of smile as response to the smile. In this manner, it is possible to realize easy interaction between the flight vehicle 100 and the user.

As described above, the flight vehicle control apparatus 110 performs control to prevent the flight vehicle 100 from flying up in the air. However, a case can be also assumed where the flight vehicle 100 is blown away by wind, or the like, and moves. Therefore, by connecting the flight vehicle 100 to an object located on the ground, it is possible to prevent the flight vehicle 100 from being blown away by wind, or the like, or from flying up in the air. This example is illustrated in FIGS. 12a and 12b.

[Usage Example where Flight Vehicle is Connected to Object on Ground]

Figure 12A:
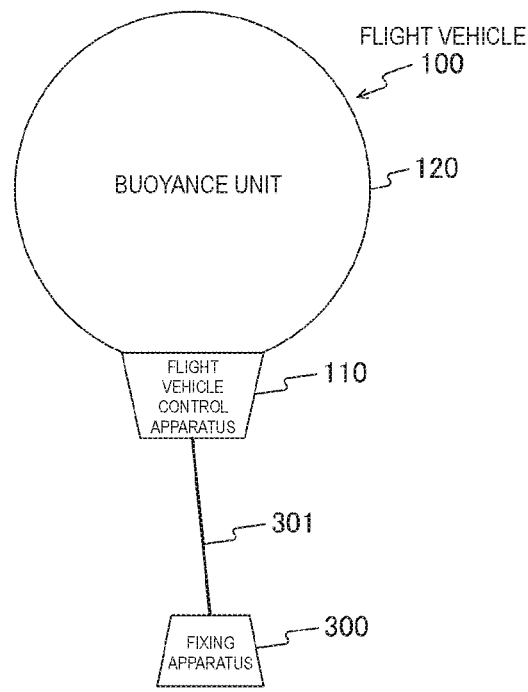
FIGS. 12a and 12b are diagrams illustrating a usage example in the case where the flight vehicle 100 according to the first embodiment of the present technology is used.
Figure 12B:
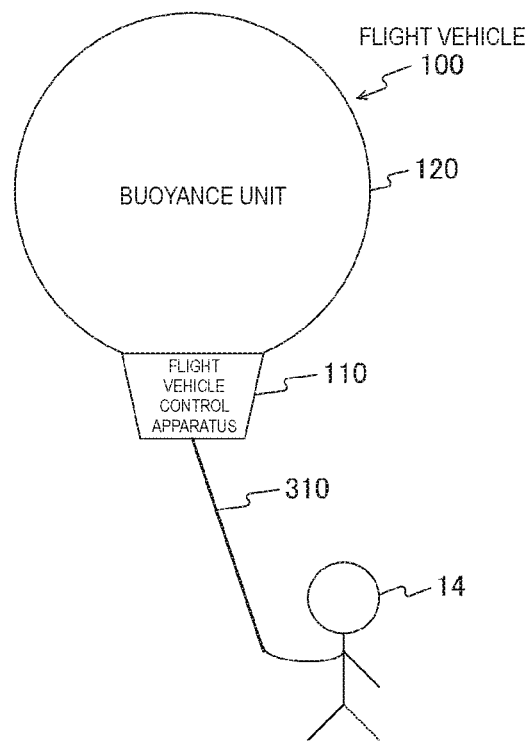

FIGS. 12a and 12b are diagrams illustrating a usage example in the case where the flight vehicle 100 according to the first embodiment of the present technology is used.

FIGS. 12a and 12b illustrates an example in the case where the flight vehicle 100 and a fixing apparatus 300 are connected by utilizing a connecting portion 301, in a. FIG. 12b illustrates an example in the case where the user 14 holds the flight vehicle 100 by utilizing a connecting portion 310. The connecting portions 301 and 310 are, for example, a cable or a string.

In this manner, in the case where the flight vehicle 100 flies in the air, by connecting the flight vehicle 100 to a person or an object using the connecting portions 301 and 310, or the like, it is possible to avoid the flight vehicle 100 from flying up in the air.

Further, it is possible to use a cable including electric wiring as the connecting portions 301 and 310. Further, the cable is connected to a power supplying unit 156 of the flight vehicle control apparatus 110. In this case, it is possible to connect the cable to a power supply (for example, a power supply built in the fixing apparatus 300) and supply power to the power supplying unit 156 of the flight vehicle control apparatus 110 from the power supply via the cable. In this manner, because power can be supplied via the cable, it is possible to allow the flight vehicle 100 to operate for a long period.

Further, in the example illustrated in FIG. 12a, connection between the connecting portion 301 and the flight vehicle 100, and connection between the connecting portion 301 and the fixing apparatus 300 may be fixed or detachable. For example, it is possible to mechanically fix these in the case where these are connected and release the fixing in the case where these are detached. Note that an actuator or a piezoelectric element can be used as mechanical fixing means.

Further, it is also possible to perform fixing using a magnet as the mechanical fixing means and release the fixing. Further, it is also possible to use an electromagnet as all or part of the magnet and electrically perform fixing or releasing using magnetic force. In this case, it is possible to allow a current to flow only upon fixing or releasing and prevent a current from flowing after fixing or releasing as action of the electromagnet. By this means, it is possible to suppress power consumption.

Note that operation relating to the fixing or releasing may be performed at the side of the flight vehicle 100 or may be performed at other apparatuses. In this case, it is also possible to perform the operation by utilizing radio communication or utilizing wired communication.

FIGS. 12a and 12b illustrate an example in the case where the flight vehicle 100 is floated in the air. However, it is also possible to use the flight vehicle 100 while hanging the flight vehicle 100 in the air. Also in the case where the flight vehicle 100 is used while being hanged in the air, similarly, the flight vehicle 100 may be connected to a fixing apparatus or a person by utilizing a connecting portion (for example, the connecting portions 301 and 310). By this means, it is possible to prevent the flight vehicle 100 from dropping.

As described above, the flight vehicle control apparatus 110 performs each operation using power supply from the power supplying unit 156. Therefore, it is important to prevent operation of the flight vehicle control apparatus 110 from stopping due to stopping of power supply from the power supplying unit 156.

Further, the buoyance unit 120 of the flight vehicle 100 is filled with specific gas. Therefore, it is important to prevent buoyance from decreasing due to reduction in specific gas which has filled the buoyance unit 120 of the flight vehicle 100.

However, in the case where the user manually performs replenishment operation, the replenishment operation may be troublesome. Therefore, an example where the flight vehicle 100 autonomously performs the replenishment operation is illustrated in FIGS. 13a and 13b.

[Example where Flight Vehicle Autonomously Performs Charging and Example where Flight Vehicle Autonomously Replenishes Gas]

Figure 13A:
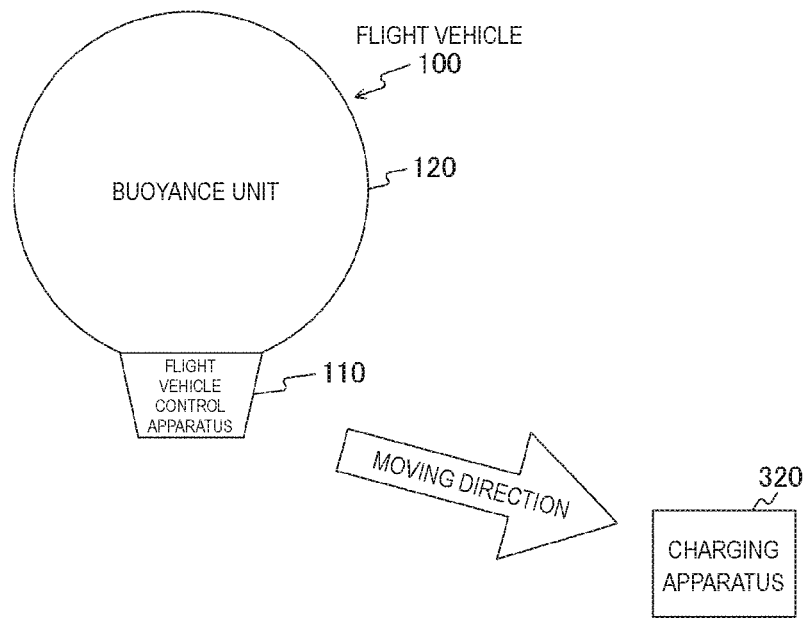
FIGS. 13a and 13b are diagrams illustrating a usage example in the case where the flight vehicle 100 according to the first embodiment of the present technology is used.
Figure 13B:
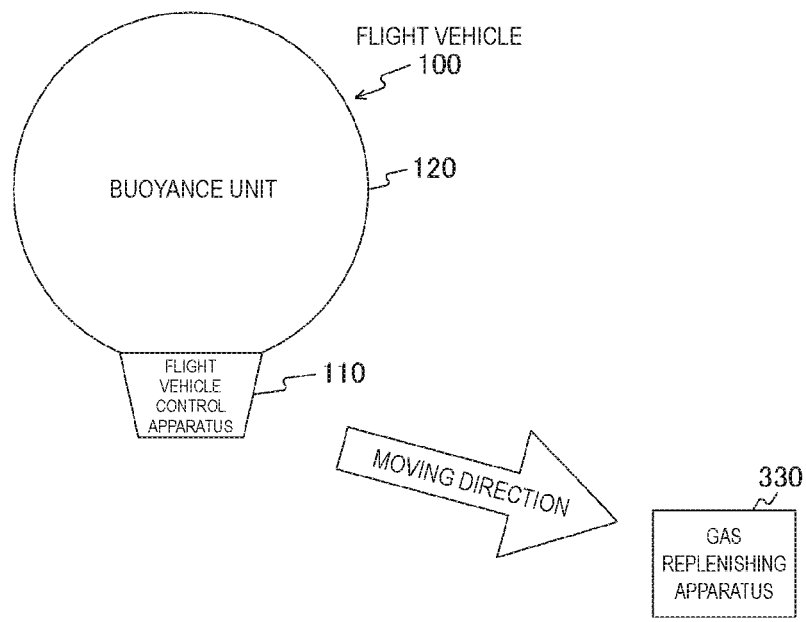

FIGS. 13a and 13b are diagrams illustrating a usage example in the case where the flight vehicle 100 according to the first embodiment of the present technology is used.

FIG. 13a illustrates an example of the relationship between the flight vehicle 100 and a charging apparatus 320 in the case where the flight vehicle 100 autonomously performs charging. For example, the control unit 152 of the flight vehicle control apparatus 110 regularly or irregularly confirms whether or not remaining capacity of the power supplying unit 156 is less than or equal to a threshold. In the case where the remaining capacity of the power supplying unit 156 becomes less than or equal to the threshold, the control unit 152 of the flight vehicle control apparatus 110 autonomously moves to a location of the charging apparatus 320 (location where charging can be performed) provided on the ground to start charging of the power supplying unit 156.

For example, in the case where the charging apparatus 320 has a radio communication function, the control unit 152 can estimate the location of the charging apparatus 320 using radio communication. For example, the control unit 152 can estimate the location of the charging apparatus 320 on the basis of strength of a radio wave output from the charging apparatus 320. For example, the control unit 152 can judge strength of the radio wave output from the charging apparatus 320 every time the flight vehicle 100 proceeds and can judge a direction in which the strength of the radio wave increases as a direction in which the charging apparatus 320 exists.

Further, for example, a case is assumed where radio communication utilizing a specific band (for example, a 60 GHz band) can be performed between the flight vehicle control apparatus 110 and the charging apparatus 320. In this case, the control unit 152 can estimate the location of the charging apparatus 320 on the basis of information relating to a beam used for the radio communication (see, for example, JP 2014-142255A).

Further, for example, in the case where the charging apparatus 320 has a function of holding and transmitting location information, the control unit 152 can estimate the location of the charging apparatus 320 using the location information. For example, the control unit 152 acquires the location information of the flight vehicle control apparatus 110 using a location sensor. The control unit 152 can then estimate the location of the charging apparatus 320 on the basis of the acquired location information and the location information transmitted from the charging apparatus 320.

In this manner, in the case where the remaining capacity of the rechargeable battery (power supplying unit 156) is less than or equal to the threshold, the control unit 152 can perform control to move the flight vehicle 100 to the location of the charging apparatus 320 for charging the rechargeable battery.

FIG. 13b illustrates an example of the relationship between the flight vehicle 100 and a gas replenishing apparatus 330 in the case where the flight vehicle 100 autonomously replenishes gas. For example, the control unit 152 of the flight vehicle control apparatus 110 regularly or irregularly confirms whether or not a volume of the gas filling inside of the buoyance unit 120 is less than or equal to the threshold. Then, in the case where the volume of the gas filling the inside of the buoyance unit 120 is less than or equal to the threshold, the control unit 152 of the flight vehicle control apparatus 110 autonomously moves to the location of the gas replenishing apparatus 330 provided on the ground to start replenishment of the gas inside the buoyance unit 120.

Note that a method for estimating the location of the gas replenishing apparatus 330 is similar to the example illustrated in a in FIGS. 13a and 13b.

In this manner, in the case where the gas of the buoyance unit 120 becomes less than or equal to the threshold, the control unit 152 can perform control to move the flight vehicle 100 to the location of the gas replenishing apparatus 330 for replenishing the gas.

In this manner, because the flight vehicle 100 autonomously performs charging, replenishes gas, or the like, it is not necessary for the user to charge the flight vehicle 100, replenish gas, or the like. By this means, it is possible to release the user from the burden of charging the flight vehicle 100, replenishing gas, or the like.

Further, a gas adjusting apparatus which absorbs gas filling the inside of the buoyance unit 120 and injects gas inside the buoyance unit 120 can be provided at any portion of the flight vehicle 100. This gas adjusting apparatus can reduce the volume of the gas inside the buoyance unit 120 by absorbing gas filling the inside of the buoyance unit 120 and can increase the volume of the gas inside the buoyance unit 120 by injecting gas inside the buoyance unit 120. Further, in the case where the gas adjusting apparatus absorbs the gas filling the inside of the buoyance unit 120, the gas adjusting apparatus can accumulate the absorbed gas and use the gas when injecting the gas inside the buoyance unit 120. Note that this gas adjusting apparatus can absorb gas or inject gas on the basis of control by the control unit 152. That is, the control unit 152 can perform control to absorb the gas filling the buoyance unit 120 or inject gas to the buoyance unit 120.

In this manner, in the first embodiment of the present technology, it is possible to realize the flight vehicle 100 using light parts. Further, for example, the flight vehicle 100 can be designed so as to be normally provided on a floor, or the like. Further, while the flight vehicle 100 flies, by using a propulsion apparatus (for example, a propeller), the flight vehicle 100 can be made a balloon of a relatively small size. Therefore, it is possible to use the flight vehicle 100 on a narrow passage. Further, because the flight vehicle 100 can autonomously move, it is not necessary to operate the flight vehicle 100.

Further, for example, it is not necessary to wear the flight vehicle 100. Further, by performing setting so that the flight vehicle 100 recognizes the user to follow the user, it is possible to make the flight vehicle 100 follow the user. Further, for example, by acquiring information relating to the location where the flight vehicle 100 exists by utilizing radio communication, it is possible to have the flight vehicle 100 give a guide regarding the location.

Further, for example, it is also possible to set the height at which the flight vehicle 100 is located. In this case, the user can float the flight vehicle 100 at the height of the eyes of the user without using his/her hand. Therefore, the user can conveniently use the flight vehicle 100. Further, the user can see a display unit (for example, the display unit 121 illustrated in FIGS. 11a and 11b) at an easily viewable position.

[External Configuration Example of Flight Vehicle]

Figure 14A:
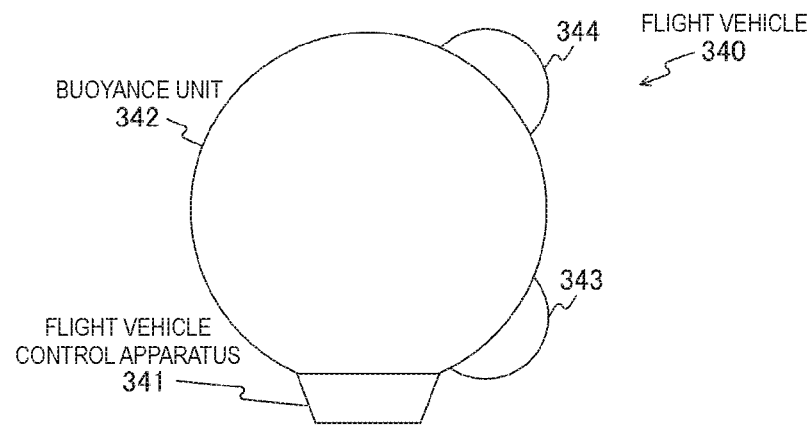
FIGS. 14a and 14b are diagrams illustrating external configuration examples of flight vehicles 340 and 350 according to the first embodiment of the present technology.
Figure 14B:
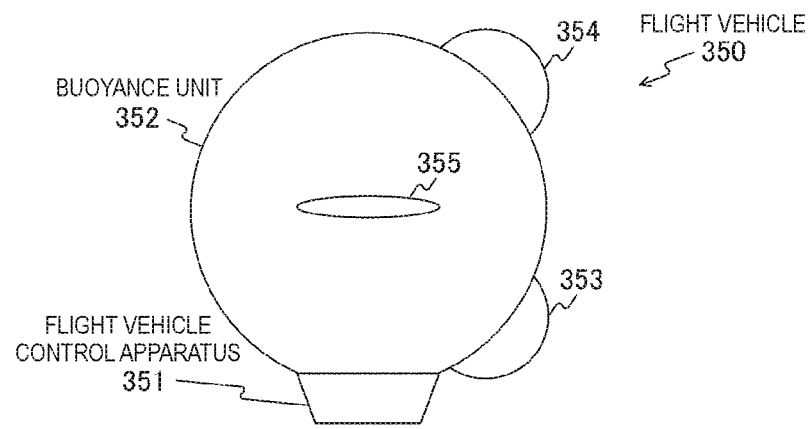

FIGS. 14a and 14b are diagrams illustrating external configuration examples of the flight vehicles 340 and 350 according to the first embodiment of the present technology. FIG. 14a illustrates the front of the flight vehicle 34, and FIG. 14b illustrates a front view of the flight vehicle 350.

The flight vehicles 340 and 350 are modified examples of the flight vehicle 100 illustrated in FIGS. 1a, 1b and 1c, or the like, and differ from the flight vehicle 100 in that traveling direction fins 343, 344, and 353 to 355 are provided at the flight vehicle 100. Therefore, explanation of part common with that of the flight vehicle 100 will be partially omitted.

The flight vehicle 340 includes a flight vehicle control apparatus 341, a buoyance unit 342 and traveling direction fins 343 and 344. The flight vehicle control apparatus 341 and the buoyance unit 342 correspond to the flight vehicle control apparatus 110 and the buoyance unit 120 illustrated in FIGS. 1a, 1b and 1c, or the like.

The traveling direction fins 343 and 344 are members for stabilizing a traveling direction in the case where the flight vehicle 340 moves. Further, the traveling direction fins 343 and 344 play a role corresponding to a vertical tail in an airplane.

The flight vehicle 350 includes a flight vehicle control apparatus 351, a buoyance unit 352 and traveling direction fins 353 to 355. The flight vehicle control apparatus 351 and the buoyance unit 352 correspond to the flight vehicle control apparatus 110 and the buoyance unit 120 illustrated in FIGS. 1a, 1b and 1c, or the like. Further, the traveling direction fins 353 and 354 correspond to the traveling direction fins 343 and 344 illustrated in FIG. 14a.

The traveling direction fin 355 is a member for stabilizing a traveling direction in the case where the flight vehicle 350 moves. Further, the traveling direction fin 355 plays a role corresponding to a primary wing in an airplane.

In this manner, the traveling direction fins 343, 344, and 353 to 355 function as propulsion units of the flight vehicles 340 and 350.

[External Configuration Example of Flight Vehicle]

Figure 15A:
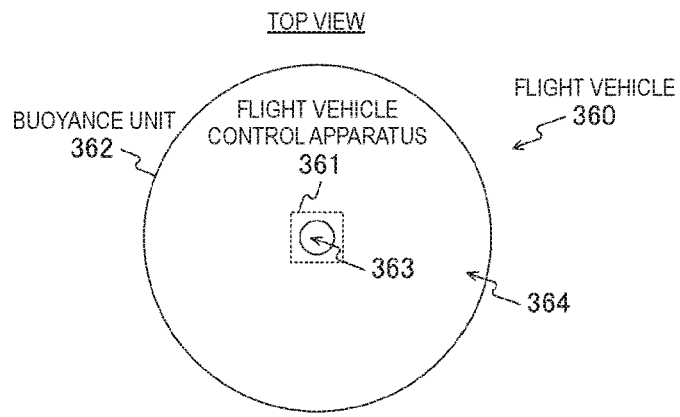
FIGS. 15a and 15b are diagrams illustrating an external configuration example of a flight vehicle 360 according to the first embodiment of the present technology.
Figure 15B:
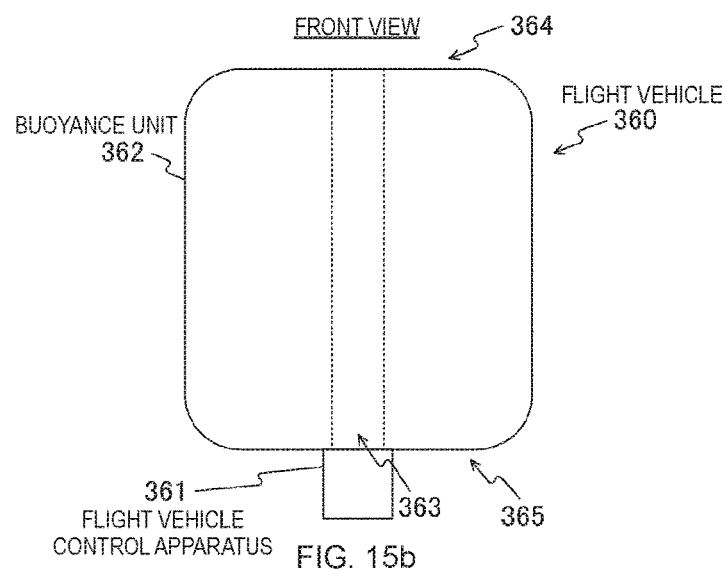
Figure 15C:
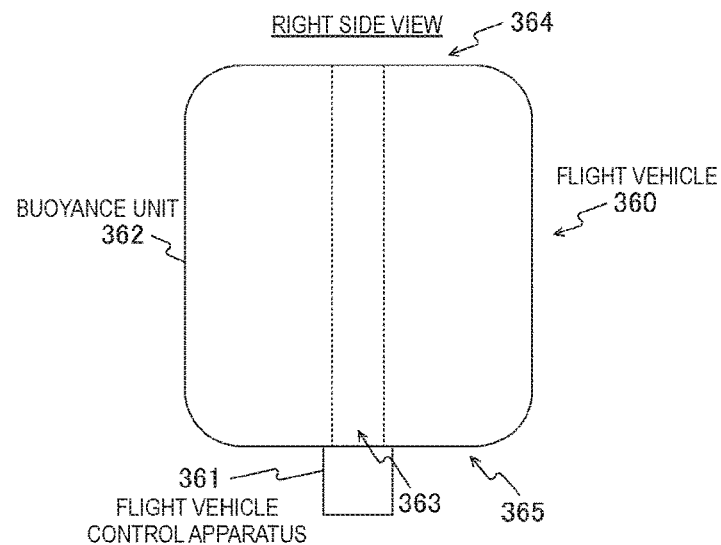

FIGS. 15a, 15b and 15c are diagrams illustrating an external configuration example of the flight vehicle 360 according to the first embodiment of the present technology. FIG. 15a illustrates a top view of the flight vehicle 360, FIG. 15b illustrates a front view of the flight vehicle 360 and FIG. 15c illustrates a side view (right side view) of the flight vehicle 360.

The flight vehicle 360 is a modified example of the flight vehicle 100 illustrated in FIGS. 1a, 1b and 1c, or the like, and differs from the flight vehicle 100 in that the buoyance unit 362 has the shape such that the center portion is pierced. Therefore, in FIGS. 15a, 15b and 15c, explanation of part common with that of the flight vehicle 100 will be partially omitted.

The flight vehicle 360 includes a flight vehicle control apparatus 361 and a buoyance unit 362. The flight vehicle control apparatus 361 and the buoyance unit 362 correspond to the flight vehicle control apparatus 110 and the buoyance unit 120 illustrated in FIGS. 1a, 1b and 1c, or the like.

The buoyance unit 362 has a circular cylindrical shape and has a shape such that a through-hole 363 which pierces the center portion of both end faces is provided. That is, the buoyance unit 362 has a shape such that the center portion of the both end faces of the buoyance unit 362 is pierced to allow the flight vehicle 360 to easily move in a vertical direction. Further, the shape of the through-hole 363 can be made a circular shape.

[Example of Flow of Air]

Figure 16A:
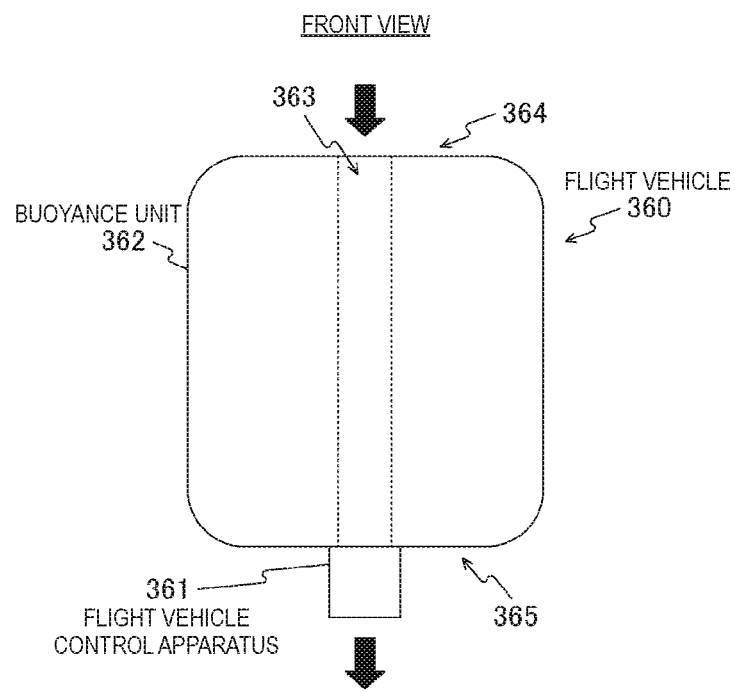
FIGS. 16a and 16b are diagrams illustrating an example of flow of air for generating lift required for ascending the flight vehicle 360 according to the first embodiment of the present technology.
Figure 16B:
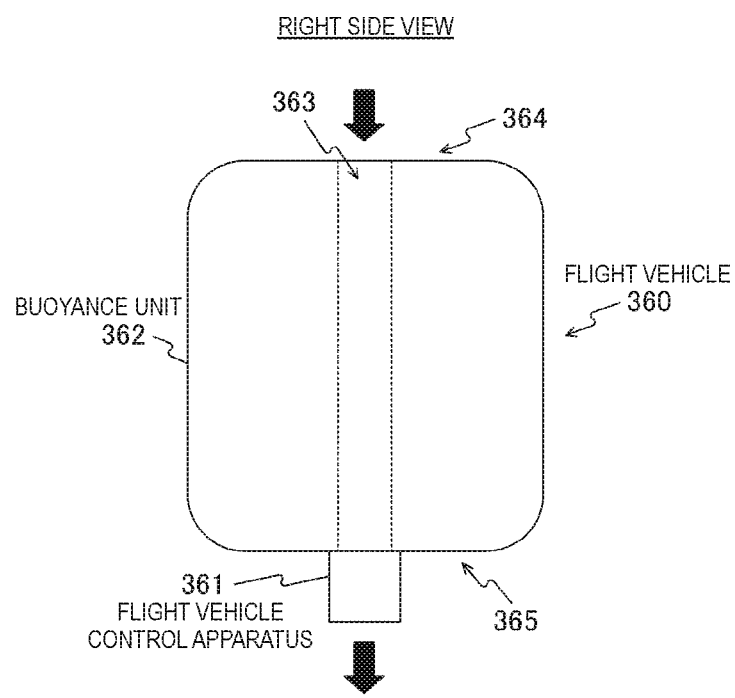

FIGS. 16a and 16b are diagrams illustrating an example of flow of air for generating lift required for ascending the flight vehicle 360 according to the first embodiment of the present technology. Note that FIGS. 16a and 16b schematically illustrate part of the flow of the air for generating lift required for ascending the flight vehicle 360 with a thick arrow. Note that FIGS. 16a and 16b illustrate flow of the air at the front of the flight vehicle 360 and in the side view (right side view) of the flight vehicle 360. FIGS. 16a and 16b are similar to FIGS. 15b and 15c except that thick arrows are added in FIGS. 15b and 15c.

As described above, force as action for pushing out air downward from the flight vehicle control apparatus 361 can be expressed with the following equation:

$$F=ma$$

Lift can be obtained as force of −F (that is, upward force F) as reaction of the downward force F.

Here, in the case where the flight vehicle 360 ascends, the flight vehicle 360 requires to constantly take in air to push out air downward from the flight vehicle 360. Therefore, force is applied by air taken into the flight vehicle 360 when the air is taken in, and the force acts in a direction in which force for ascending the flight vehicle 360 is decreased. Further, when the flight vehicle 360 moves upward, air becomes resistance against the movement and acts in a direction in which force for ascending the flight vehicle 360 is decreased.

In this manner, downward force with respect to the flight vehicle 360 acts. Therefore, in order to reduce downward force with respect to the flight vehicle 360, the buoyance unit 362 having a shape such that the through-hole 363 is provided at the center portion of the circular cylindrical shape can be used. Therefore, for example, by taking in air from an upper edge portion 364 of the buoyance unit 362, a pressure of air above the upper edge portion 364 is reduced, and upward force for ascending the whole flight vehicle 360 is increased. Further, resistance of air when the flight vehicle 360 moves upward is reduced, and the downward force is decreased.

By this means, it is possible to reduce energy required for vertical movement of the flight vehicle 360 in the flight vehicle 360 which uses the buoyance unit 362 having a shape such that the through-hole 363 is provided at the center portion of the cylinder. Therefore, it is possible to realize lower power consumption and a longer driving period of the flight vehicle 360.

Here, the relationship between a propeller (corresponding to the propeller 138 illustrated in FIGS. 2a, 2b and 2c) for moving the flight vehicle 360 in the vertical direction and the through-hole 363 will be described.

It is important to increase lift by the propeller, reduce force in an opposite direction to that of lift when air is taken in and further reduce force in an opposite direction to a direction of lift generated when the flight vehicle 360 ascends. Therefore, a diameter of the propeller for moving the flight vehicle 360 in the vertical direction is preferably equal to, or less than or equal to the size of an opening portion of the through-hole 363 (an opening portion closer to the propeller of the through-hole 363) at a lower edge portion 365 of the buoyance unit 362.

In this manner, it is possible to make the diameter of the propeller which is provided near the opening portion at the lower side of the through-hole 363 and which moves the flight vehicle 360 in the vertical direction the same as or less than or equal to the size of the opening portion.

[External Configuration Example of Flight Vehicle]

FIGS. 17a and 17b and FIGS. 18a and 18b are diagrams illustrating external configuration examples of the flight vehicle 370 according to the first embodiment of the present technology.

Figure 17A:
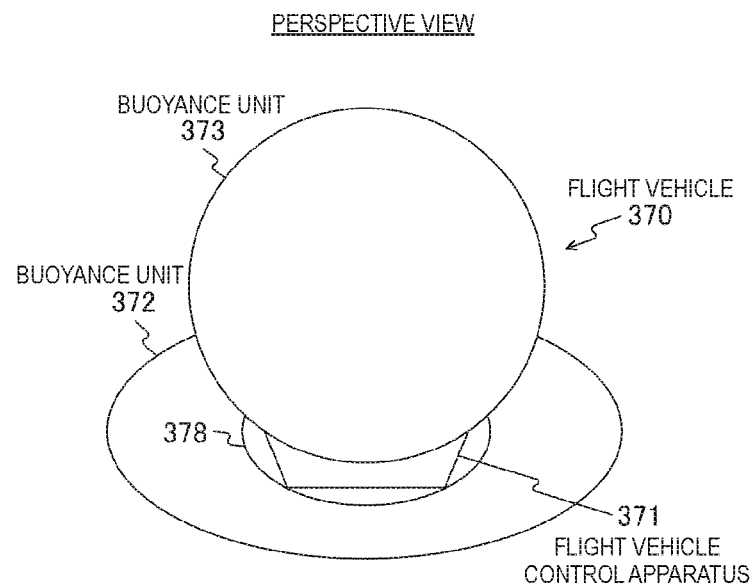
FIGS. 17a and 17b are diagrams illustrating an external configuration example of a flight vehicle 370 according to the first embodiment of the present technology.
Figure 17B:
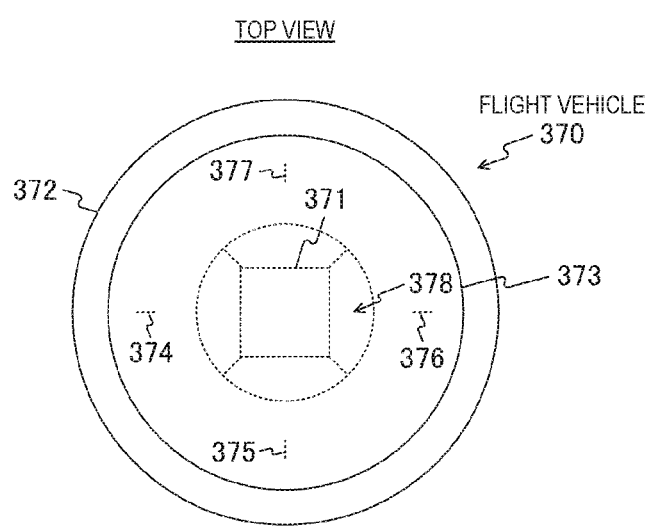
Figure 18A:
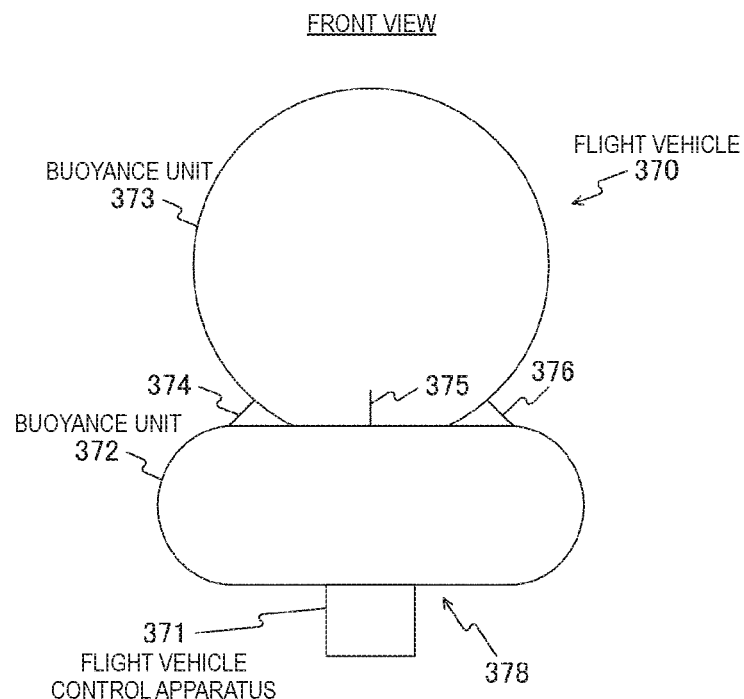
FIGS. 18a and 18b are diagrams illustrating an external configuration example of the flight vehicle 370 according to the first embodiment of the present technology.
Figure 18B:
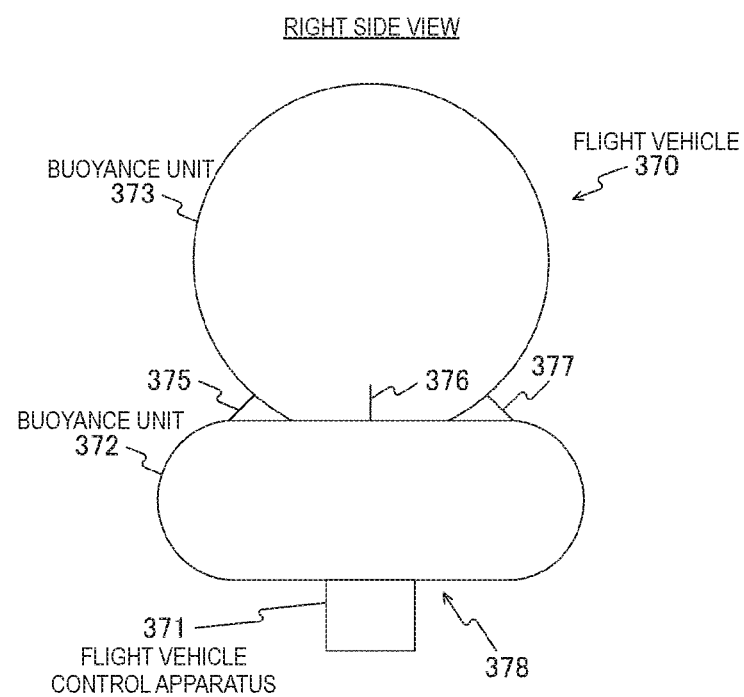

FIG. 17a illustrates a perspective view of the flight vehicle 370, and FIG. 17b illustrates a top view of the flight vehicle 370. Further, FIG. 18a illustrates a front view of the flight vehicle 370, and FIG. 18b illustrates a side view (right side view) of the flight vehicle 370.

The flight vehicle 370 is a modified example of the flight vehicle 100 illustrated in FIGS. 1a, 1b and 1c, or the like, and differs from the flight vehicle 100 in that a buoyance unit 373 has a spherical shape, a buoyance unit 372 has a doughnut shape, and these are connected. Therefore, in FIGS. 17a and 17b and FIGS. 18a and 18b, explanation of part common with that of the flight vehicle 100 will be partially omitted.

The flight vehicle 370 includes a flight vehicle control apparatus 371, and the buoyance units 372 and 373. The flight vehicle control apparatus 371 and the buoyance units 372 and 373 correspond to the flight vehicle control apparatus 110 and the buoyance unit 120 illustrated in FIGS. 1a, 1b and 1c, or the like.

The buoyance unit 373 has a spherical shape as with the buoyance unit 120 illustrated in FIGS. 1a, 1b and 1c, or the like. Further, the buoyance unit 372 has a doughnut shape in which a hole 378 is provided in a vertical direction. Further, it is assumed that the size of an outer periphery of the buoyance unit 372 is larger than the size of an outer periphery of the buoyance unit 373. Further, it is assumed that the size of the outer periphery of the buoyance unit 373 is larger than the diameter size of the hole 378 of the buoyance unit 372.

Further, it is assumed that the buoyance unit 372 and the buoyance unit 373 are connected using connecting portions 374 to 377. As the connecting portions 374 to 377, for example, a string member can be used. Therefore, air flows between the buoyance unit 372 and the buoyance unit 373.

[Example of Flow of Air]

Figure 19A:
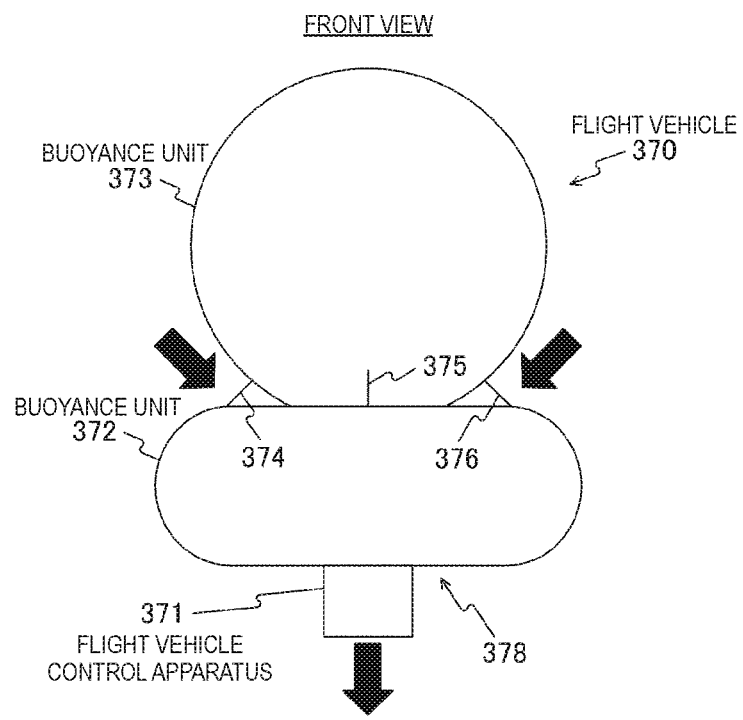
FIGS. 19a and 19b are diagrams illustrating an example of flow of air for generating lift required for ascending the flight vehicle 370 according to the first embodiment of the present technology.
Figure 19B:
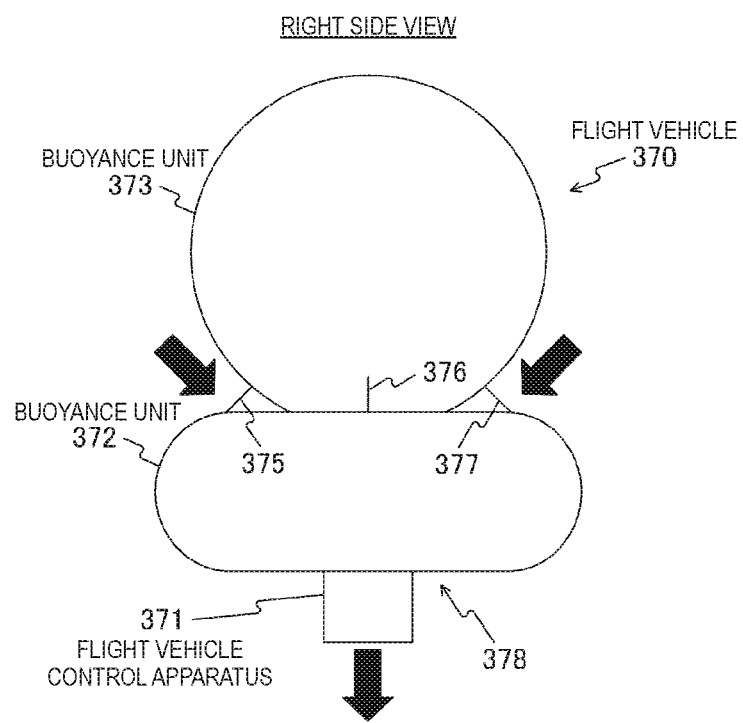

FIGS. 19a and 19b are diagrams illustrating an example of flow of air for generating lift required for ascending the flight vehicle 370 according to the first embodiment of the present technology. Note that FIGS. 19a and 19b schematically illustrate part of the flow of the air for generating lift required for ascending the flight vehicle 370 with a thick arrow. Note that FIGS. 19a and 19b illustrate flow of air at the front of the flight vehicle 370 and in the side view (right side view) of the flight vehicle 370. FIGS. 19a and 19b are similar to FIGS. 18a and 18b except that thick arrows are added in FIGS. 18a and 18b.

[External Configuration Example of Flight Vehicle]

Figure 20A:
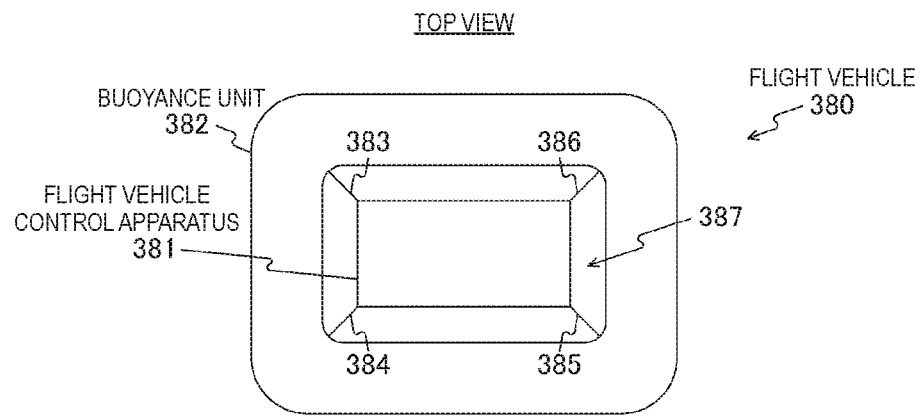
FIGS. 20a, 20b, and 20c are diagrams illustrating an external configuration example of a flight vehicle 380 according to the first embodiment of the present technology.
Figure 20B:
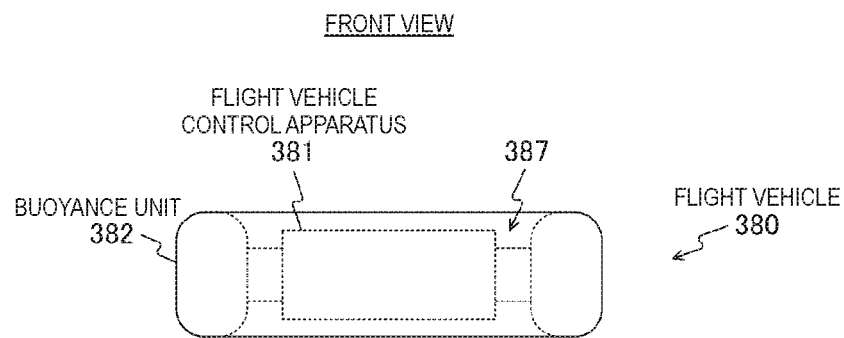
Figure 20C:
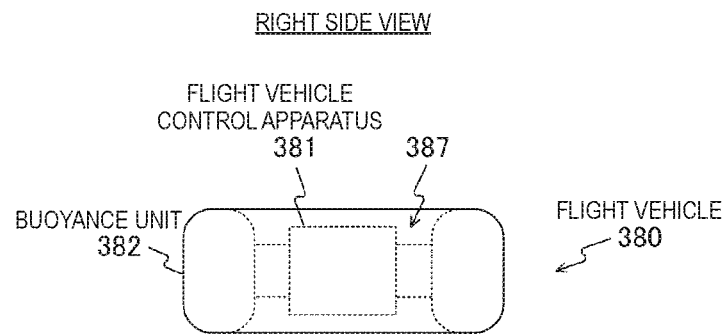

FIGS. 20a, 20b and 20c are diagrams illustrating an external configuration example of a flight vehicle 380 according to the first embodiment of the present technology.

FIG. 20a illustrates a top view of the flight vehicle 380, FIG. 20b illustrates a front view of the flight vehicle 380, and FIG. 20c illustrates a side view (right side view) of the flight vehicle 380.

The flight vehicle 380 is a modified example of the flight vehicle 100 illustrated in FIGS. 1a, 1b and 1c, or the like, and differs from the flight vehicle 100 in that the flight vehicle 380 has a shape of a quadrangular prism in which a through-hole 387 is provided at the center portion of the both end faces, and a flight vehicle control apparatus 381 is provided at the through-hole 387. Therefore, in FIGS. 20a, 20b and 20c, explanation of part common with that of the flight vehicle 100 will be partially omitted.

The flight vehicle 380 includes the flight vehicle control apparatus 381, a buoyance unit 382 and connecting portions 383 to 386. The flight vehicle control apparatus 381 and the buoyance unit 382 correspond to the flight vehicle control apparatus 110 and the buoyance unit 120 illustrated in FIGS. 1a, 1b and 1c, or the like.

The buoyance unit 382 has a shape of a planer quadrangular prism, and a through-hole 387 is provided at the center portion of the both end faces. Further, at the through-hole 387, the flight vehicle control apparatus 381 is provided using the connecting portions 383 to 386. Here, the shape of the through-hole 387 is made a shape which can enclose the flight vehicle control apparatus 381. For example, the shape of the through-hole 387 can be made a shape of a quadrangular prism. Further, the size of the through-hole 387 is preferably larger than the size of the flight vehicle control apparatus 381 so that wind flows between an inner surface of the through-hole 387 and an outer surface of the flight vehicle control apparatus 381.

Further, the buoyance unit 382 and the flight vehicle control apparatus 381 are connected using the connecting portions 383 to 386. As the connecting portions 383 to 386, for example, a string member can be used. Therefore, air flows between the inner surface of the through-hole 387 and the outer surface of the flight vehicle control apparatus 381.

[Example of Flow of Air]

Figure 21A:
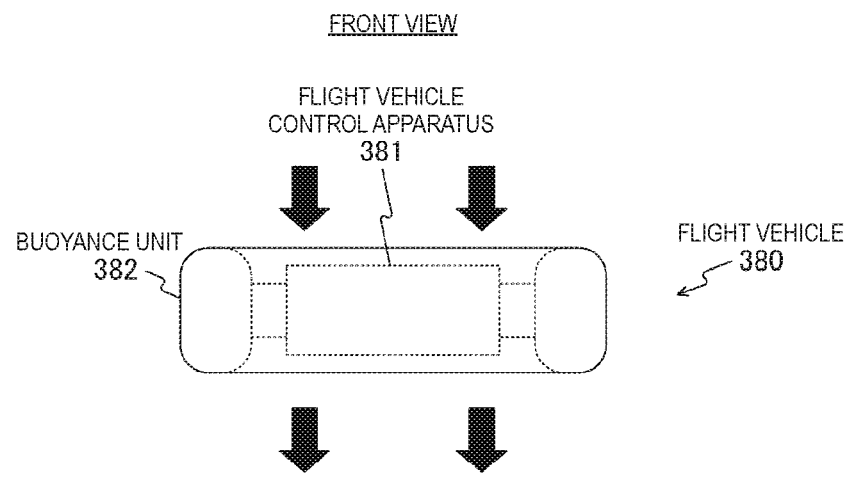
FIGS. 21a and 21b are diagrams illustrating an example of flow of air for generating lift required for ascending the flight vehicle 380 according to the first embodiment of the present technology.
Figure 21B:
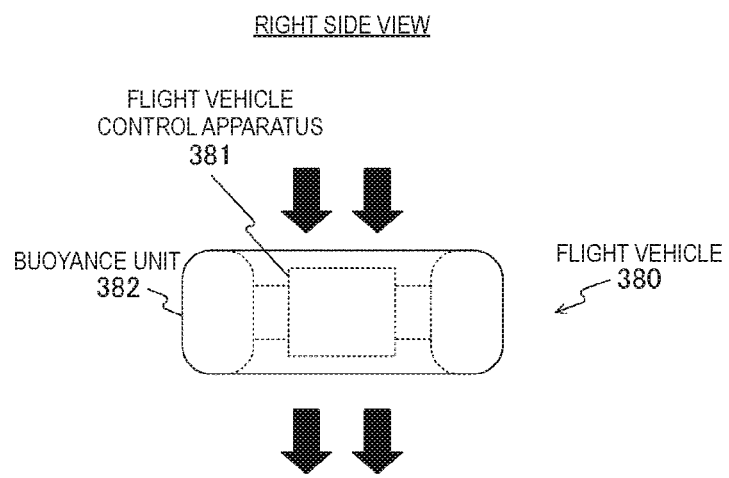

FIGS. 21a and 21b are diagrams illustrating an example of flow of air for generating lift required for ascending the flight vehicle 380 according to the first embodiment of the present technology. Note that FIGS. 21a and 21b schematically illustrate part of the flow of the air for generating lift required for ascending the flight vehicle 380 with a thick arrow. Note that FIGS. 21a and 21b illustrate flow of air at the front of the flight vehicle 380 and in the side view (right side view) of the flight vehicle 380. FIGS. 21a and 21b are similar to FIGS. 20b and 20c except that thick arrows are added in FIGS. 20b and 20c.

Note that these modified examples are one example, and the present technology may take other forms. For example, a through-hole which passes through the center may be provided at the spherical buoyance unit. That is, a spherical buoyance unit may have a cavity around a vertical axis.

[Modified Examples of Flight Vehicle Control Apparatus]

An example of the flight vehicle control apparatus which uses four propellers including rotational axes in the horizontal direction and in the vertical direction as propulsion for performing movement in three-dimensional space has been described above. However, this flight vehicle control apparatus is one example, and other flight vehicle control apparatuses may be used. Therefore, here, modified examples of the flight vehicle control apparatus will be described.

[Example where Four Propellers Including Rotational Axes in Vertical Direction are Used]

Figure 22A:
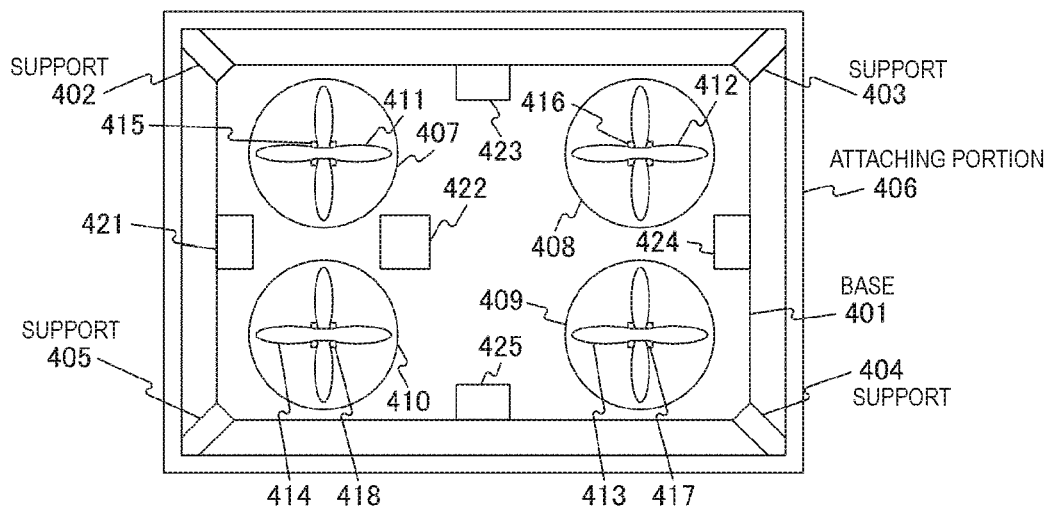
FIGS. 22a, 22b, and 22c are external view illustrating an internal configuration example of a flight vehicle control apparatus 400 according to the first embodiment of the present technology.
Figure 22B:
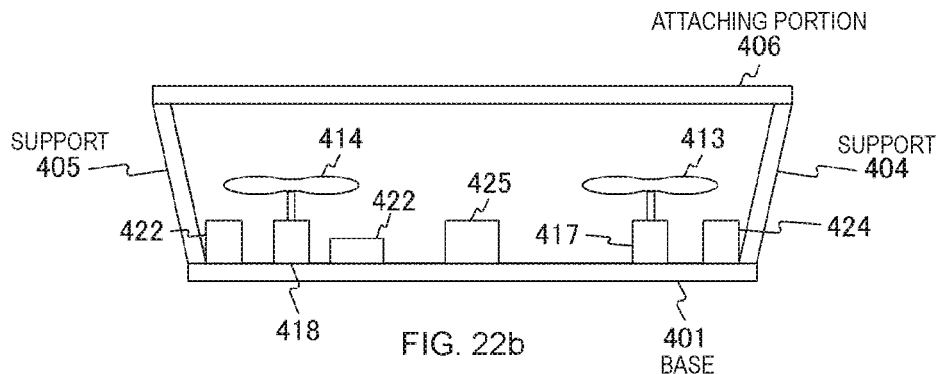
Figure 22C:
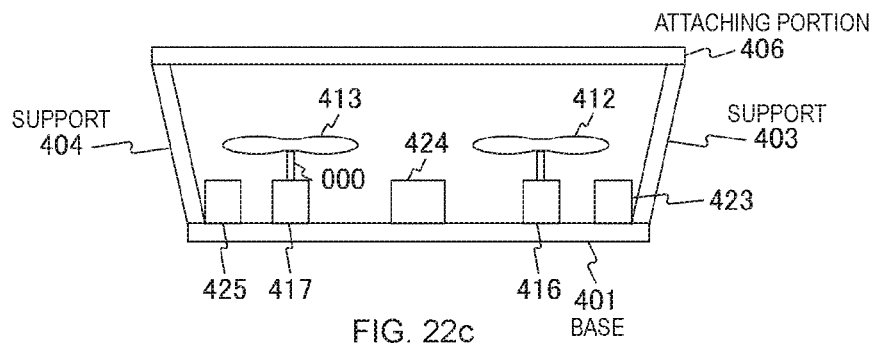

FIGS. 22a, 22b, and 22c are an external view illustrating an internal configuration example of a flight vehicle control apparatus 400 according to the first embodiment of the present technology. FIG. 22a illustrates a top view of the flight vehicle control apparatus 400 in the case where the flight vehicle control apparatus 400 is removed from a buoyance unit. Further, FIG. 22b illustrates a front view of the flight vehicle control apparatus 400, and FIG. 22c illustrates a side view (right side view) of the flight vehicle control apparatus 400.

The flight vehicle control apparatus 400 is a modified example of the flight vehicle control apparatus 110 illustrated in FIGS. 2a, 2b and 2c, or the like, and differs from the flight vehicle control apparatus 110 in that all of the four propellers include rotational axes in the vertical direction. Therefore, in FIGS. 22a, 22b and 22c, explanation of part common with that of the flight vehicle control apparatus 110 will be partially omitted, and only part different from that of the flight vehicle control apparatus 110 will be mainly described.

The flight vehicle control apparatus 400 includes a base 401, supports 402 to 405, an attaching portion 406, propellers 411 to 414, motors 415 to 418, imaging units 421 and 422, and sensors 423 to 425. Note that each of the motors 415 to 418 is supported by a supporting portion (not illustrated). Further, holes 407 to 410 for allowing air generated by rotation of the propellers 411 to 414 to flow are provided near the propellers 411 to 414 at the base 401.

In this manner, the flight vehicle control apparatus 400 is a flight vehicle control apparatus which uses four propellers including only rotational axes in the vertical direction as propulsion for performing movement in three-dimensional space. By this means, it is possible to further improve propulsion in the case where movement in the vertical direction is performed. Note that movement in the horizontal direction can be performed using four propellers.

[Example where One Propeller Whose Rotational Axis is Variable is Used]

Figure 23A:
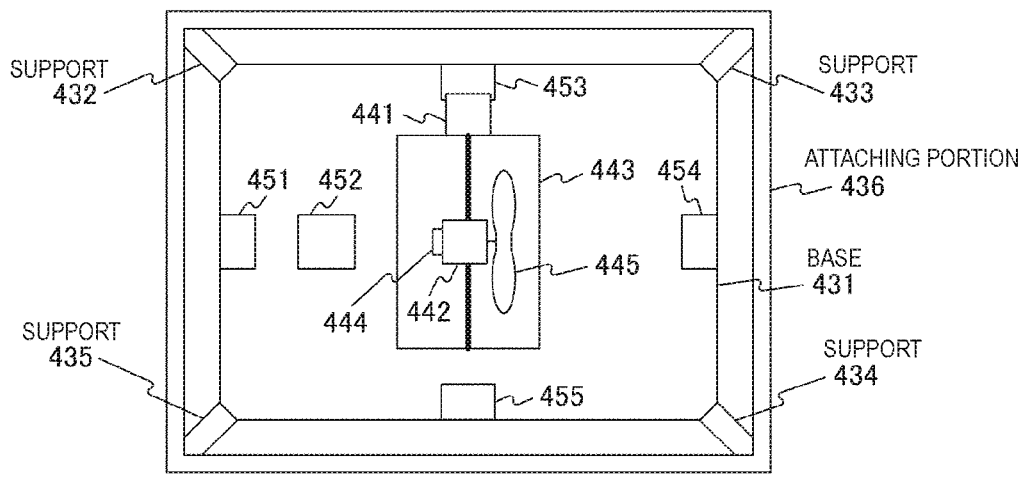
FIGS. 23a, 23b, and 23c are external view illustrating an internal configuration example of a flight vehicle control apparatus 430 according to the first embodiment of the present technology.
Figure 23B:
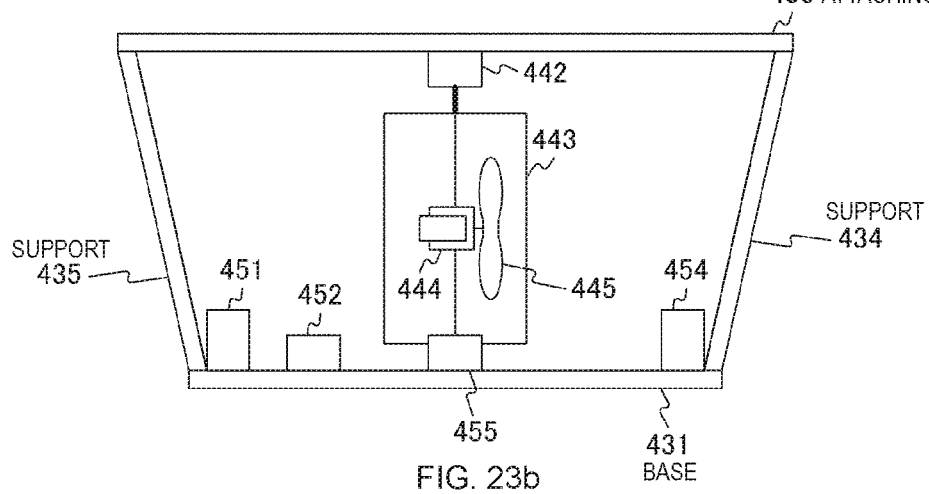
Figure 23C:
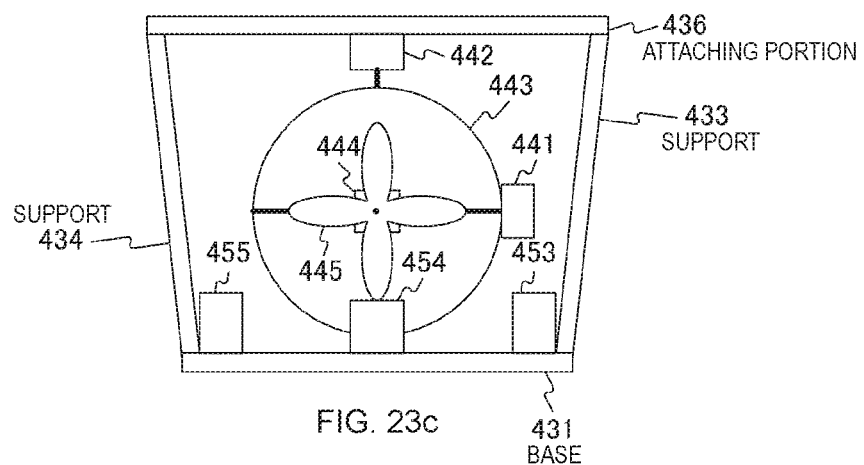

FIGS. 23a, 23b, and 23c are external views illustrating an internal configuration example of the flight vehicle control apparatus 430 according to the first embodiment of the present technology. FIG. 23a illustrates a top view of the flight vehicle control apparatus 430 in the case where the flight vehicle control apparatus 430 is removed from a buoyance unit. Further, FIG. 23b illustrates a front view of the flight vehicle control apparatus 430, and FIG. 23c illustrates a side view (right side view) of the flight vehicle control apparatus 430.

The flight vehicle control apparatus 430 is a modified example of the flight vehicle control apparatus 110 illustrated in FIGS. 2a, 2b and 2c, or the like, and differs from the flight vehicle control apparatus 110 in that the flight vehicle control apparatus 430 includes one propeller 445 and a rotational axis of the propeller 445 can be changed. Therefore, in FIGS. 23a, 23b and 23c, explanation of part common with that of the flight vehicle control apparatus 110 will be partially omitted, and part different from that of the flight vehicle control apparatus 110 will be mainly described.

The flight vehicle control apparatus 430 includes a base 431, supports 432 to 435, an attaching portion 436, rotating portions 441 and 442, a supporting portion 443, a motor 444, a propeller 445, imaging units 451 and 452, and sensors 453 to 455. Further, at the base 431, while a hole, or the like, for allowing air to flow is provided near a location where wind generated by rotation of the propeller 445 passes through, illustration thereof will be omitted to simplify the explanation.

The supporting portion 443 is a frame of a hollow circular cylindrical shape to be attached to the rotating portions 441 and 442 and supports the motor 444 within the frame.

The rotating portion 441 rotates the supporting portion 443 using the horizontal direction (direction parallel to the base 431) as a rotational axis.

The rotating portion 442 rotates the supporting portion 443 using the vertical direction (direction orthogonal to the base 431) as a rotational axis.

In this manner, the flight vehicle control apparatus 430 is a flight vehicle control apparatus which uses one propeller whose rotational axis is variable as propulsion for performing movement in three-dimensional space. In this manner, by using one propeller whose rotational axis is variable, it is possible to perform movement in three-dimensional space only with one propeller. Further, because only one propeller is used, it is possible to improve space efficiency and reduce power consumption.

[Example where One Propeller Whose Rotational Axis is Variable is Used]

Figure 24A:
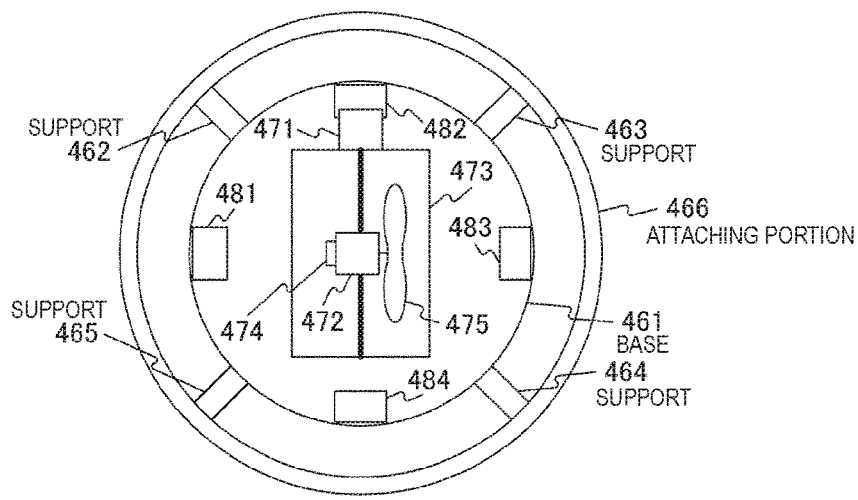
FIGS. 24a, 24b, and 24c are external view illustrating an internal configuration example of a flight vehicle control apparatus 460 according to the first embodiment of the present technology.
Figure 24B:
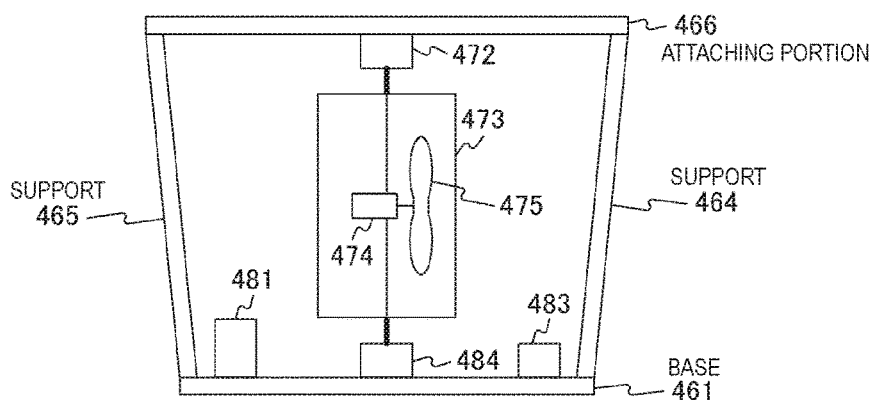
Figure 24C:
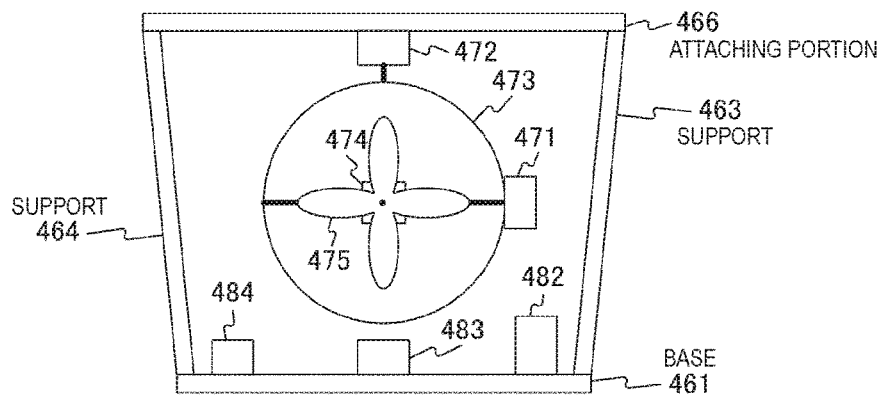

FIGS. 24a, 24b and 24c are external views illustrating an internal configuration example of the flight vehicle control apparatus 460 according to the first embodiment of the present technology. FIG. 24a illustrates a top view of the flight vehicle control apparatus 460 in the case where the flight vehicle control apparatus 460 is removed from a buoyance unit. Further, FIG. 24b illustrates a front view of the flight vehicle control apparatus 460, and FIG. 24c illustrates a side view (right side view) of the flight vehicle control apparatus 460.

The flight vehicle control apparatus 460 is a modified example of the flight vehicle control apparatus 430 illustrated in FIGS. 23a, 23b and 23c and differs from the flight vehicle control apparatus 430 in that the shape of the body is made a circular cylindrical shape. Therefore, in FIGS. 24a, 24b and 24c, explanation of part common with that of the flight vehicle control apparatus 430 will be partially omitted, and part different from that of the flight vehicle control apparatus 430 will be mainly described.

The flight vehicle control apparatus 460 includes a base 461, supports 462 to 465, an attaching portion 466, rotating portions 471 and 472, a supporting portion 473, a motor 474, a propeller 475, an imaging unit 481, and sensors 482 to 484. Further, at the base 461, while a hole, or the like, for allowing air to flow is provided near a location where wind generated by rotation of the propeller 475 passes through, illustration thereof will be omitted to simplify the explanation.

In this manner, it is possible to allow the flight vehicle control apparatus using one propeller whose rotational axis is variable as propulsion for performing movement in three-dimensional space to have various kinds of shapes. However, this modified example is one example, and the flight vehicle control apparatus may take other forms.

For example, the flight vehicle control apparatus may include one propeller including a rotational axis in the vertical direction, and one propeller including a rotational axis in the horizontal direction, which is variable. In this case, it is possible to control movement in the vertical direction using one propeller and control movement in the horizontal direction by setting the rotational axis of one propeller variable.

2. Second Embodiment

In a second embodiment of the present technology, an example will be described where buoyance of the flight vehicle is increased by utilizing a buoyance unit which can be separated. Note that components of each apparatus in the second embodiment of the present technology are substantially the same as those of each apparatus illustrated in FIGS. 1a, 1b and 1 c, FIGS. 2a, 2b and 2c, or the like. Therefore, the same reference numerals as those of the first embodiment of the present technology are assigned to components common with those of the first embodiment of the present technology, and explanation thereof will be partially omitted.

[External Configuration Example of Flight Vehicle]

Figure 25A:
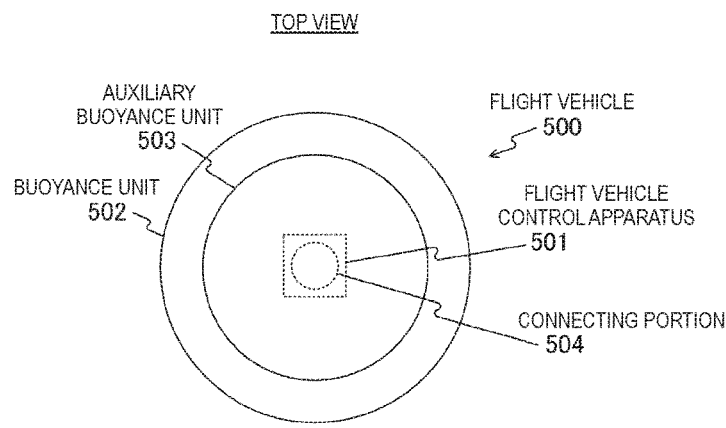
FIGS. 25a, 25b, and 25c are diagrams illustrating an external configuration example of a flight vehicle 500 according to a second embodiment of the present technology.
Figures 25B, 25C:
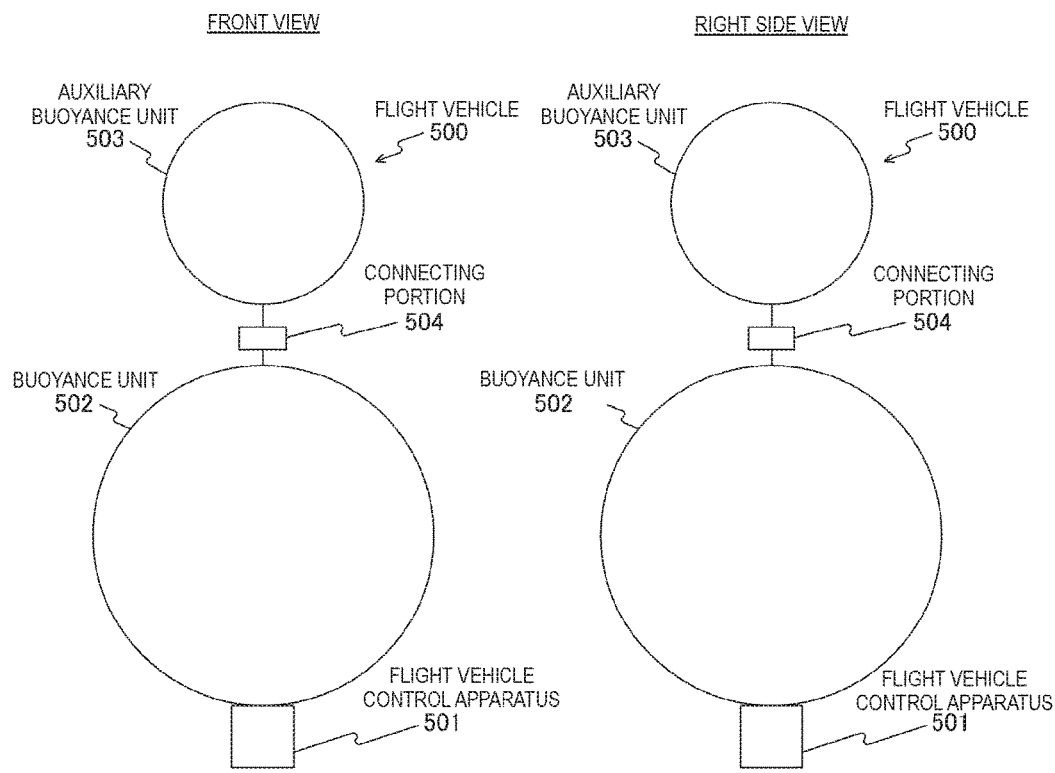

FIGS. 25a, 25b and 25c are diagrams illustrating an external configuration example of a flight vehicle 500 according to the second embodiment of the present technology. FIG. 25a illustrates a top view of the flight vehicle 500, FIG. 25b illustrates a front view of the flight vehicle 500, and FIG. 25c illustrates a side view (right side view) of the flight vehicle 500.

The flight vehicle 500 is a modified example of the flight vehicle 100 illustrated in FIGS. 1a, 1b and 1 c, or the like, and differs from the flight vehicle 100 in that an auxiliary buoyance unit 503 is connected to a buoyance unit 502 via a connecting portion 504. Therefore, in FIGS. 25a, 25b and 25c, explanation of part common with that of the flight vehicle 100 will be partially omitted.

The flight vehicle 500 includes a flight vehicle control apparatus 501, the buoyance unit 502, the auxiliary buoyance unit 503 and the connecting portion 504. The flight vehicle control apparatus 501 and the buoyance unit 502 correspond to the flight vehicle control apparatus 110 and the buoyance unit 120 illustrated in FIGS. 1a, 1 b and 1 c, or the like.

The auxiliary buoyance unit 503 is formed with a material similar to that of the buoyance unit 502, and is filled with gas similar to that of the buoyance unit 502. Further, as illustrated in FIGS. 25a, 25b and 25c, the size of the auxiliary buoyance unit 503 can be made smaller than that of the buoyance unit 502. However, the size of the auxiliary buoyance unit 503 may be made larger than that of the buoyance unit 502, or made substantially the same as that of the buoyance unit 502. The relationship between the buoyance unit 502 and the auxiliary buoyance unit 503 (for example, a material, a size, gas) can be set as appropriate on the basis of performance, or the like, of the flight vehicle 500.

Further, the buoyance unit 502 and the auxiliary buoyance unit 503 are connected using the connecting portion 504. As the connecting portion 504, connecting equipment which can be separated can be used. For example, as the connecting portion 504, connecting equipment which can perform connection and disconnection on the basis of electrical control, and a string member can be used. As this connecting equipment, for example, an actuator, a piezoelectric element, an electromagnet, a motor, or the like, can be used.

In this manner, concerning the buoyance unit 502 and the auxiliary buoyance unit 503, it is possible to perform connection and disconnection on the basis of electrical control. For example, a control unit (corresponding to the control unit 152 illustrated in FIG. 3) of the flight vehicle control apparatus 501 can separate the auxiliary buoyance unit 503 from the flight vehicle 500 on the basis of information (for example, sound, height, an image) acquired by each sensor and each function (for example, image recognition) for processing these. Therefore, for example, even in the case where the flight vehicle 500 is about to fly up to the sky by buoyance being increased, it is possible to appropriately return the flight vehicle 500 to the ground by separating the auxiliary buoyance unit 503 from the flight vehicle 500.

For example, even in the case where the mass increases by a new function, or the like, being added to the flight vehicle 500, it is possible to make the flight vehicle 500 easily ascend in the air by connecting the auxiliary buoyance unit 503.

In this manner, by connecting the auxiliary buoyance unit 503 at an upper part of the buoyance unit 502, it is possible to further increase buoyance of the flight vehicle 500.

[Example of Flow of Air]

Figure 26A:
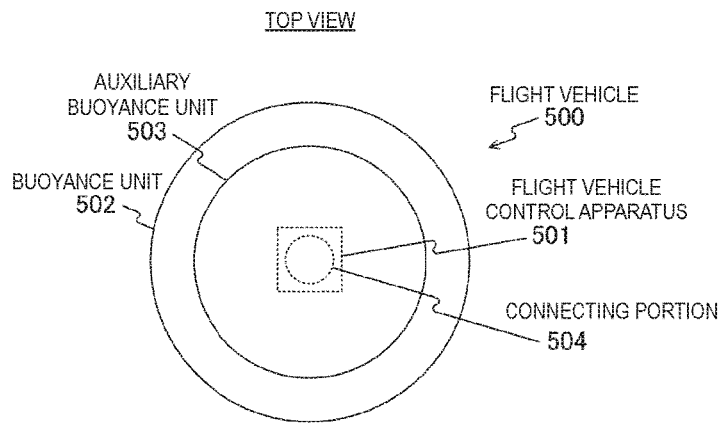
FIGS. 26a, 26b, and 26c are diagrams illustrating an example of flow of air for generating lift required for ascending the flight vehicle 500 according to the second embodiment of the present technology.
Figures 26B, 26C:
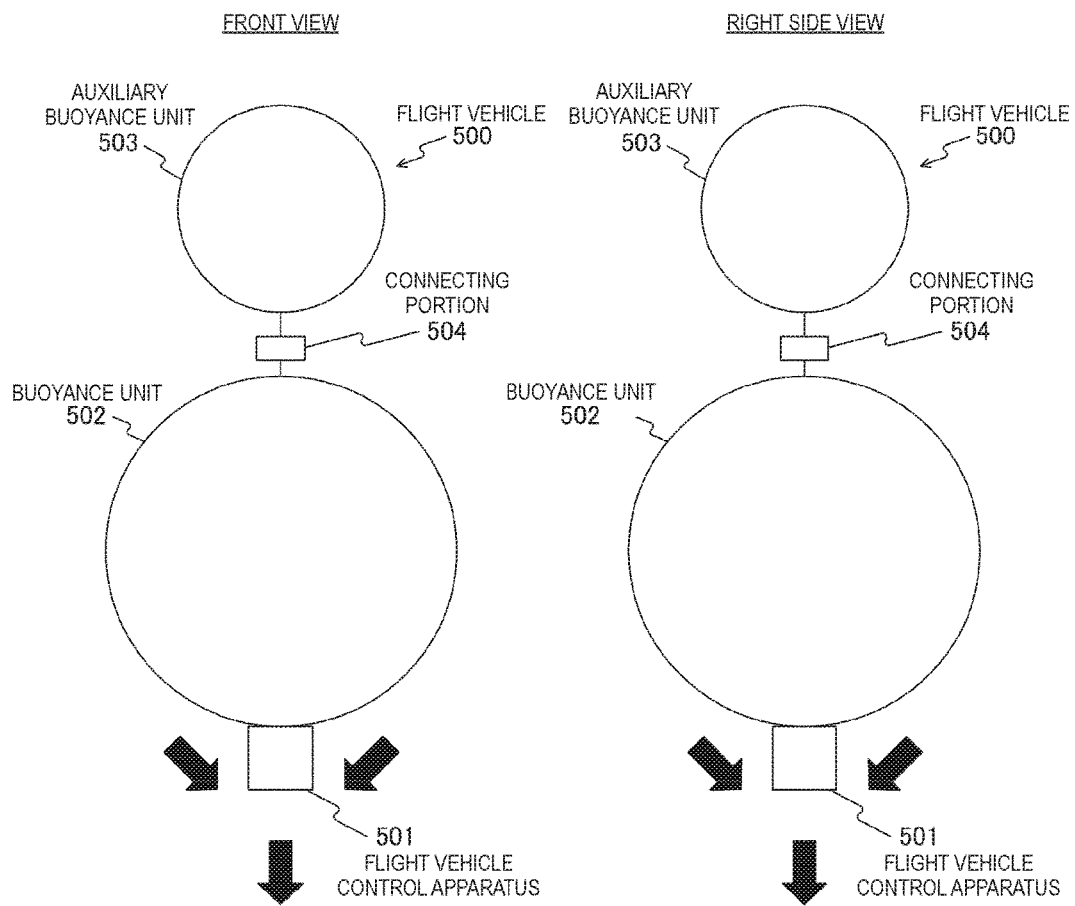

FIGS. 26a, 26b and 26c are diagrams illustrating an example of flow of air for generating lift required for ascending the flight vehicle 500 according to the second embodiment of the present technology. Note that FIGS. 26a, 26b and 26c schematically illustrate part of the flow of the air for generating lift required for ascending the flight vehicle 500 with a thick arrow. Note that FIGS. 26a to 26c are similar to FIGS. 25a to 25c except that thick arrows are added in a to c in FIGS. 25a to 25c.

[Operation Example of Flight Vehicle]

Figure 27:
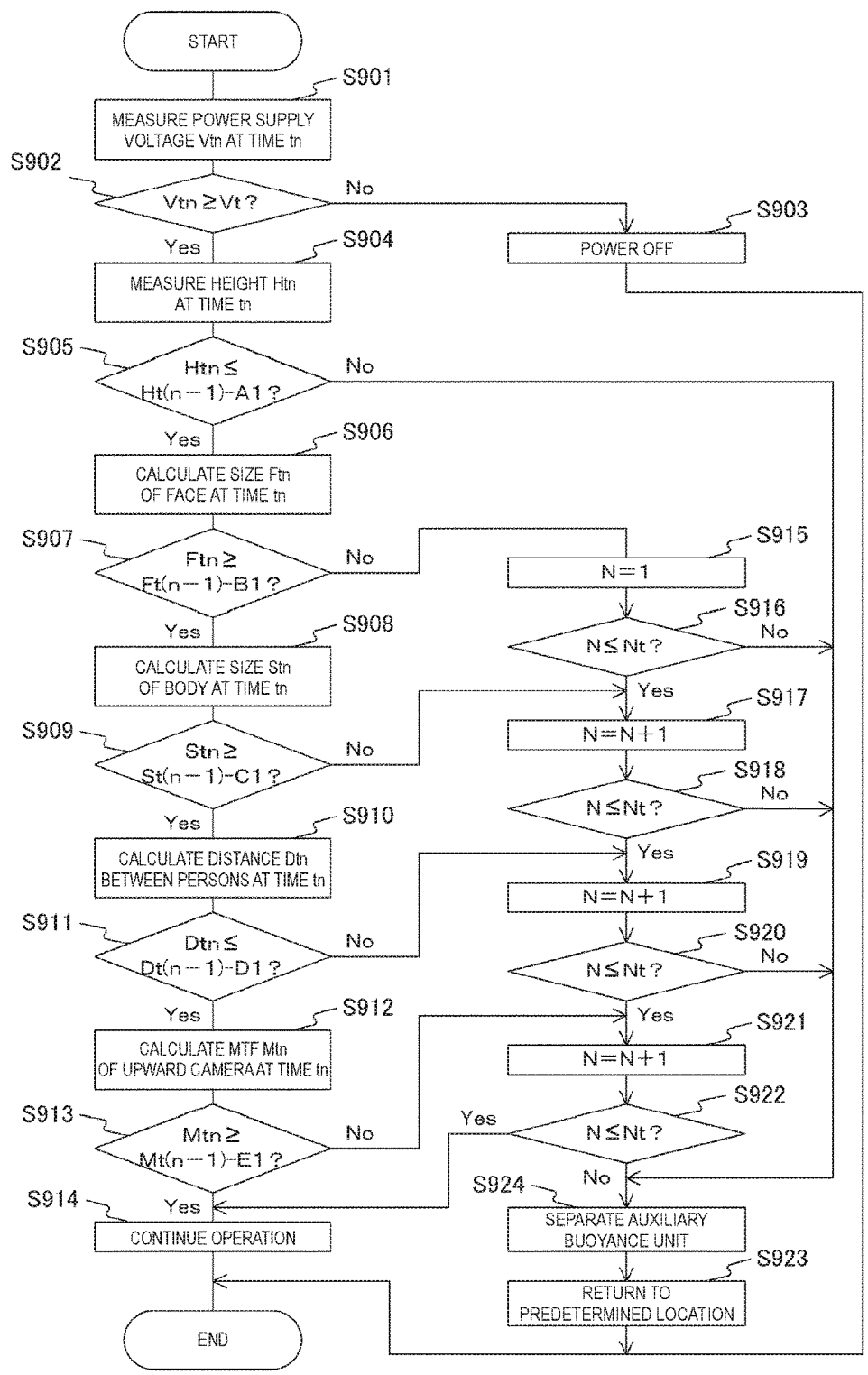
FIG. 27 is a flowchart illustrating an example of a processing procedure of movement control processing by a flight vehicle control apparatus 501 according to the second embodiment of the present technology.

FIG. 27 is a flowchart illustrating an example of a processing procedure of movement control processing by the flight vehicle control apparatus 501 according to the second embodiment of the present technology. Note that FIG. 27 is a modified example of FIG. 5 and differs from FIG. 5 in that the auxiliary buoyance unit 503 is separated before control for returning to a predetermined location is performed (step S923).

A control unit (corresponding to the control unit 152 illustrated in FIG. 3) of the flight vehicle control apparatus 501 performs control to separate the auxiliary buoyance unit 503 (step S924). Subsequently, a control unit (corresponding to the control unit 152 illustrated in FIG. 3) of the flight vehicle control apparatus 501 performs control to return to a predetermined location (step S923).

In this manner, the control unit of the flight vehicle control apparatus 501 can perform control to separate the auxiliary buoyance unit 503 from the buoyance unit 502 on the basis of at least one of information relating to the flight vehicle 500 and information of surroundings of the flight vehicle 500. Note that the buoyance unit 502 is an example of a first buoyance unit recited in the claims, and the auxiliary buoyance unit 503 is an example of a second buoyance unit recited in the claims.

Modified Examples

FIGS. 28a, 28b and 28c to FIGS. 31a, 31b, and 31c are diagrams illustrating external configuration examples of the flight vehicles 510, 520, 530 and 540 according to the second embodiment of the present technology. Further, FIGS. 28a, 28b and 28c to FIGS. 31a, 31b, and 31c illustrate examples of flow of air for generating lift required for ascending the flight vehicles 510, 520, 530 and 540. Note that FIGS. 28a, 28b and 28c to FIGS. 31a, 31b, and 31c schematically illustrate part of the flow of the air for generating lift required for ascending the flight vehicles 510, 520, 530 and 540 with thick arrows.

Figure 31A:
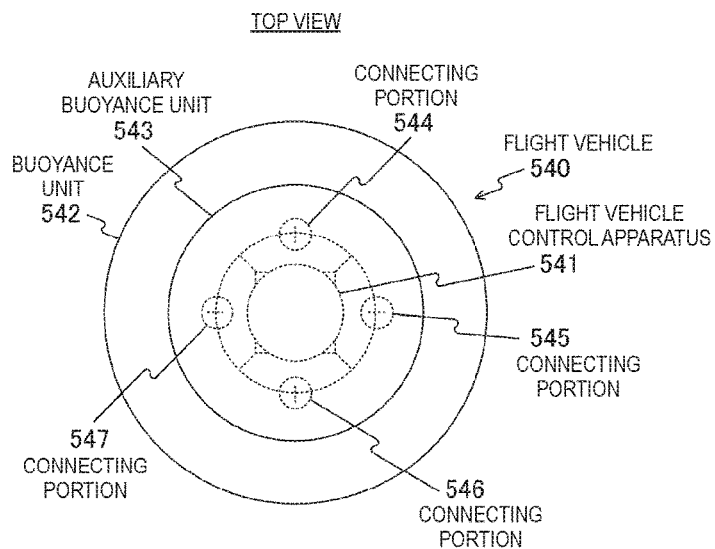
FIGS. 31a, 31b, and 31c are diagrams illustrating an external configuration example of a flight vehicle 540 according to the second embodiment of the present technology.
Figures 31B, 31C:
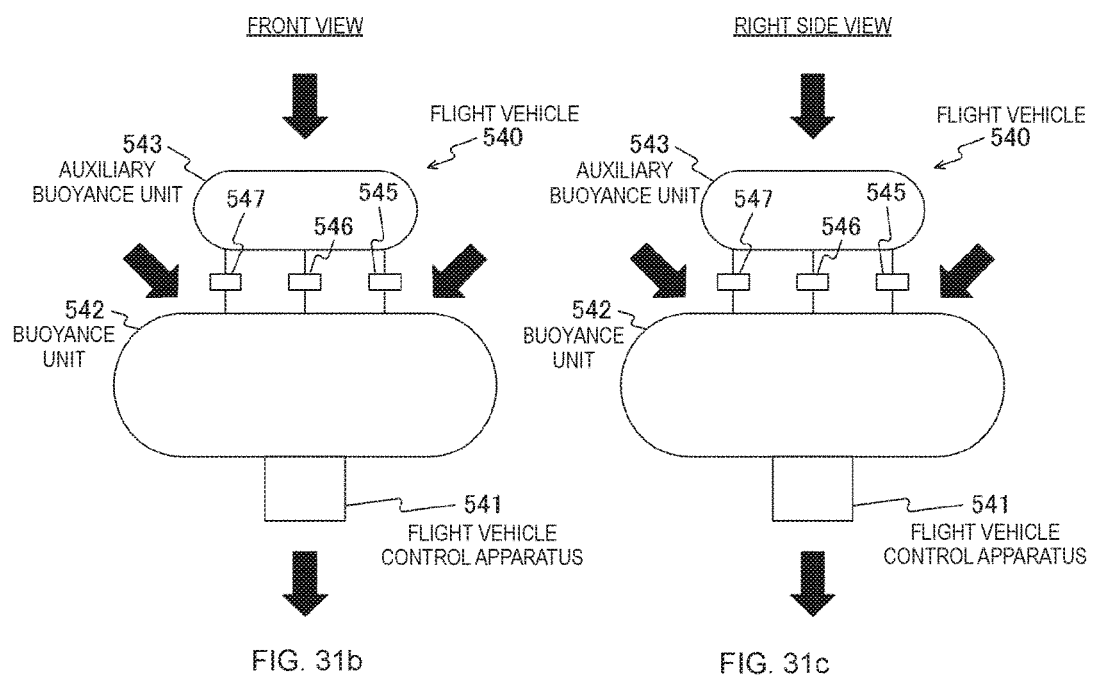

FIG. 28a and FIG. 31a illustrate top views of the flight vehicles 510, 520, 530 and 540. Further, FIG. 28b and FIG. 31b illustrate front views of the flight vehicles 510, 520, 530 and 540 in b. Further, FIG. 28c and FIG. 31c illustrate side views (right side views) of the flight vehicles 510, 520, 530 and 540.

The flight vehicle 510 illustrated in FIGS. 28a, 28b, 28c are modified examples of the flight vehicle 500 illustrated in FIGS. 25a, 25b, 25c, and differs from the flight vehicle 500 in that a buoyance unit 512 has a circular cylindrical shape. Therefore, in FIGS. 25a, 25b, 25c, explanation of part common with that of the flight vehicle 500 will be partially omitted.

The buoyance unit 512 has a shape such that a through-hole which pierces the center portion at both end faces is provided as with the buoyance unit 362 illustrated in FIGS. 15a, 15b and 15c. Further, the relationship between a propeller (corresponding to the propeller 138 illustrated in FIGS. 2a, 2b and 2c) for moving the flight vehicle 510 in the vertical direction and the through-hole is similar to that in the example illustrated in FIGS. 15a, 15b and 15c.

The flight vehicle 520 illustrated in FIGS. 29a, 29b and 29c are modified examples of the flight vehicle 510 illustrated in FIGS. 28a, 28b and 28c, and differs from the flight vehicle 510 in that an auxiliary buoyance unit 523 has a circular cylindrical shape. Therefore, in FIGS. 29a, 29b and 29c, explanation of part common with that of the flight vehicle 510 will be partially omitted.

The auxiliary buoyance unit 523 has a shape such that a through-hole which pierces the center portion at both end faces is provided as with the buoyance unit 512 illustrated in FIGS. 28a, 28b and 28c. That is, at both the buoyance unit 522 and the auxiliary buoyance unit 523, through-holes which pierce the center portions at the both end faces are provided on the same axis. Therefore, it is possible to reduce energy required for moving the flight vehicle 520 in the vertical direction. Further, it is possible to realize lower power consumption and a longer driving period of the flight vehicle 520.

Figure 30A:
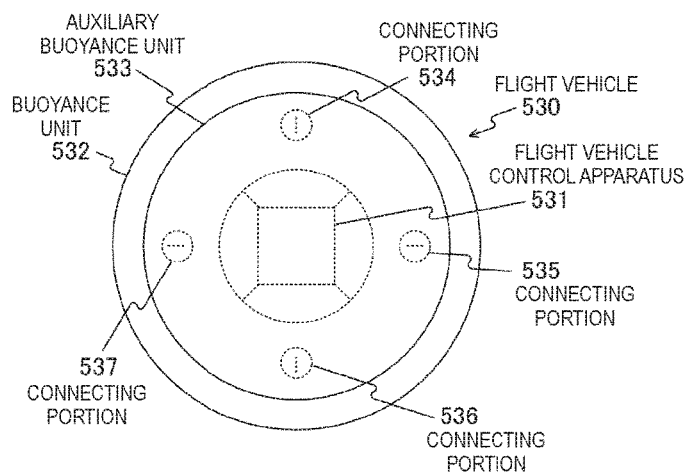
FIGS. 30a, 30b, and 30c are diagrams is a diagram illustrating an external configuration example of a flight vehicle 530 according to the second embodiment of the present technology.
Figure 30B:
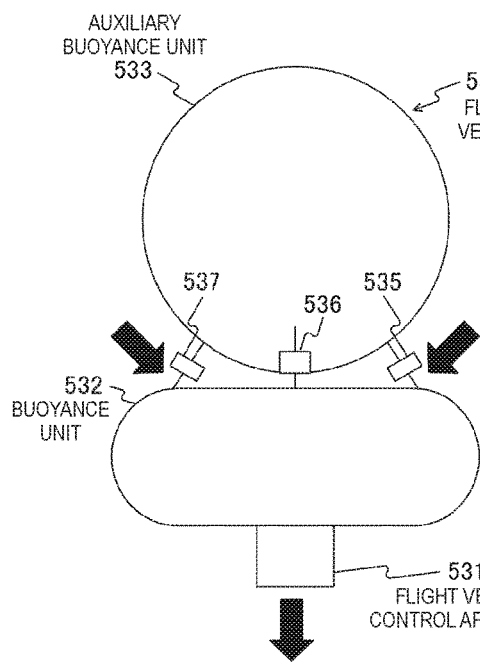
Figure 30C:
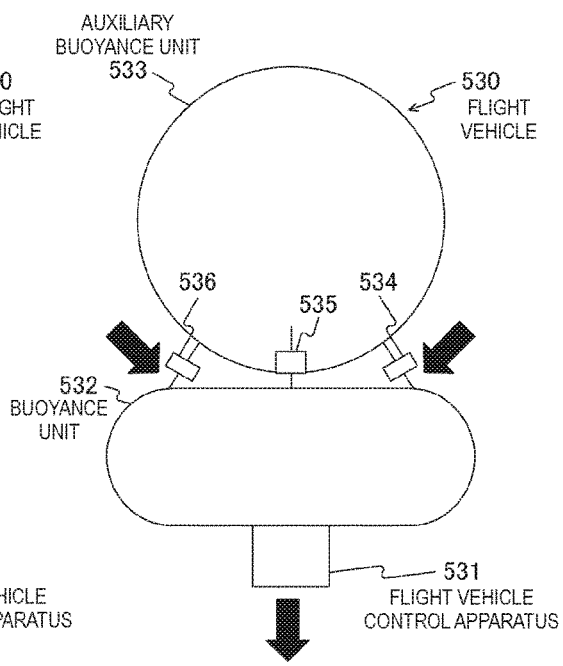

The flight vehicle 530 illustrated in FIGS. 30a, 30b and 30c are modified examples of the flight vehicle 500 illustrated in FIGS. 25a, 25b and 25c, and differs from the flight vehicle 500 in that a buoyance unit 532 has a doughnut shape and a buoyance unit 532 and an auxiliary buoyance unit 533 are connected using connecting portions 534 to 537. Therefore, in FIGS. 30a, 30b and 30c, explanation of part common with that of the flight vehicle 500 will be partially omitted.

Further, in the flight vehicle 530, the buoyance unit 533 is used in place of the buoyance unit 373 in the flight vehicle 370 illustrated in FIGS. 17a and 17b and FIGS. 18a and 18b, and the buoyance unit 532 and the auxiliary buoyance unit 533 are connected using four connecting portions 534 to 537.

The flight vehicle 540 illustrated in FIGS. 31a, 31b and 31c are modified examples of the flight vehicle 530 illustrated in FIGS. 30a, 30b and 30c and differs from the flight vehicle 530 in that the auxiliary buoyance unit 543 has a doughnut shape. Therefore, in FIGS. 31a, 31b and 31c, explanation of part common with that of the flight vehicle 530 will be partially omitted.

Further, in the flight vehicle 540, a buoyance unit 542 and an auxiliary buoyance unit 543 are connected using four connecting portions 544 to 547.

In this manner, in the second embodiment of the present technology, it is possible to change buoyance of the flight vehicle in accordance with a state using the auxiliary buoyance unit. Therefore, it is possible to reduce power consumption of the flight vehicle.

Further, for example, in the case where the flight vehicle is connected using a cable, a string, or the like, even in the case where the cable, the string, or the like, is disconnected, because the auxiliary buoyance unit is automatically disconnected, it is possible to return the body of the flight vehicle to the ground. Therefore, it is possible to prevent loss of the flight vehicle.

Here, in recent years, a ground-type robot and a smartphone have high-level recognition functions, or the like, in accordance with development of a CPU, an LSI, a sensor, or the like, so that interaction with a human becomes smoother. Further, by utilizing the Internet and cloud, it is possible to further improve the recognition functions, or the like, so that it is assumed that interaction with a human can be further smoother. However, on the ground, in the case where a robot, or the like, is utilized, it is often difficult for the robot to pass a location where there is a difference in level or an obstacle. Therefore, it is assumed that each function cannot be implemented on the ground.

On the other hand, according to the embodiments of the present technology, it is possible to easily float the flight vehicle in the air by utilizing gas lighter than air, and it is possible to implement each function in the air. For example, it is possible to implement functions such as a sensor, processing, actuation, a network, information compression/decompression, personal information protection/security, data mining, user interface, energy-related function, or the like.

Note that, in the first and the second embodiments of the present technology, the flight vehicle in which the flight vehicle control apparatus and the buoyance unit are integrally configured has been described as an example. However, for example, it is also possible to use a general rubber balloon as the buoyance unit. In this case, it is possible to attach and detach the rubber balloon (buoyance unit) and the flight vehicle control apparatus. In this case, it is possible to recognize the flight vehicle control apparatus other than the rubber balloon (buoyance unit) as one apparatus. Further, the embodiments of the present technology can be also applied to this flight vehicle control apparatus.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An information processing apparatus including:

an imaging unit provided at a flight vehicle which moves in air by utilizing gas lighter than air and configured to image a subject to generate image data; and a control unit configured to perform control movement of the flight vehicle on the basis of at least one of information relating to the flight vehicle and information of surroundings of the flight vehicle, and to perform control to record the image data generated by the imaging unit.

(2)

The information processing apparatus according to (1), further including:

an acquiring unit configured to acquire at least one of the information relating to the flight vehicle and the information of the surroundings, wherein the control unit records the image data generated by the imaging unit in the case where the acquired information satisfies a predetermined condition.

(3)

The information processing apparatus according to (2), wherein the acquiring unit acquires at least one of image information, sound information, temperature information, and distance information relating to space where the flight vehicle exists as the information of the surroundings and acquires height information, location information, velocity information, acceleration information, and power remaining capacity relating to the flight vehicle as the information relating to the flight vehicle, and the control unit records the image data generated by the imaging unit on the basis of a change amount of the acquired information.

(4)

The information processing apparatus according to any one of (1) to (3), further including:

a buoyance unit configured to fill the flight vehicle with the gas and float the flight vehicle in the air, and including a through-hole which pierces, in a vertical direction, a center portion in a horizontal direction; and a propeller provided near an opening portion at a lower side of the through-hole and configured to move the flight vehicle in the vertical direction, wherein a diameter of the propeller is the same as a size of the opening portion, or less than or equal to the size.

(5)

The information processing apparatus according to any one of (1) to (4), wherein the control unit detects a dangerous location in the air on the basis of the information of the surroundings and controls movement of the flight vehicle so as to avoid the detected dangerous location.

(6)

The information processing apparatus according to any one of (1) to (5), further including:

a buoyance unit including a display unit for displaying an image on an outer surface and configured to float the flight vehicle in the air by being filled with the gas inside, wherein the control unit makes the display unit display an image.

(7)

The information processing apparatus according to any one of (1) to (6), further including:

a rechargeable battery configured to supply power, wherein the control unit performs control to move the flight vehicle to a location of a charging apparatus for charging the rechargeable battery in the case where remaining capacity of the rechargeable battery is less than a threshold.

(8)

The information processing apparatus according to any one of (1) to (7), further including:

a first buoyance unit configured to float the flight vehicle in the air by being filled with the air; and a second buoyance unit connected to the first buoyance unit so as to be able to be separated and configured to float the flight vehicle in the air by being filled with the gas, wherein the control unit performs control to separate the second buoyance unit from the first buoyance unit on the basis of at least one of the information relating to the flight vehicle and the information of the surroundings.

(9)

The information processing apparatus according to any one of (1) to (7), further including:

a buoyance unit configured to float the flight vehicle in the air by being filled with the gas, wherein the control unit performs control to move the flight vehicle to a location of a replenishing apparatus for replenishing the gas in the case where gas of the buoyance unit is less than a threshold.

(10)

The information processing apparatus according to any one of (1) to (7), further including:

a buoyance unit configured to float the flight vehicle in the air by being filled with the gas, wherein the control unit absorbs gas filling the buoyance unit or injects gas to the buoyance unit.

(11)

The information processing apparatus according to any one of (1) to (10), wherein the control unit authenticates a user who uses the flight vehicle at a timing before operation for floating the flight vehicle in the air is started or at a timing before the information processing apparatus is powered on.

(12)

The information processing apparatus according to any one of (1) to (11), further including:

a communication unit configured to exchange the information of the surroundings with other apparatuses by utilizing radio communication.

(13)

An information processing method including:

a first procedure of controlling movement of a flight vehicle on the basis of at least one of information relating to the flight vehicle which moves in air by utilizing gas lighter than air and information of surroundings of the flight vehicle; and a second procedure of performing control to record image data generated by an imaging unit provided at the flight vehicle on the basis of at least one of the information relating to the flight vehicle and the information of the surroundings of the flight vehicle.

(14)

A program for causing a computer to execute:

a first procedure of controlling movement of a flight vehicle on the basis of at least one of information relating to the flight vehicle which moves in air by utilizing gas lighter than air and information of surroundings of the flight vehicle; and a second procedure of performing control to record image data generated by an imaging unit provided at the flight vehicle on the basis of at least one of the information relating to the flight vehicle and the information of the surroundings of the flight vehicle.

REFERENCE SIGNS LIST 10 communication system
11, 12 base station
13 network
31 lighting equipment with a fan
32 air conditioner
33 coffee maker
34 phone
35 television
36 music player
100 to 102 flight vehicle
110 flight vehicle control apparatus
111 base
112 to 115 support
116 attaching portion
117 supporting portion
118 hole
120 buoyance unit
121 display unit
131 to 134 motor
135 to 138 propeller
141, 142 imaging unit
143 to 145 sensor
151 communication unit
152 control unit
153 image information output unit
154 sound information output unit
155 storage unit
156 power supplying unit
200 information processing apparatus (server)
210 information processing apparatus
211 input/output unit
300 fixing apparatus
301, 310 connecting portion
320 charging apparatus
330 gas replenishing apparatus
340 flight vehicle
341 flight vehicle control apparatus
342 buoyance unit
343 traveling direction fin
350 flight vehicle
351 flight vehicle control apparatus
352 buoyance unit
353 to 355 traveling direction fin
360 flight vehicle
362 buoyance unit
363 through-hole
364 upper edge portion
365 lower edge portion
370 flight vehicle
371 flight vehicle control apparatus
372, 373 buoyance unit
374 to 377 connecting portion
378 hole
380 flight vehicle
381 flight vehicle control apparatus
382 buoyance unit
383 to 386 connecting portion
387 through-hole
400 flight vehicle control apparatus
401 base
402 to 405 support
406 attaching portion
407 to 410 hole
411 to 414 propeller
415 to 418 motor
421, 422 imaging unit
423 to 425 sensor
430 flight vehicle control apparatus
431 base
432 to 435 support
436 attaching portion
441, 442 rotating portion
443 supporting portion
444 motor
445 propeller
451 imaging unit
453 to 455 sensor
460 flight vehicle control apparatus
461 base
462 to 465 support
466 attaching portion
471 rotating portion
473 supporting portion
474 motor
475 propeller
481 imaging unit
482 to 484 sensor
500 flight vehicle
501 flight vehicle control apparatus
502 buoyance unit
503 auxiliary buoyance unit
504 connecting portion
510 flight vehicle
512 buoyance unit
520 flight vehicle
522 buoyance unit
523 auxiliary buoyance unit
530 flight vehicle
532 buoyance unit
533 auxiliary buoyance unit
534 to 537 connecting portion
540 flight vehicle
542 buoyance unit
543 auxiliary buoyance unit
544 to 547 connecting portion

The invention claimed is:

1. An information processing apparatus, comprising:
in a flight vehicle configured to move in air by utilizing gas lighter than air:
an imaging unit configured to:
capture an image of a subject; and
generate image data based on the captured image;
an acquiring unit configured to acquire at least one of first information of the flight vehicle or second information associated with surroundings of the flight vehicle; and
a control unit configured to:
control movement of the flight vehicle based on the at least one of the first information or the second information; and
record the image data based on a time of the acquisition of the at least one of the first information or the second information.

2. The information processing apparatus according to claim 1,
wherein the control unit is further configured to record the image data based on a condition associated with the at least one of the first information or the second information.

3. The information processing apparatus according to claim 1,
wherein the second information associated with the surroundings of the flight vehicle includes at least one of image information, sound information, temperature information, or distance information relating to a space where the flight vehicle exists,
wherein the first information includes at least one of height information of the flight vehicle, location information of the flight vehicle, velocity information of the flight vehicle, acceleration information of the flight vehicle, or power remaining capacity of the flight vehicle, and
wherein the control unit is further configured to record the image data based on a change amount of the at least one of the first information or the second information.

4. The information processing apparatus according to claim 1, further comprising:
a buoyance unit configured to:
fill the flight vehicle with the gas lighter than the air; and
float the flight vehicle in the air,
wherein the buoyance unit has a shape such that a through-hole pierces, in a vertical direction of the flight vehicle, a center portion of the buoyance unit in a horizontal direction of the flight vehicle; and
a propeller near an opening portion of the through-hole and at a lower side of the through-hole,
wherein the propeller is configured to move the flight vehicle in the vertical direction, and
wherein a diameter of the propeller is one of same as a size of the opening portion or less than the size of the opening portion.

5. The information processing apparatus according to claim 1, wherein the control unit is further configured to:
detect a dangerous location in the air based on the second information; and
control the movement of the flight vehicle based on the detection of the dangerous location.

6. The information processing apparatus according to claim 1, further comprising:
a buoyance unit including a display unit on an outer surface of the buoyance unit,
wherein the buoyance unit is configured to float the flight vehicle in the air based on the gas filled inside the buoyance unit, and
wherein the control unit is further configured to control the display unit to display the image data.

7. The information processing apparatus according to claim 1, further comprising:
a rechargeable battery configured to supply power,
wherein the control unit is further configured to control the movement of the flight vehicle to a location of a charging apparatus to charge the rechargeable battery, based on a remaining capacity of the rechargeable battery that is less than a threshold capacity.

8. The information processing apparatus according to claim 1, further comprising:
a first buoyance unit configured to float the flight vehicle in the air based on the air filled in the first buoyance unit; and
a second buoyance unit detachably connected to the first buoyance unit,
wherein the second buoyance unit is configured to float the flight vehicle in the air based on the gas filled in the second buoyance unit, and
wherein the control unit is further configured to control a connection between the second buoyance unit and the first buoyance unit based on the at least one of the first information or the second information.

9. The information processing apparatus according to claim 1, further comprising:
a buoyance unit configured to float the flight vehicle in the air based on the gas filled in the buoyance unit, and
wherein the control unit is further configured to control the movement of the flight vehicle to a location of a replenishing apparatus to replenish the gas of the buoyance unit which is less than a threshold value.

10. The information processing apparatus according to claim 1, further comprising:
a buoyance unit configured to float the flight vehicle in the air based on the gas filled in the buoyance unit, and
wherein the control unit is further configured to control a gas adjusting apparatus configured to one of absorb the gas filled inside the buoyance unit or inject the gas to the buoyance unit.

11. The information processing apparatus according to claim 1,
wherein the control unit is further configured to authenticate a user who operates the flight vehicle,
wherein the user is authenticated at one of:
a first timing before start of a floating operation of the flight vehicle in the air or
a second timing before the information processing apparatus is powered on.

12. The information processing apparatus according to claim 1, further comprising:
a communication unit configured to exchange the second information with at least one other apparatus via radio communication.

13. An information processing method, comprising:
in a flight vehicle configured to move in air by utilizing gas lighter than air:
capturing an image of a subject;
generating image data based on the captured image;
acquiring at least one of first information of the flight vehicle or second information associated with surroundings of the flight vehicle;
controlling movement of the flight vehicle based on the at least one of the first information or the second information; and
recording the image data based on a time of the acquisition of the at least one of the first information or the second information.

14. A non-transitory computer-readable medium having stored thereon, computer-readable instructions which when executed by a computer in a flight vehicle, cause the computer to execute operations, the operations comprising:
capturing an image of a subject;
generating image data based on the captured image;
acquiring at least one of first information of the flight vehicle or second information associated with surroundings of the flight vehicle configured to move in air by utilizing gas lighter than air;

controlling movement of the flight vehicle based on the at least one of the first information or the second information; and recording the image data based on a time of the acquisition of the at least one of the first information or the second information.

* * * * *